(12) United States Patent
Keith-Stewart et al.

(10) Patent No.: US 12,296,968 B2
(45) Date of Patent: May 13, 2025

(54) DUAL ENGINE VERTICAL TAKE OFF AND LANDING COLLAPSIBLE FIXED WING AIRCRAFT

(71) Applicant: Anduril Industries, Inc., Costa Mesa, CA (US)

(72) Inventors: Sean Keith-Stewart, San Diego, CA (US); Christian William Lopez, San Diego, CA (US); Jessica Rader, San Diego, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

(21) Appl. No.: 18/301,422

(22) Filed: Apr. 17, 2023

(65) Prior Publication Data

US 2024/0262489 A1 Aug. 8, 2024

Related U.S. Application Data

(60) Provisional application No. 63/444,080, filed on Feb. 8, 2023.

(51) Int. Cl.

| | | |
|---|---|---|
| B64D 29/02 | (2006.01) | |
| B23P 19/04 | (2006.01) | |
| B64C 1/06 | (2006.01) | |
| B64C 3/56 | (2006.01) | |
| B64C 29/00 | (2006.01) | |
| B64C 29/02 | (2006.01) | |
| B64F 5/10 | (2017.01) | |
| B64F 5/50 | (2017.01) | |
| B64U 80/50 | (2023.01) | |
| B64U 20/50 | (2023.01) | |

(52) U.S. Cl.
CPC ............. *B64D 29/02* (2013.01); *B23P 19/04* (2013.01); *B64C 1/063* (2013.01); *B64C 3/56* (2013.01); *B64C 29/00* (2013.01); *B64C 29/02* (2013.01); *B64F 5/10* (2017.01); *B64F 5/50* (2017.01); *B64U 80/50* (2023.01); *B64U 20/50* (2023.01)

(58) Field of Classification Search
CPC ........... B64C 3/56; B64C 1/063; B64C 29/02
See application file for complete search history.

(56) References Cited

U.S. PATENT DOCUMENTS

| | | | | |
|---|---|---|---|---|
| 1,708,373 A | * | 4/1929 | Weymouth | ................ B64C 3/56 74/519 |
| 1,711,637 A | * | 5/1929 | Fairchild | .................. B64C 3/56 244/49 |

(Continued)

FOREIGN PATENT DOCUMENTS

| | | |
|---|---|---|
| CN | 208931638 | 6/2019 |
| CN | 210971492 | 7/2020 |

(Continued)

*Primary Examiner* — Medhat Badawi
(74) *Attorney, Agent, or Firm* — Knobbe, Martens, Olson & Bear, LLP

(57) ABSTRACT

The present application discloses an aircraft. The aircraft comprises a first wing and a second wing, a fuselage to which the first wing and the second wing are mounted, a first engine operatively mounted to the first wing, and a second engine operatively mounted to the second wing. The aircraft is configured to vertically take-off and land. The first engine and the second engine are used for both (i) vertical take-off and landing, and (ii) horizontal flight.

14 Claims, 62 Drawing Sheets

(56) References Cited

U.S. PATENT DOCUMENTS

| | | | | |
|---|---|---|---|---|
| 2,572,421 | A * | 10/1951 | Abel, Jr. | B64C 3/56 244/49 |
| 2,623,713 | A | 12/1952 | Foster | |
| 2,674,422 | A * | 4/1954 | Pellarini | B64C 3/56 244/49 |
| 3,353,862 | A * | 11/1967 | Tormolen | B60P 3/11 410/2 |
| 4,215,587 | A * | 8/1980 | Kisovec | B64C 1/30 74/89.14 |
| 4,706,907 | A * | 11/1987 | Kopylov | B64C 3/56 244/119 |
| 8,152,100 | B2 | 4/2012 | Nicholas | B60P 3/11 414/471 |
| 9,522,725 | B2 * | 12/2016 | Torre | B64U 30/14 |
| 9,643,720 | B2 * | 5/2017 | Hesselbarth | B64D 27/40 |
| 9,682,774 | B2 * | 6/2017 | Paduano | B64U 10/20 |
| 9,821,909 | B2 * | 11/2017 | Moshe | B64C 27/22 |
| 10,207,621 | B2 * | 2/2019 | Friemel | B60P 3/11 |
| 10,252,798 | B2 | 4/2019 | Petrov | |
| 10,870,487 | B2 * | 12/2020 | McCullough | B64D 25/12 |
| 10,981,661 | B2 * | 4/2021 | Oldroyd | B64C 27/52 |
| 11,027,837 | B2 * | 6/2021 | McCullough | B64D 31/06 |
| 11,104,446 | B2 * | 8/2021 | McCullough | B64C 29/00 |
| 11,161,695 | B1 * | 11/2021 | Knight | B64F 1/224 |
| 11,511,886 | B1 * | 11/2022 | Tian | B64F 1/22 |
| 11,608,173 | B2 * | 3/2023 | McCullough | B64U 70/90 |
| 11,634,232 | B1 * | 4/2023 | Wiegman | B64C 29/0016 244/53 R |
| 11,713,114 | B2 * | 8/2023 | Schank | B64C 29/0025 244/2 |
| 11,794,931 | B2 * | 10/2023 | Gil | B64D 27/24 |
| 11,866,169 | B2 * | 1/2024 | Rainville | B64D 27/24 |
| 12,017,765 | B2 | 6/2024 | Bianco Mengotti | |
| 12,043,364 | B2 * | 7/2024 | Braam | B64C 1/061 |
| 2010/0276897 | A1 * | 11/2010 | Plummer | B60P 1/027 414/800 |
| 2014/0061390 | A1 * | 3/2014 | Woodworth | B64D 27/40 244/23 D |
| 2016/0025339 | A1 * | 1/2016 | Kamath | F02C 3/04 60/39.12 |
| 2016/0075423 | A1 * | 3/2016 | Karem | B64U 20/40 244/45 R |
| 2016/0185444 | A1 * | 6/2016 | Gionta | B64C 35/008 244/49 |
| 2016/0297520 | A1 * | 10/2016 | Sada-Salinas | B64U 30/10 |
| 2016/0304195 | A1 * | 10/2016 | Alber | B64C 1/26 |
| 2017/0190412 | A1 * | 7/2017 | Bunting | B64C 1/30 |
| 2017/0217598 | A1 * | 8/2017 | Bacon | B64C 27/00 |
| 2017/0327219 | A1 | 11/2017 | Alber | |
| 2018/0002026 | A1 | 1/2018 | Oldroyd | |
| 2018/0050792 | A1 | 2/2018 | Robertson | |
| 2018/0079487 | A1 * | 3/2018 | Ivans | B64C 27/50 |
| 2018/0312251 | A1 * | 11/2018 | Petrov | B64U 30/12 |
| 2019/0031334 | A1 * | 1/2019 | McCullough | B64C 29/02 |
| 2019/0135427 | A1 * | 5/2019 | Robertson | B64C 11/28 |
| 2019/0210724 | A1 * | 7/2019 | Bublitsky | B64C 37/00 |
| 2019/0276129 | A1 * | 9/2019 | Morgan | B64U 10/25 |
| 2020/0062384 | A1 * | 2/2020 | McCullough | B64U 30/20 |
| 2020/0130831 | A1 * | 4/2020 | Luca | B64C 9/34 |
| 2020/0140079 | A1 * | 5/2020 | Campbell | B64C 29/0033 |
| 2020/0216255 | A1 * | 7/2020 | Sachdev | B65D 81/368 |
| 2020/0277069 | A1 * | 9/2020 | Rainville | B64U 10/16 |
| 2020/0313209 | A1 | 10/2020 | Rainville | |
| 2021/0061437 | A1 * | 3/2021 | Daandels | B64C 3/50 |
| 2021/0197965 | A1 * | 7/2021 | Kunz | B64C 29/0025 |
| 2021/0206456 | A1 * | 7/2021 | Werner | B63B 32/50 |
| 2021/0215518 | A1 * | 7/2021 | Rufo | G06F 8/61 |
| 2021/0309351 | A1 * | 10/2021 | Giannini | B60L 53/24 |
| 2022/0041263 | A1 * | 2/2022 | Rainville | H01M 8/0267 |
| 2022/0144421 | A1 * | 5/2022 | Rimanelli | B64C 29/0033 |
| 2022/0204152 | A1 | 6/2022 | Campbell | |
| 2022/0227477 | A1 * | 7/2022 | Grimm | B64C 39/068 |
| 2022/0315216 | A1 * | 10/2022 | Kaplinsky | B64D 27/24 |
| 2022/0371728 | A1 | 11/2022 | Hirabayashi | |
| 2023/0025366 | A1 * | 1/2023 | Bianco Mengotti | B64D 27/24 |
| 2023/0348082 | A1 * | 11/2023 | Wiegman | B64D 27/24 |

FOREIGN PATENT DOCUMENTS

| | | |
|---|---|---|
| CN | 211592903 | 9/2020 |
| CN | 113955092 | 9/2023 |
| EP | 3243747 | 7/2019 |
| JP | 2020183159 | 11/2020 |
| WO | 2023073710 | 5/2023 |

* cited by examiner

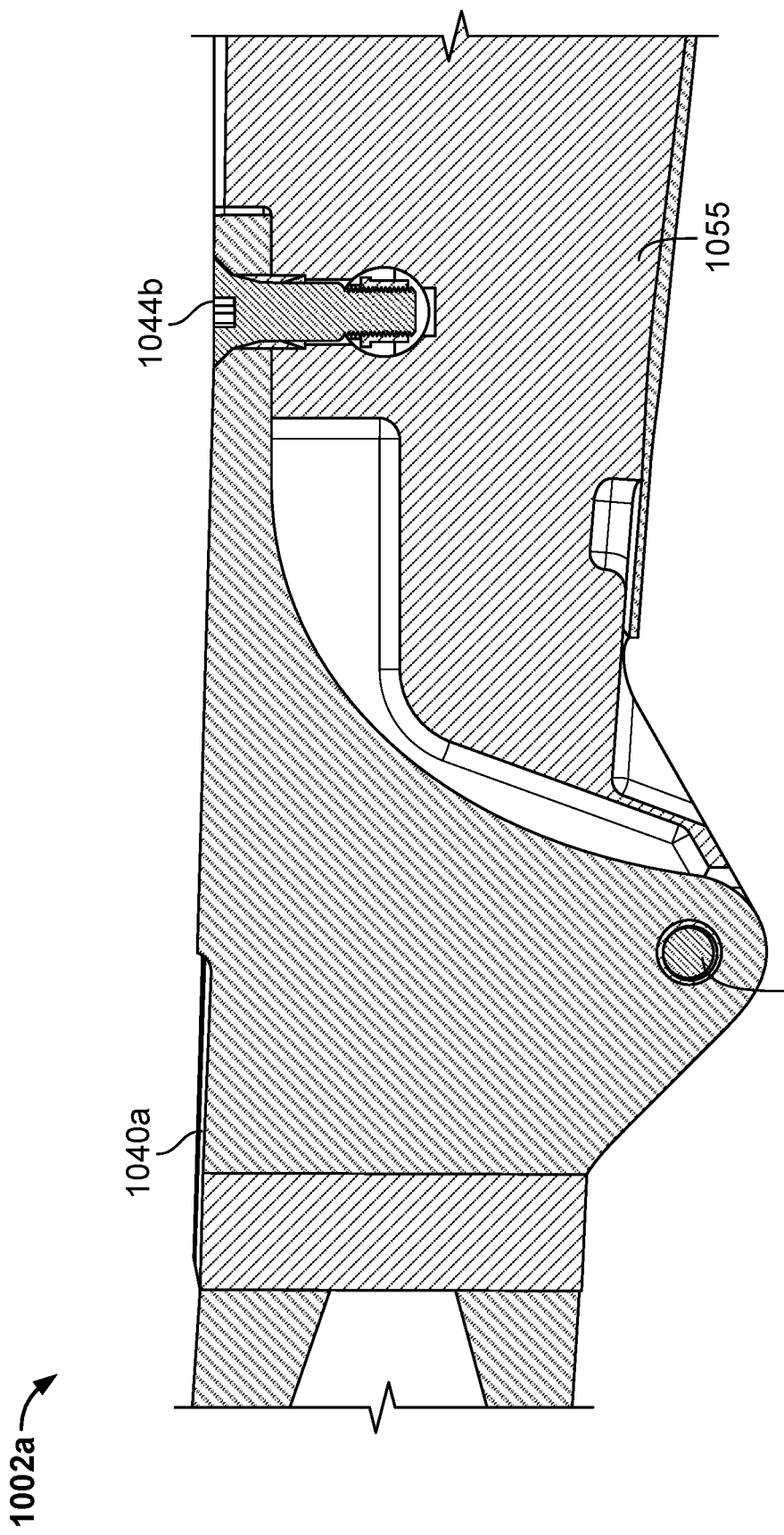

STEP 1475

STEP 1477

STEP 1479

STEP 1481

STEP 1483

STEP 1485

STEP 1487

STEP 1489

STEP 1491

STEP 1493

STEP 1495

STEP 1560

STEP 1562

STEP 1564

STEP 1566

STEP 1568

STEP 1570

STEP 1572

STEP 1574

STEP 1576

STEP 1578

STEP 1580

STEP 1582

STEP 1588

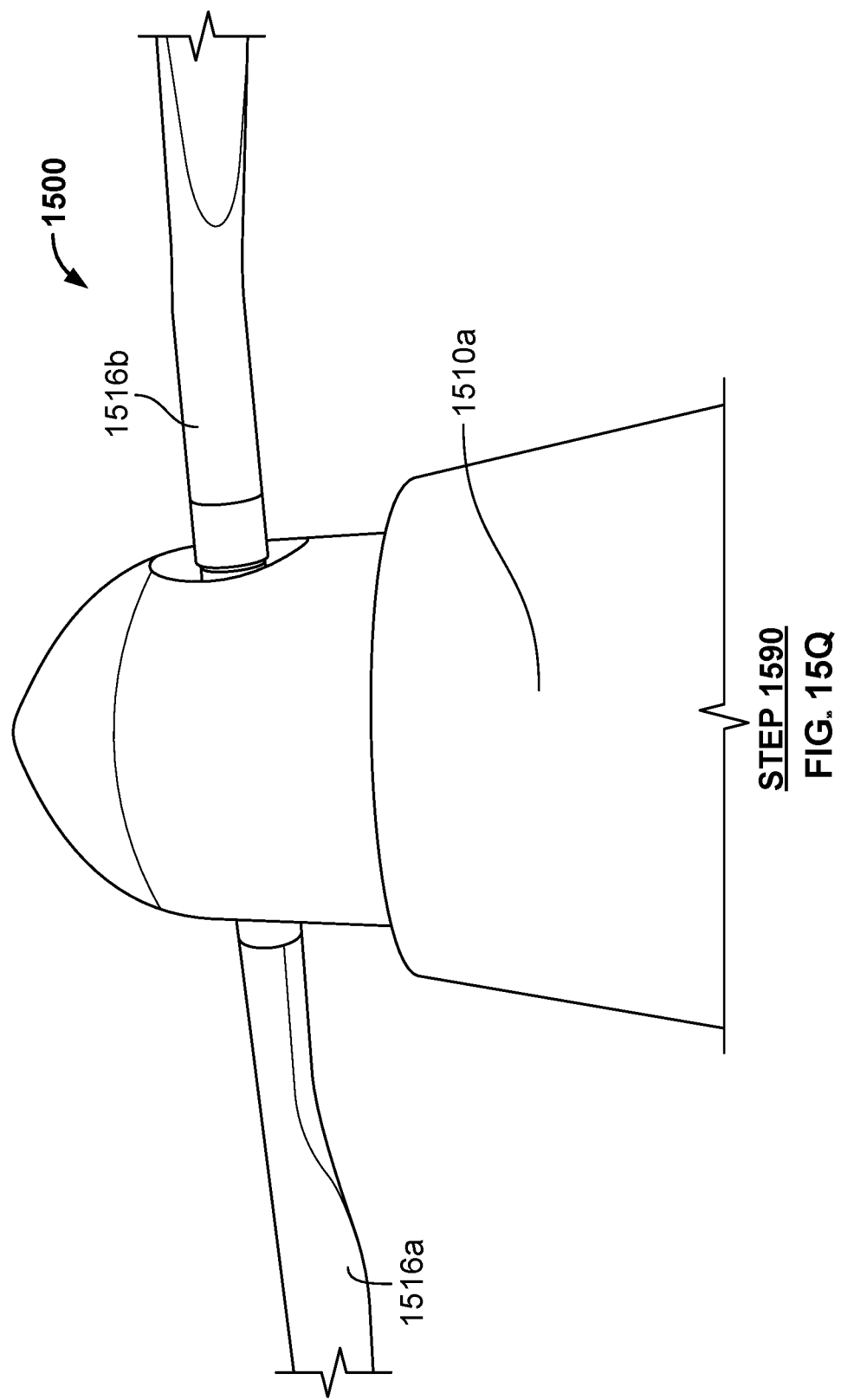

STEP 1594

DUAL ENGINE VERTICAL TAKE OFF AND LANDING COLLAPSIBLE FIXED WING AIRCRAFT

CROSS REFERENCE TO OTHER APPLICATIONS

This application claims priority to U.S. Provisional Patent Application No. 63/444,080 entitled DUAL ENGINE VERTICAL TAKE OFF AND LANDING COLLAPSIBLE FIXED WING AIRCRAFT filed Feb. 8, 2023 which is incorporated herein by reference for all purposes.

BACKGROUND OF THE INVENTION

Fixed wing aircraft generally take flight by travelling horizontally across a runway until the wings of the aircraft are subject to sufficient lift. The requirement of a runway for fixed wing aircraft to take flight restricts the locations from which the aircraft can be deployed. In the case of autonomous drones, in order to be deployed at a location far from a source location, such as across a continent or on another continent, the aircraft generally is transported on a larger vessel (e.g., a cargo aircraft or a ship). The use of the larger vessel to transport the aircraft restricts the size of the aircraft.

BRIEF DESCRIPTION OF THE DRAWINGS

Various embodiments of the invention are disclosed in the following detailed description and the accompanying drawings.

FIG. 10C is a diagram of a connection between a wing and a center wing of an aircraft according to various embodiments.

DETAILED DESCRIPTION

Figure 1:
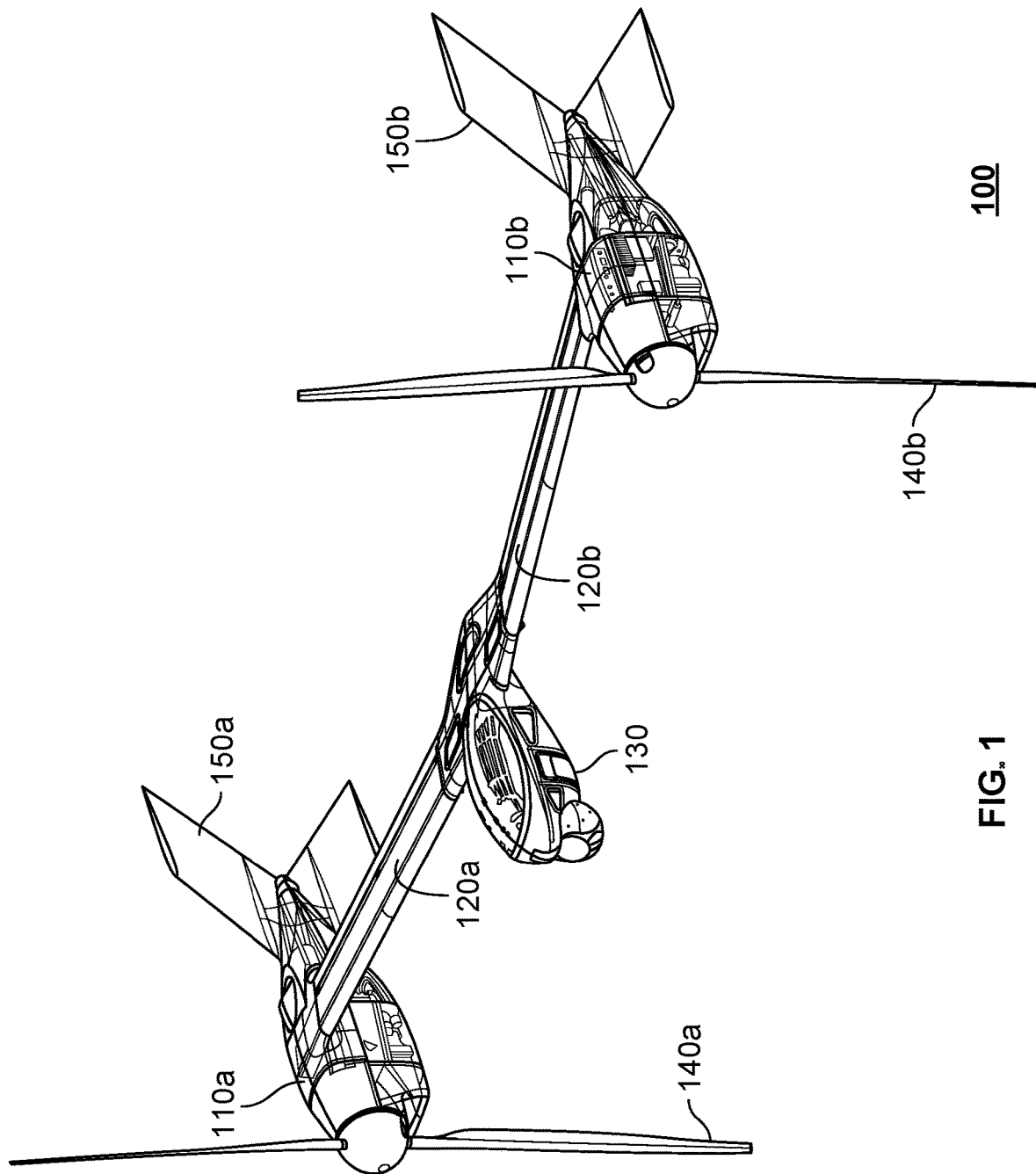
FIG. 1 is a perspective diagram of an aircraft according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, an aircraft comprises a vehicle that is able to fly. The aircraft may be manned or an autonomous vehicle (e.g., a drone). The aircraft has wings that when in an assembled state remain fixed relative to the central module (e.g., fuselage or otherwise the wing platform/fuselage mount). In some embodiments, the aircraft is configured to take-off and/or land from a vertical position. In some embodiments, the aircraft is configured to be assembled/disassembled for transport to a location for deployment.

Various embodiments disclose an aircraft that is runway independent. In some embodiments, the aircraft is a fixed-wing aircraft that is configured to take flight vertically and to land vertically. For example, the aircraft takes flight with the cockpit or central body directed towards the sky. In some embodiments, the aircraft is configured to take-off vertically and implement a transition to horizontal flight. The aircraft may include one or more nacelles that are fixed relative to an aircraft body and remain fixed during the transition from vertical-to-horizontal flight or horizontal-to-vertical flight. In some embodiments, the aircraft has two nacelles separated by a fixed wing. In some embodiments, the aircraft has two nacelles separated by fixed wings with a center fuselage. In some embodiments, the aircraft has two nacelles each with engines to turn propellers for the aircraft, where the nacelles are each connected to a central fuselage by fixed wings, where the central fuselage includes a fuel storage tank.

Various embodiments disclose an aircraft. The aircraft comprises a first wing and a second wing, and a first nacelle and a second nacelle (also referred to herein as engine nacelles) that are fixedly mounted to the wings during vertical take-off and horizontal flight. In some embodiments, the aircraft vertically takes off and transitions to a horizontal flight mode, and the orientation of the nacelles remains static during both take-off and horizontal flight mode (e.g., the orientation of the nacelles is not changed during the transition from vertical flight to horizontal flight. In some embodiments, the nacelles are detachable for disassembly and transport of the aircraft.

Various embodiments disclose an aircraft. The aircraft includes (i) a fuselage mount coupled to a first wing via a first hinge and a second wing via a second hinge, (ii) a fuselage detachably or hinge mounted on the fuselage mount, (iii) a first engine nacelle detachably mounted on an end of the first wing distal from the fuselage, and (iv) a second engine nacelle detachably mounted on an end of the second wing distal from the fuselage.

In some embodiments, the fuselage is integral with the center wing and the fuselage is connected to the first wing and the second wing via a fuselage mount. For example, the first wing and the second wing may be coupled to the fuselage mount via hinges. The first wing and the second wing are rotated to extend the wings and the fuselage is mounted to the fuselage mount, which is located between the first wing and the second wing when the wings are in an extended state. The fuselage mount may comprise a bracket to which the fuselage (e.g., the fuselage and the center wing) are connected, such as via one or more bolts.

In some embodiments, the fuselage and the center wing are distinct components when the aircraft is in a disassembled state. The first wing and the second wing are coupled to the center wing via hinges. During assembly, the fuselage is fixedly mounted to the center wing. The first wing and the second wing are then rotated into position with respect to the center wing and fuselage and then secured into a fixed position with respect to the center wing and fuselage.

In some embodiments, the fuselage and a center wing may be coupled via a hinge and assembling the fuselage and center wing may include rotating the fuselage around an axis defined by the hinge between the fuselage and the center wing. The first wing and the second wing are then rotated into position with respect to the center wing and fuselage and then secured into a fixed position with respect to the center wing and fuselage.

In some embodiments, the aircraft includes a control computer and a control circuit. The control computer is configured to control the aircraft to vertically take-off, control the aircraft to transition from vertical take-off mode to horizontal flight mode, and control the aircraft for horizontal flight. The control computer may be further configured to control delivery of fuel from a fuselage fuel reservoir to nacelle fuel reservoirs, such as in connection with re-supplying the nacelle fuel reservoirs and/or maintaining a balance of the aircraft (e.g., by distributing the weight of the fuel between the nacelle fuel reservoir in the first nacelle and the nacelle fuel reservoir in the second nacelle. As an example, the control computer is comprised in the fuselage of the aircraft. The control computer is connected to a first proprotor corresponding to the first engine nacelle and a second proprotor corresponding to the second engine nacelle. In some embodiments, the first engine nacelle and the first wing respectively comprise first mating components that enable a first blind mate connection of the control circuit between the first engine nacelle and the first wing, and the second engine nacelle and the second wing respectively comprise second mating components that enable a second blind mate connection of the control circuit between the second engine nacelle and the second wing.

According to various embodiments, the aircraft is configured to be disassembled or collapsed in a manner according to which the collection of aircraft components may fit within a predefined volume. For example, the aircraft may be disassembled/collapsed, such as for transit of the aircraft to a distant location (e.g., another side of a continent, another continent, an island, etc.), and all (or substantially all) components for the aircraft fit within a standard envelope/volume (e.g., a box or pallet). As an example, the standard envelope/volume may be a V-22 cargo envelope. As another example, the predefined volume fits within a cargo bay for a transport vessel. In the case of the transport vessel being a V-22 vehicle, the predefined volume fits within a volume having 5.7-foot width by 5.5-foot height by 20.8 foot long.

In some embodiments, the aircraft is designed such that each component fits within dimensional constraints of the envelope/volume (e.g., box or pallet) in which the aircraft is to be stored/transported. In some embodiments, the aircraft is designed so that the first wing, the second wing, the fuselage, the first engine nacelle, and the second engine nacelle fit within the dimensional constraints of the envelope/volume. In some embodiments, the aircraft is designed so that the first wing, the second wing, the fuselage, the first proprotor, the second proprotor, the first engine nacelle, and the second engine nacelle fit within the dimensional constraints of the envelope/volume.

In some embodiments, the aircraft has a wingspan that is greater than or equal to 16 feet. In some embodiments, the aircraft has a wingspan that is about 19 feet.

In some embodiments, the aircraft comprises one or more proprotors that have a diameter of at least 9 feet.

In some embodiments, the aircraft has a range of at least 800 nautical miles with a thirty-pound payload. The aircraft may have a range of at least 1300 nautical miles with a thirty-pound payload. The aircraft may have an endurance of at least 10 hours with a thirty-pound payload. The aircraft has an endurance of at least 14 hours with a thirty-pound payload.

In some embodiments, the aircraft is configured to be disassembled/collapsed in a manner that facilitates rapid deployment. The aircraft may be loaded on a transport vessel, which carries the aircraft to a destination location, and at the destination location the aircraft is quickly assembled and launched. In some embodiments, the components for the disassembled aircraft are placed (e.g., mounted) to various elements of a cart that may be pushed/pulled to an assembly location. At least a subset of the elements is movable, such as relative to a base and/or wheels of the cart, and one or more of the subset of the elements are manipulated/actuated to cause corresponding components of the disassembled aircraft to move to predefined positions at which various components are manipulated manually or with mechanical assistance to obtain an assembled aircraft. The subset of the elements is configured to move between respective disassembled states (e.g., states at which the elements are positioned when the cart is to be contained in an envelope, such as for transportation) and assembly states (e.g., states at which the elements are positioned during assembly of the aircraft, such as a position at which a first component is to be connected to a second component). In response to determining that the aircraft is fully assembled, the cart is removed (e.g., moved away from the assembled aircraft to allow the aircraft sufficient space for launch). In some embodiments, the cart is a robot that can automatically perform a number of the steps required for assembly of the aircraft.

The deployment and assembly of the aircraft according to various embodiments improves related art fixed-wing aircraft. For example, the aircraft can be moved to a launch site, quickly assembled, and launched without the need for a runway/landing strip. Further, because the aircraft can be transported in a disassembled state, the overall/assembled size of the aircraft can be larger because any one component can be sized according to the most favorable dimension of the transport envelope. For example, if the envelope length is larger than the envelope width, the wing length of the aircraft can be larger/constrained by the envelope length rather than envelope width if the disassembled aircraft is configured to include the wings positioned such that the wing length is substantially in the same direction as the envelope length.

In some embodiments, the aircraft is designed to maximize airborne range while minimizing footprint in ground transport and storage. These capabilities directly support commercial applications in the field of oil and gas pipeline surveillance, coastal water surveillance, and organ transportations, in that the vehicle can be readily launched, recovered, and stored apart from traditional airstrip infrastructure while carrying out extended range/endurance missions that are ideal for unmanned aircraft systems (UAS). These same capabilities also directly support military intelligence, surveillance, and reconnaissance (ISR) missions, where launch and recovery infrastructure may be similarly limited.

FIGS. 1-4 are respectively a perspective, side-view, top-view, and front-view diagrams of an aircraft according to various embodiments. As shown in FIG. 1, aircraft 100 comprises fixed wings, first wing 120a and second wing 120b. First wing 120a and second wing 120b are mounted (e.g., fixedly mounted) to fuselage 130. Aircraft 100 further comprises first nacelle 110a and second nacelle 110b comprising propulsion systems that operate to take-off, land, or fly aircraft 100. In some embodiments, aircraft 100 comprises winglets, such as first winglet 150a and second winglet 150b.

In some embodiments, aircraft 100 is configured to vertically take-off and/or land. First nacelle 110a and/or second nacelle 110b may include landing module(s). For example, aircraft 100 rests on a first landing module comprised in first nacelle 110a and second landing module comprised in second nacelle 110b with the length of fuselage 130 extending vertically. The first landing module and the second landing module may fold into first nacelle 110a and second nacelle 110b, respectively, which allows the landing gear to cause low drag during flight operation. For example, the landing module folds into winglets (e.g., first winglet 150a, second winglet 150b) of first nacelle 110a and second nacelle 110b. As another example, propulsion systems (e.g., proprotor 140a and proprotor 140b) are positioned at one end of a nacelle (e.g., nacelle 110a and nacelle 110b) and the landing gear is positioned within the tail assembly that includes the winglets (e.g., winglet 150a and winglet 150b) at the other end of the tail assembly. In some embodiments, aircraft 100 is enabled to rest on the ground with the proprotors at the top and the landing gear positioned at the bottom/on the ground.

The lengths of first nacelle 110a and second nacelle 110b are constrained by the distance between the end of the nacelle and the ground when the aircraft is facing upwards for take-off/landing. The landing module folds out of first nacelle 110a and second nacelle 110b (e.g., first winglet 150a, second winglet 150b). Accordingly, if the nacelles are too short, the landing modules (e.g., landing gear). may not have sufficient track and thus lead to instability when the vehicle is resting on the landing modules. For example, the track of the landing module should be sufficiently long to ensure that aircraft 100 does not fall over when resting on the landing module. In addition, the nacelles and/or landing module are configured to have a length to provide sufficient clearance for all payloads that are carried by (e.g., mounted to) aircraft 100.

In some embodiments, the airframe design (e.g., shape of first wing 120a, second wing 120b, first nacelle 110a, and/or second nacelle 110b) is configured to balance performance during vertical take-off/landing and performance during horizontal cruise. For example, the airframe is designed to provide a good (e.g., a stable) transition from vertical take-off mode to horizontal cruise mode (or from horizontal cruise mode to vertical landing mode). Certain components of aircraft 100 may be selected based on stiffness and/or strength required to withstand the forces during vertical take-off and horizontal cruise. For example, the wings or nacelles may comprise composite materials (e.g., fiberglass, Hexply® M77 prepreg, etc.). The airframe further includes clean/mechanical joints between components (e.g., the wing-nacelle interface or wing-fuselage interface), which are also low drag. According to various embodiments, the joints/interfaces between components are designed to optimize (e.g., minimize) drag.

In some embodiments, the joints between components in aircraft 100 are optimized to balance performance during take-off/flight and support for a quick assembly. For example, various embodiments include wings (e.g., first wing 120a, second wing 120b) that are hinged with respect to the center wing and/or fuselage 130. In a disassembled state, the wings are folded inwards to form a horseshoe shape with the center wing of fuselage 130. Thus, rapid deployment of aircraft 100 includes unfolding the wings and fixedly mounting the wings to fuselage 130 (e.g., to the center wing of fuselage 130). Although use of folding wings does not optimize aircraft 100 for weight, the folding wings facilitates use of a relatively stiffer/stronger joint for the wings.

First winglet 150a and second winglet 150b may comprise flight-control or communication components. For example, first winglet 150a and/or second winglet 150b may be configured to comprise (e.g., mounted on) an antenna such as vertically polarized antennae.

The propulsion system of aircraft 100 may be a jet engine, a piston engine, a gas turbine, a propeller, or a motor, such as an electric motor. Various other types of propulsion systems may be implemented. In some embodiments, the propulsion system comprises one or more proprotors. In the example shown, aircraft 100 comprises first proprotor 140a and second proprotor 140b.

In some embodiments, the proprotor (e.g., first proprotor 140a, second proprotor 140b, etc.) includes one or more blades that are removable. The length of the proprotors (e.g., the proprotor blades) is constrained by the length of the wing. For example, the length of the proprotor blade is less than the length of the wing to provide clearance between fuselage 130 and the proprotor. The one or more proprotors may respectively have at least two blades having a length of at least 5 feet. For example, first proprotor 140a comprises two blades having a length of 10 feet. The relatively large blades allow aircraft 100 to have a higher cruise speed than aircraft propelled by smaller blades. As an example, the blades are driven by an internal combustion engine (e.g., a heavy fuel internal combustion engine). As another example, the blades are driven by an electric motor. The use of blades for propulsion balances the need to be resilient while taking off vertically and cross winds that may occur during vertical take-off. For example, the proprotors include a two-motor swashplate on each rotor, which facilitate improved stability and resilient to cross winds. In some embodiments, the proprotor blades are mounted to the proprotor in a tool-less integration.

In some embodiments, aircraft 100 is configured to carry a payload. The payload may be mounted to fuselage 130 or the wings (e.g., first wing 120a and second 120b). Examples of payloads include cameras (e.g., electro-optical/infra-red (EO/IR) system), weapons, package, etc. Various other payloads may be implemented. Aircraft 100 may comprise one or more sensor mounts or payload mounts to which sensors or payloads are mounted. In the example shown in FIG. 2, aircraft 100 comprises EO/IR system 132 mounted to the chin of fuselage 130.

In some embodiments, aircraft 100 comprises an internal combustion engine. For example, aircraft 100 comprises a first internal combustion engine within first nacelle 110a and a second internal combustion engine within second nacelle 110b. First nacelle 110a and second nacelle 110b are detachably mounted to the wings (e.g., first wing 120a and second wing 120b). During assembly, the nacelles are respectively connected to the wing. The connection between the nacelles and the wings comprises a connection for one or more of fuel lines, communication lines (e.g., signals received via antennae in the winglet), and/or control systems (e.g., wiring for a system computer to control the various operations of aircraft 100, such as driving the engines or actuating the landing modules). In some embodiments, aircraft 100 comprises a fuel reservoir (e.g., a third fuel tank) in fuselage 130. Accordingly, fuel is transferred from fuselage 130 to the engines in the nacelles via fuel connections between the applicable nacelle and fuselage 130 that couple the fuel reservoir to the fuel lines or reservoirs in the wings. In some embodiments, aircraft 100 is able to balance the fuel weight by shifting fuel volume between fuselage 130, first nacelle 110a, and second nacelle 110b. In some embodiments, aircraft 100 is able to balance the fuel weight by shifting fuel volume between fuselage 130, first wing 120a, second wing 120b, first nacelle 110a, and second nacelle 110b In some embodiments, the connections between the nacelles and the wings are designed for optimization in assembly/disassembly. For example, aircraft 100 includes a secure and quick connection between the nacelles and the wings. As an example, the one or more connections between the nacelles and the wings (e.g., between first nacelle 110a and first wing 120a, etc.) comprises a blind mate connection.

In some embodiments, aircraft 100 comprises fuel reservoirs in the wings and/or nacelles. For example, a first fuel tank is located in first wing 120a and a second fuel tank is located in second wing 120b. Aircraft 100 may also comprise a fuel reservoir (e.g., the third fuel tank) in fuselage 130. Aircraft 100 comprises a control system (e.g., a computer) that manages delivery of fuel to the engines. The control system controls a use of fuel from the third fuel tank based at least in part on fuel consumption of fuel in the first fuel tank and the second fuel tank. The control system may control the use of fuel from the third fuel tank based on consumption of fuel in the first fuel tank relative to consumption of fuel in the second fuel tank. For example, the control system controls delivery of fuel to ensure that the first fuel tank and the second fuel tank comprise substantially the same amount of fuel (e.g., an amount of fuel within a threshold range). Delivery of the fuel from the third fuel tank to the first fuel tank and the second fuel tank can be used to ensure that aircraft 100 is balanced during flight.

Aircraft 100 comprises avionics (e.g., a control system) that controls operation of aircraft 100 during fight or take-off/landing. The avionics may be located in fuselage 130 and the mounting/connections for the nacelles to the wings and the wings to the fuselage or central wing (e.g., the fuselage mount) include connections for the avionics to control systems in the wings (e.g., antennae, engines, landing modules, delivery/release of payloads, etc.).

Figure 2:
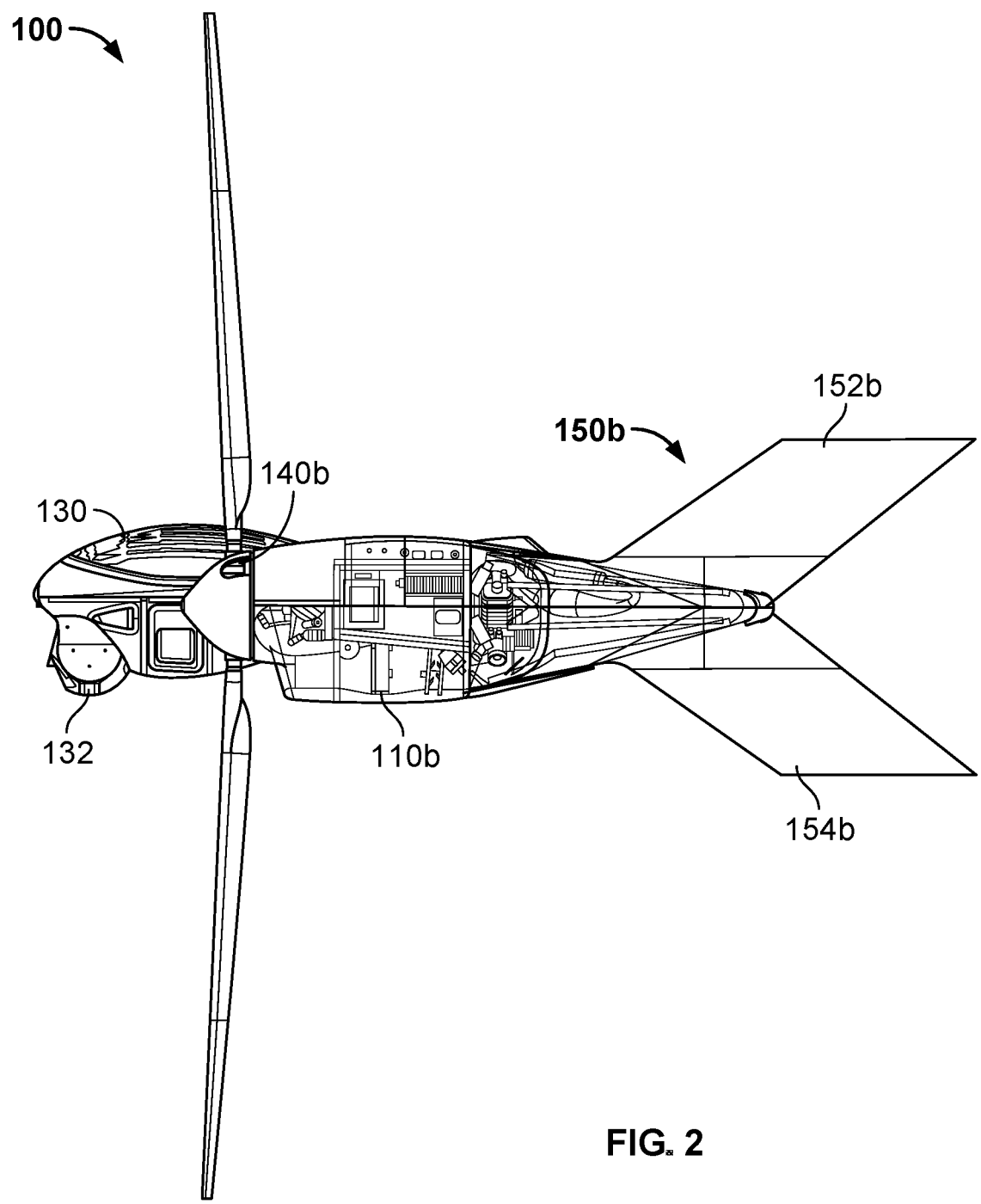
FIG. 2 is a side view diagram of an aircraft according to various embodiments.

In the example shown in FIG. 2, aircraft 100 comprises second winglet 150b comprised in, or connected to, second nacelle 110b or second wing 120b. Second winglet 150b comprises a second top winglet 152b and a second bottom winglet 154b. The winglets may comprise landing modules that are retracted (e.g., folded) into the winglets during flight, and extended during take-off or landing. Fuselage 130 includes EO/IR system 132 and is shown behind second nacelle 110b and is coupled to second wing 120b. Second nacelle 110b has at its front second proprotor 140b.

Figure 3:
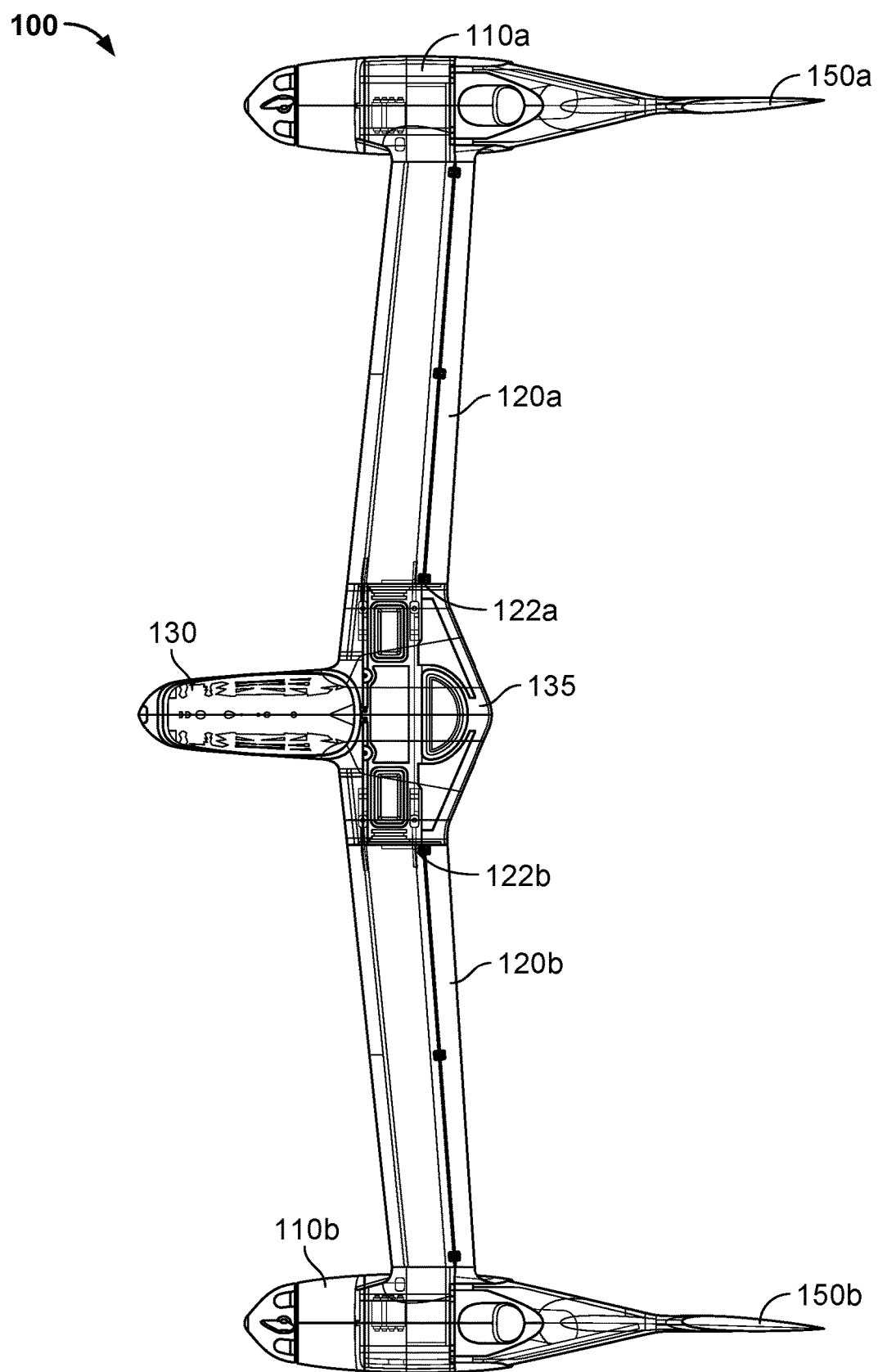
FIG. 3 is a top view diagram of an aircraft according to various embodiments.

In the example shown in FIG. 3, fuselage 130 is mounted to center wing 135. Center wing 135 serves as the nucleus of aircraft 100. For example, first wing 120a and second wing 120b are mounted (e.g., hingedly mounted) to center wing 135 via first wing hinge mount 122a and second wing hinge mount 122b. First wing 120a and second wing 120b may be folded relative to center wing 135 to create a horseshoe shape. During assembly, first wing 120a and second wing 120b are unfolded and rigidly mounted/connected to center wing 135. In some embodiments, fuselage 130 is hingedly mounted to center wing 135. For example, fuselage 130 may be folded into the space defined by (e.g., within) the horseshoe shape created by the folding of first wing 120a and second wing 120b relative to center wing 135. First nacelle 110a with first winglet 150a is coupled to first wing 120a at the end opposite being coupled to center wing 135. second nacelle 110b with winglet 150b is coupled to second wing 120b at the end opposite being coupled to center wing 135.

In some embodiments, aircraft 100 is configured to have a one-way range of 1000+ nautical miles. Aircraft 100 has an endurance of at least 10 hours. Aircraft is configured to carry a payload of at least 50 lbs. In some embodiments, aircraft 100 has a maximum speed of at least 147 knots.

In various embodiments, aircraft 100 has a wingspan of at least 15 feet, of at least 19 feet, of 18 feet, of 19 feet, or any other appropriate minimum length, length, or maximum length.

Figure 4:
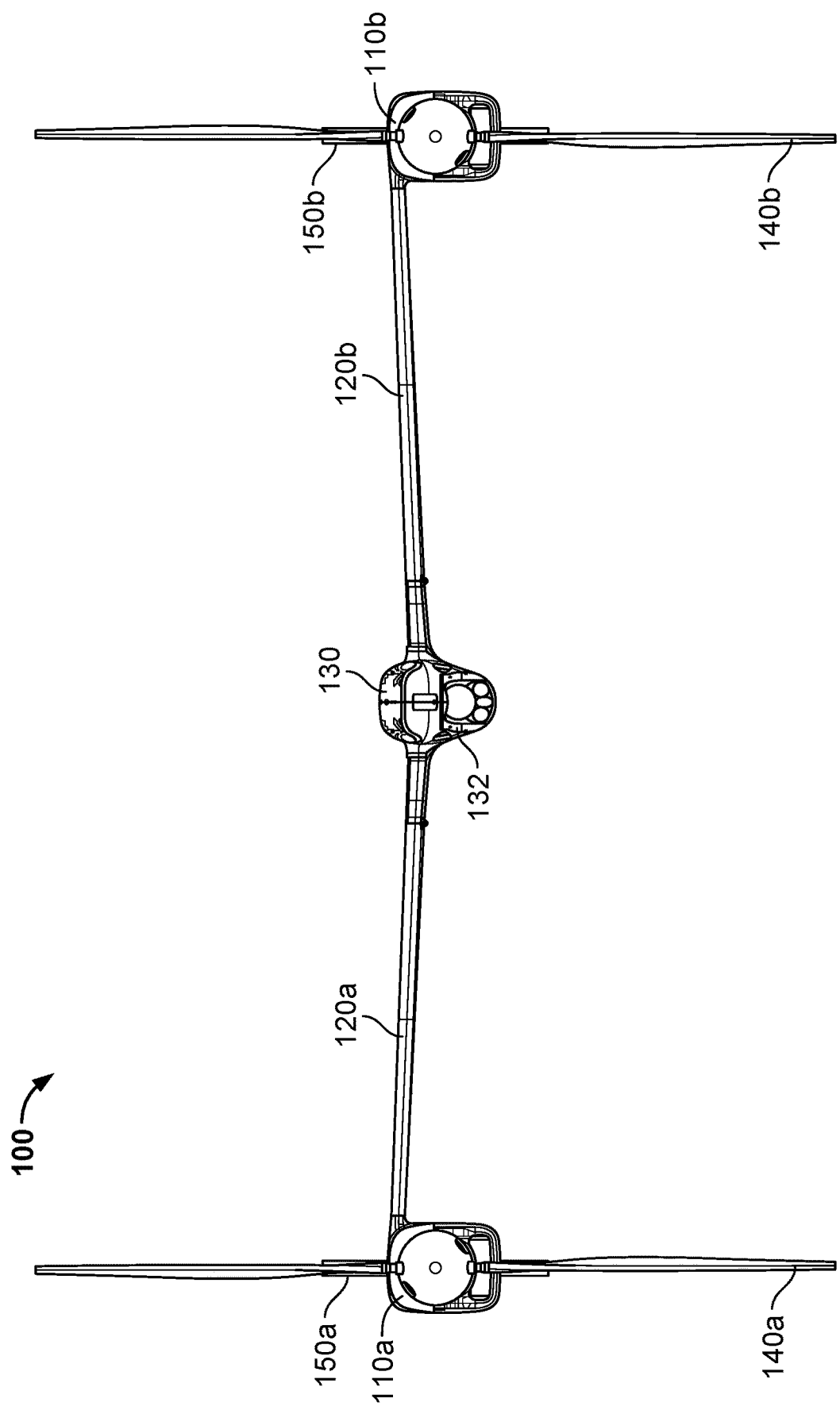
FIG. 4 is a front view diagram of an aircraft according to various embodiments.

In the example shown in FIG. 4, aircraft 100 comprises second winglet 150b comprised in, or connected to, second nacelle 110b or second wing 120b. Aircraft 100 comprises first winglet 150a comprised in, or connected to, first nacelle 110a or first wing 120a. The winglets may comprise landing modules that are retracted (e.g., folded) into the winglets during flight, and extended during take-off or landing. Fuselage 130 includes EO/IR system 132 and is shown coupled to second nacelle 110b via second wing 120b and coupled to first nacelle 110a via first wing 120a. Second nacelle 110b has at its front second proprotor 140b. first nacelle 110a has at its front first proprotor 140a.

Figure 5A:
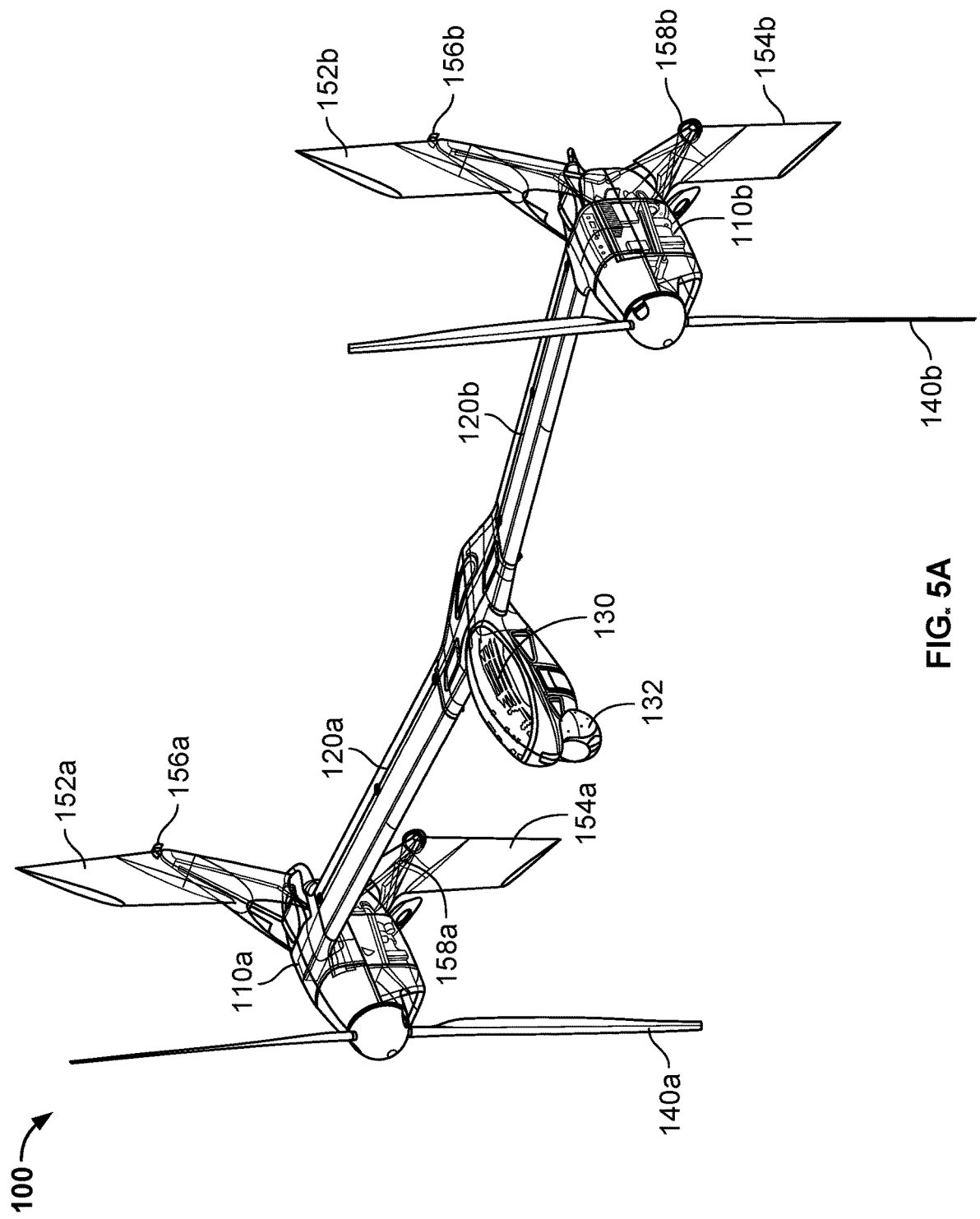
FIGS. 5A and 5B are a perspective view and a side view diagrams of an aircraft in a take-off state according to various embodiments
Figure 5B:
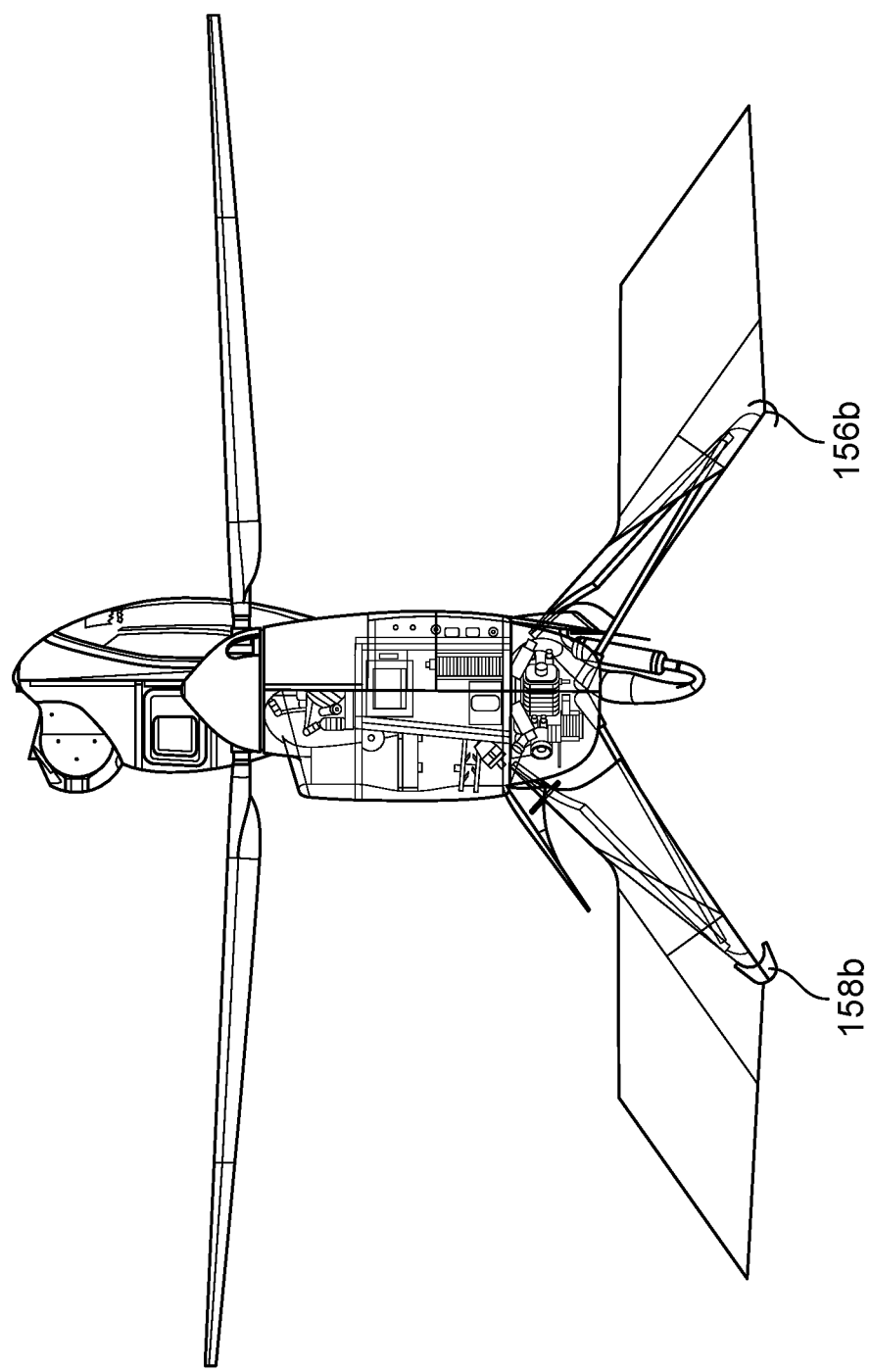

FIGS. 5A and 5B are a perspective view and a side view diagrams of an aircraft in a take-off state according to various embodiments. In some embodiments, aircraft 100 comprises a low-drag and lightweight landing module that may be extended during take-off or landing, as illustrated in FIGS. 5A and 5B.

In the example shown in FIGS. 5A and 5B, the landing module of first wing 120a (e.g., connected to first nacelle 110a or first top winglet 152a or first bottom winglet 154a) comprises first landing support member 156a and second landing support member 158a. Similarly, the landing module of second wing 120b (e.g., connected to second nacelle 110b or second top winglet 152b or second bottom winglet 154b) comprises third landing support member 156b and fourth landing support member 158b. As illustrated, first landing support member 156a and second landing support member 158a provide a wide stance when aircraft 100 is landed. For example, first landing support member 156a and second landing support member 158a comprise a panel design. The panels may be retracted during flight to ensure efficient drag management (e.g., first landing support member 156a and second landing support member 158a when in the retracted position—for example, a closed clam shell configuration—contribute low drag to aircraft 100). As illustrated, third landing support member 156b and fourth landing support member 158b provide a wide stance when aircraft 100 is landed. For example, third landing support member 156b and fourth landing support member 158b comprise a panel design. The panels may be retracted during flight to ensure efficient drag management (e.g., third landing support member 156b and fourth landing support member 158b when in the retracted position—for example, a closed clam shell configuration—contribute low drag to aircraft 100).

In some embodiments, the landing module is configured to be relatively expeditionary, such as to provide aircraft 100 with the ability to land/take-off on uneven terrain, odd ground surfaces, or otherwise challenging terrain. For example, first landing support member 156a and second landing support member 158a and/or third landing support member 156b and fourth landing support member 158b may be shaped to provide support on uneven or inclined ground surfaces.

Figure 6:
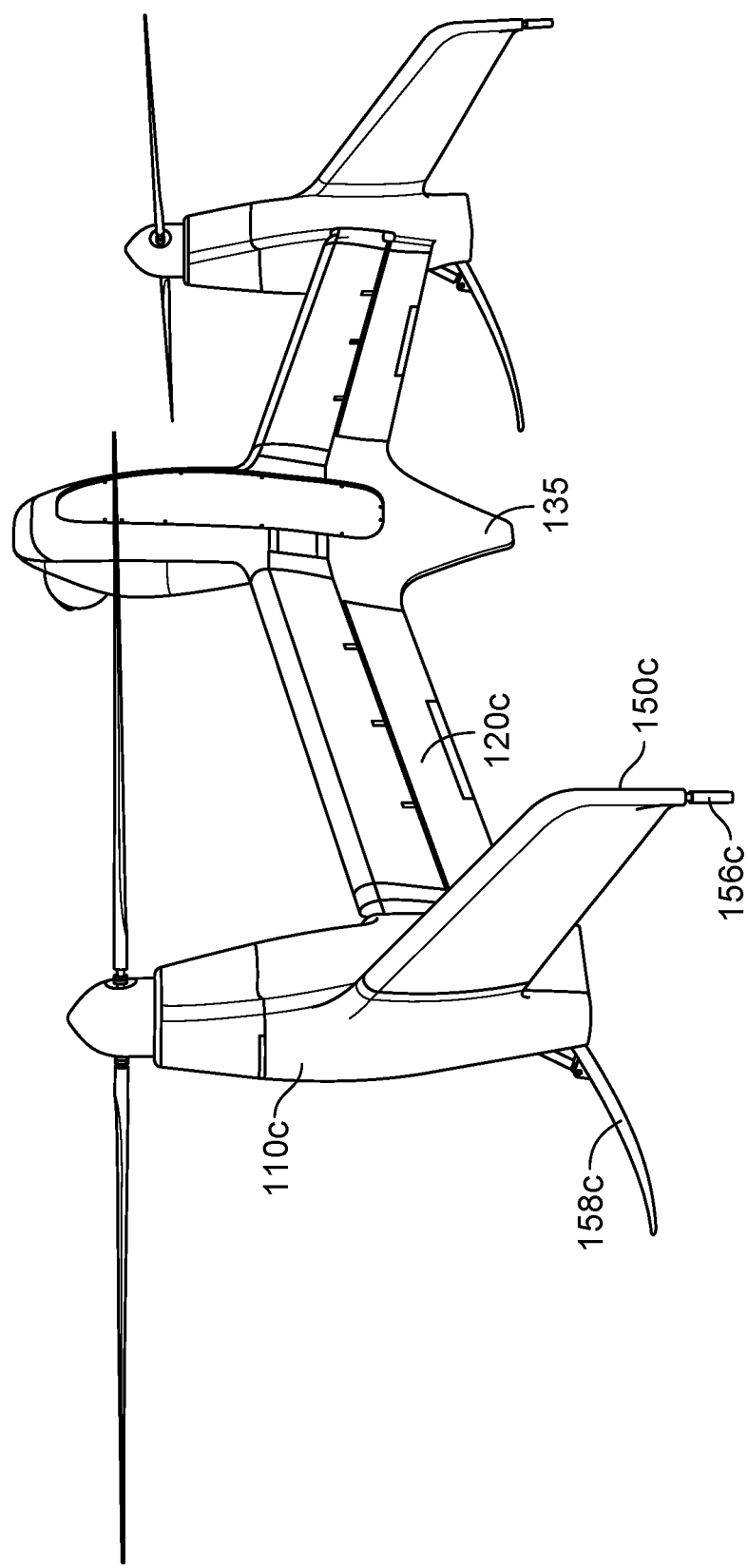
FIG. 6 is a perspective view diagram of an aircraft in a take-off state according to various embodiments.

FIG. 6 is a perspective view diagram of an aircraft in a take-off state according to various embodiments. In the example shown in FIG. 6, landing module of aircraft 100 comprises a pogo-stick design. Aircraft 100 comprises fifth landing support member 156c that extends vertically from winglet 150c. For example, fifth landing support member 156c extends perpendicularly from winglet 150c. In some embodiments, fifth landing support member 156c is retractable such that during take-off/landing the fifth landing support member 156c is extended, as shown in FIG. 6, and during flight fifth landing support member 156c is retracted into winglet 150c. In some embodiments, fifth landing support member 156c is fixedly mounted or integral with the winglet such that during flight fifth landing support member 156c remains extended. To reduce vehicle skid or the likelihood that aircraft 100 tips over, the landing module further includes sixth landing support member 158c. In some embodiments, sixth landing support member 158c member is curved or otherwise shaped to provide stability to aircraft 100 when landed. For example, sixth landing support member 158c is configured to extend from nacelle 110c or associated winglet 156c in a manner that fifth landing support member 156c and sixth landing support member 158c form a base of sufficient width to be stable when aircraft 100 is landed. Sixth landing support member 158c may be further shaped to cause low drag when retracted into nacelle 110c. For example, sixth landing support member 158c is shaped to match a curvature or shape of nacelle 110c (e.g., a bottom of nacelle 110c). Nacelle 110c is attached to wing 120c at one end and at the other end to center wing 135. Note in the example shown, winglet 150c is not symmetric about nacelle 110c (e.g., winglet 150c above nacelle 110c is not symmetric with, in this case, no winglet below nacelle 110c).

In some embodiments, the landing module (e.g., the landing support members) is configured to provide torsional dampening. The landing module balances flexibility versus stiffness to ensure that the landing module adequately supports aircraft 100 but is sufficiently flexible to allow aircraft to take-off/land from unconventional terrain (e.g., inclines, bumpy/uneven, etc.).

Figure 7A:
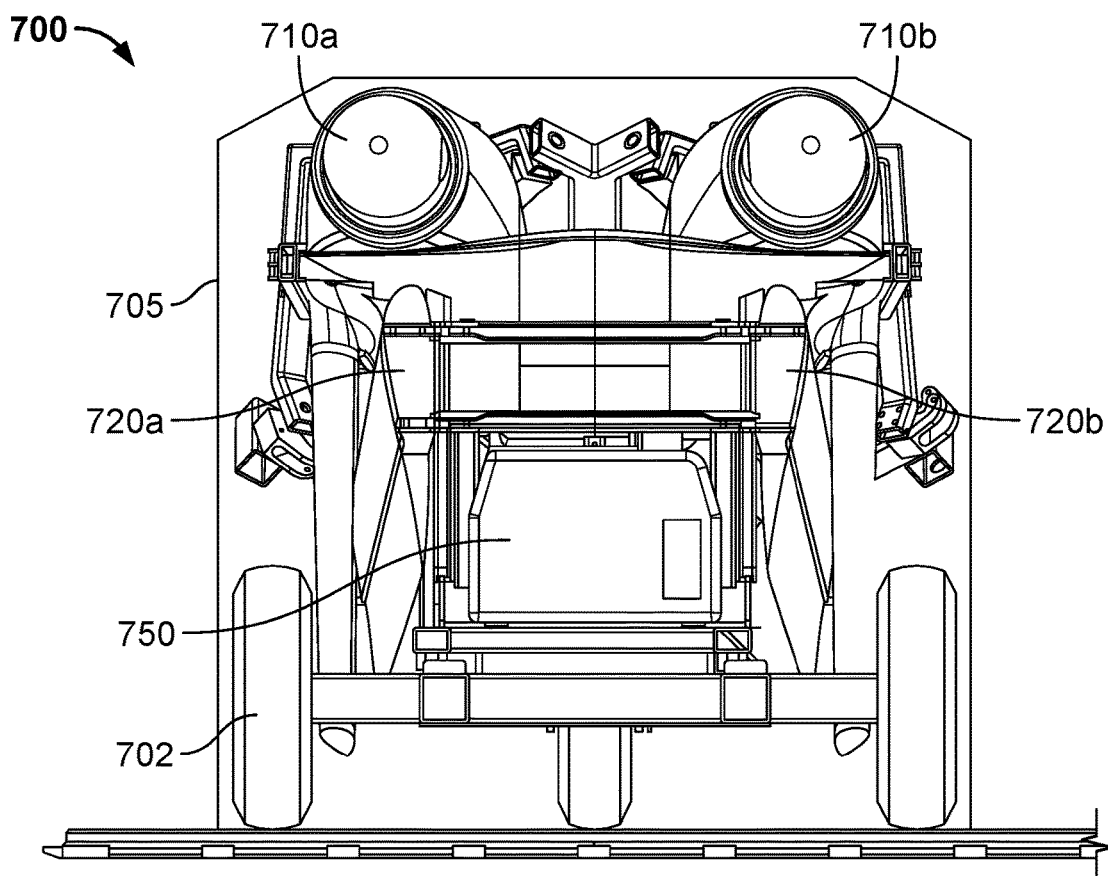
FIG. 7A is a front view of an aircraft in a disassembled state according to various embodiments.
Figure 7B:
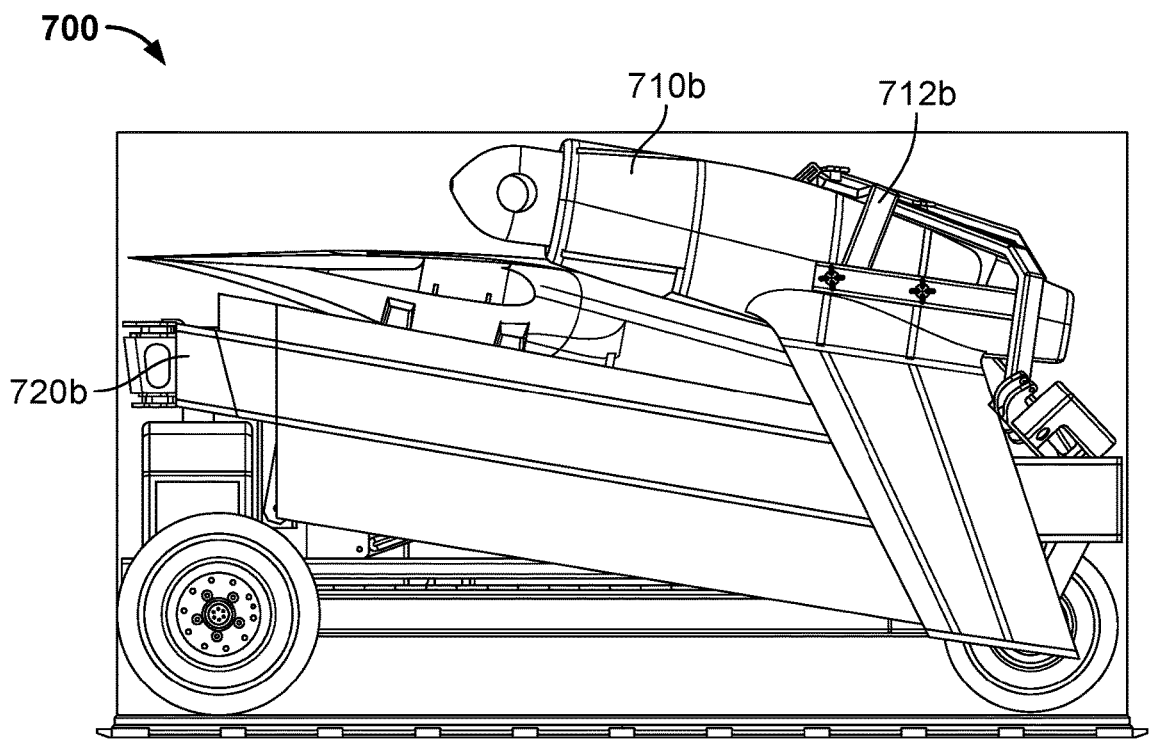
FIG. 7B is a side view of an aircraft in a disassembled state according to various embodiments.

FIGS. 7A and 7B are front view and side view view diagrams of an aircraft in a disassembled state according to various embodiments. In the example shown, aircraft 700 is configured in a disassembled state. The components for aircraft 700 are carried on cart 702. In some embodiments, the components collectively fit within envelope 705. As an example, dimensions of envelope 705 may be determined based on, or constrained by, dimensions of a cargo hold of a vessel in which aircraft 700 is to be transported.

As illustrated in FIGS. 7A and 7B, first nacelle 710a and second nacelle 710b are respectively detached from first wing 720a and second wing 720b and are placed/mounted on a nacelle support member (e.g., second nacelle support member 712b) of cart 702. In the disassembled state, first wing 720a and second wing 720b are folded around center wing 735. First wing 720a, second wing 720b, and center wing may be respectively mounted/supported by support members of cart 702. Fuselage is folded from center wing such that fuselage occupies the space between the folded first wing 720a and 720b. During assembly, first nacelle 710a is connected to first wing 720a via first nacelle support member on first wing 720a. Similarly, second nacelle 710b is connected to second wing 720b via second nacelle support member on second wing 720b. As an example, the nacelle support members on the wings are inserted into the corresponding nacelles and the nacelles are mounted (e.g., bolted) to the wings.

In some embodiments, cart 702 comprises (e.g., supports) fuel tank 750 that is used to supply aircraft 700 with fuel during assembly.

In some embodiments, cart 702 comprises support members that are controlled via motor or hydraulic piston to lift heavy components during assembly/disassembly. The hydraulic/motor support ensures that aircraft 700 is quickly assembled/disassembled and less resources (e.g., human operators or other support equipment, such as a portable crane, etc.). In some embodiments, the time from drop shipment to take-off is within 30 minutes. Aircraft 700 can be assembled in about 10 minutes.

As illustrated in FIGS. 7A and 7B, aircraft 700 in a disassembled state is relative compact relative to dimensions of the expanded aircraft 700 (e.g., in an assembled state).

According to various embodiments, the aircraft is designed to include interfaces between components that balance minimizing drag (e.g., have drag contributions less than a predefined draft threshold) and facilitating quick and easy assembly/disassembly. In some embodiments, certain components are mounted via a hinge so that assembly/disassembly includes merely manipulating an interface bolt and rotating the component to transition between a disassembled state and an assembled state.

Figure 7C:
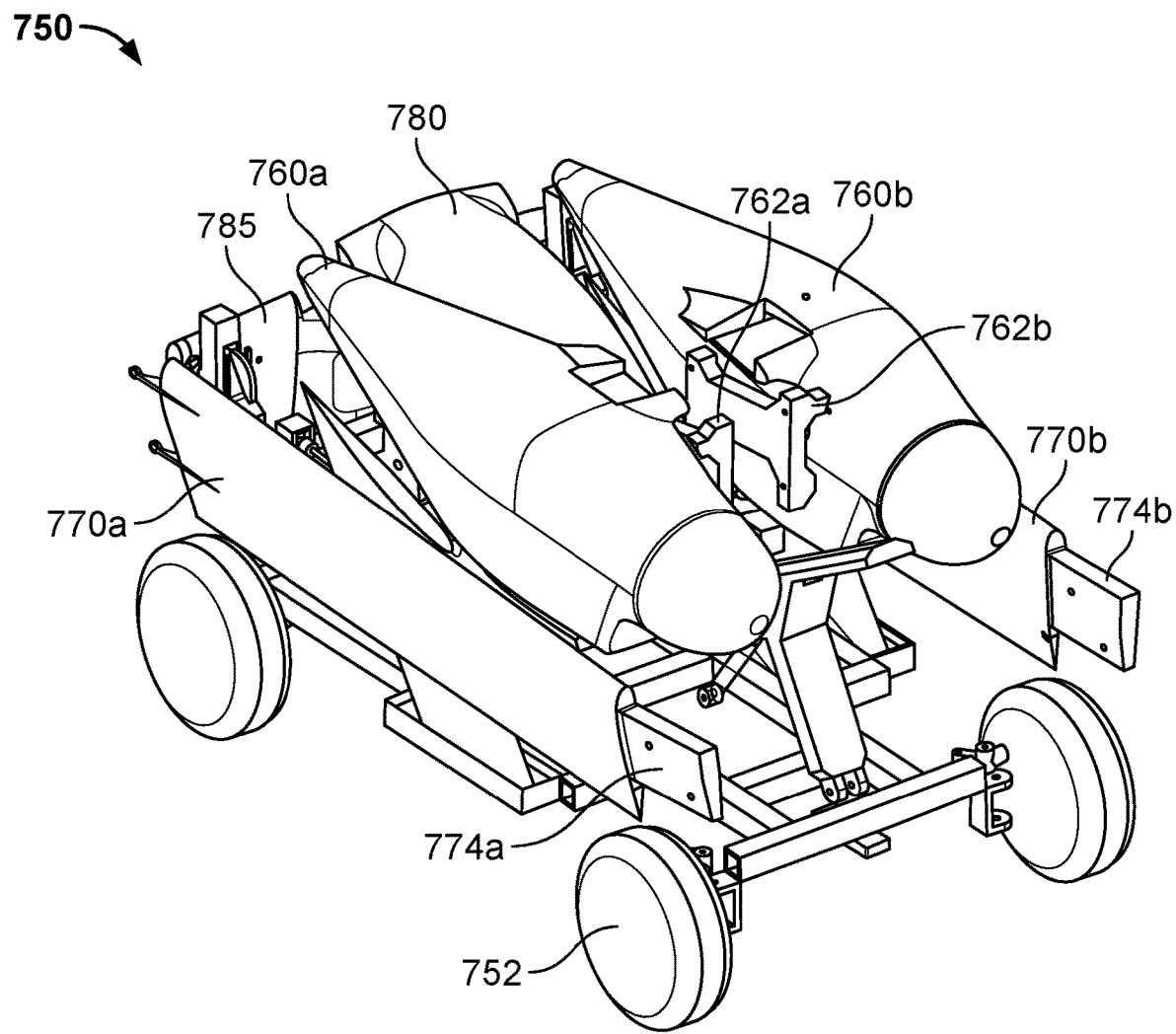
FIG. 7C is a perspective view of an aircraft in a disassembled state according to various embodiments.

FIG. 7C is a diagram of an embodiment of an aircraft in a disassembled state. Cart In the example shown, first nacelle 760a and second nacelle 760b are respectively detached from first wing 770a and second wing 770b and are placed/mounted on a nacelle support member (e.g., first nacelle support member 762a and second nacelle support member 762b) of cart 752. In the disassembled state, first wing 770a and second wing 770b are folded around center wing 785. First wing 770a, second wing 770b, and center wing 785 may be respectively mounted/supported by support members of cart 752. Fuselage 780 is folded from center wing 785 such that fuselage occupies the space between the folded first wing 770a and 770b. During assembly, first nacelle 760a is connected to first wing 770a via first nacelle support member 774a on first wing 770a. Similarly, second nacelle 760b is connected to second wing 770b via second nacelle support member 774b on second wing 770b. As an example, the nacelle support members on the wings are inserted into the corresponding nacelles and the nacelles are mounted (e.g., bolted) to the wings.

In some embodiments, cart 752 comprises support members that are controlled via motor or hydraulic piston to lift heavy components during assembly/disassembly. The hydraulic/motor support ensures that aircraft 750 is quickly assembled/disassembled and less resources (e.g., human operators or other support equipment, such as a portable crane, etc.). In some embodiments, the time from drop shipment to take-off is within 30 minutes. Aircraft 750 can be assembled in about 10 minutes.

As illustrated in FIG. 7C, aircraft 750 in a disassembled state is relative compact relative to dimensions of the expanded aircraft 750 (e.g., in an assembled state).

According to various embodiments, the aircraft is designed to include interfaces between components that balance minimizing drag (e.g., have drag contributions less than a predefined draft threshold) and facilitating quick and easy assembly/disassembly. In some embodiments, certain components are mounted via a hinge so that assembly/disassembly includes merely manipulating an interface bolt and rotating the component to transition between a disassembled state and an assembled state.

Figure 7D:
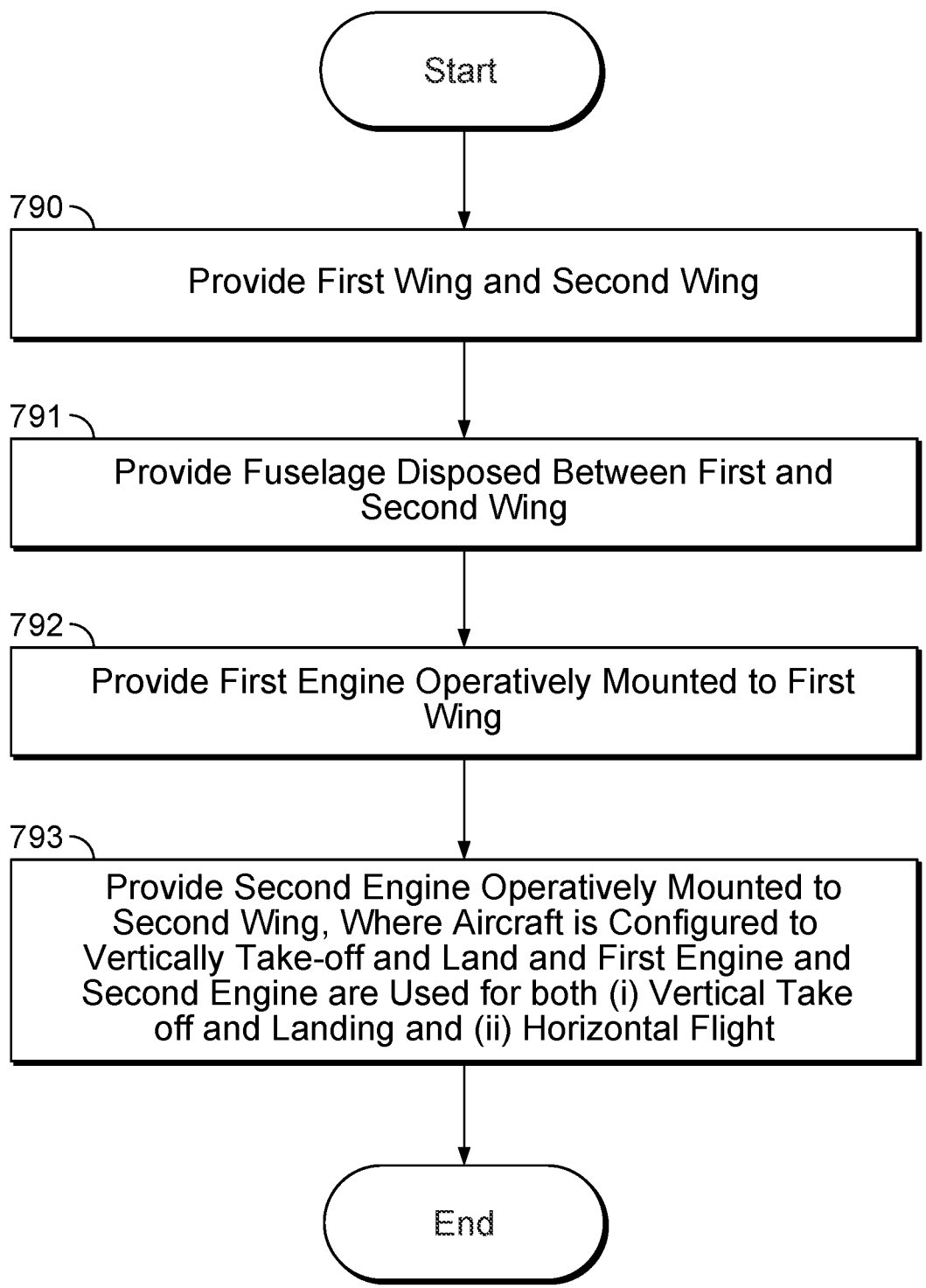
FIG. 7D is a flow diagram illustrating an embodiment of a process for providing an aircraft.

FIG. 7D is a flow diagram illustrating an embodiment of a process for providing an aircraft. In the example shown, in 790 a first wing and a second wing are provided. In 791, a fuselage disposed between the first wing and the second wing is provided. In 792, a first engine operatively mounted to the first wing is provided. In 793, a second engine operatively mounted to the second wing, where the aircraft is configured to vertically take-off and land and the first engine and the second engine are used for one or more of the following: (i) vertical take-off and landing and (ii) horizontal flight. In some embodiments, the orientation of the first engine and the second engine relative to the fuselage is equivalent for both (i) vertical take-off and/or landing and (ii) horizontal fight. In some embodiments, the first wing is coupled to a fuselage or a center wing by a first hinge. In some embodiments, the second wing is coupled to a fuselage or a center wing by a second hinge. In some embodiments, the first wing and the second wing are collapsible with respect to the fuselage mount or the center wing. In some embodiments, the first wing is coupled to a fuselage mount by a first hinge; the second wing id coupled to the fuselage by a second hinge; and the fuselage is detachably mounted to the fuselage mount. In some embodiments, the first wing is coupled to a center wing by a first hinge; the second wing is coupled to the fuselage by a second hinge; and the fuselage is coupled to the center wing by a third hinge. In some embodiments, the first wing and the second wing are collapsible to form a horseshoe shape with the center wing when the aircraft is in a disassembled state. In some embodiments, the fuselage is rotated around an axis defined by the third hinge to position the fuselage in a space defined by the first wing and the second wing when the first wing and the second wing are folded. In some embodiments, the first engine is comprised in a first engine nacelle that is detachably mounted to the first wing, and the second engine is comprised in a second engine nacelle that is detachably mounted to the second wing. In some embodiments, an interface between the first wing and the first engine nacelle comprises a blind mate connection that connects one or more of an electrical system and a fuel line. In some embodiments, the first wing comprises a first nacelle support member on an end that is distal to the fuselage; and the first engine nacelle is detachably mounted to the first wing by inserting the first nacelle support member into a cavity defined by the first engine nacelle and mounting the first nacelle support member to the first engine nacelle. In some embodiments, a first landing module mounted to a first rear end of the first engine nacelle; and a second landing module mounted to a second rear end of the second engine nacelle. In some embodiments, the first landing module comprises one or more first landing support members that are mounted to the first end of the first engine nacelle by one or more hinges. In some embodiments, the first engine comprises a first proprotor; and one or more first proprotor blades of the first proprotor are detachably mounted to the first engine. In some embodiments, the one or more first proprotor blades are attached to the first engine by a push and twist connection. In some embodiments, a control computer that controls flight of the aircraft; the control computer is configured to: control the aircraft to vertically take-off; control the aircraft to transition from vertical take-off mode to horizontal flight mode; and control the aircraft for horizontal flight. In some embodiments, controlling the aircraft to transition from vertical take-off mode to horizontal flight mode includes executing a predefined process for controlling the first engine and second engine in connection with changing an orientation of the aircraft from a first orientation in which the fuselage is directed vertically to a second orientation in which the fuselage is directed horizontally. In some embodiments, a first fuel tank comprised in a first engine nacelle comprising the first engine; a second fuel tank comprised in a second engine nacelle comprising the second engine; and a third fuel tank comprised in the fuselage, wherein the control computer is configured to control delivery of fuel from the third fuel tank to one or more of the first fuel tank and the second fuel tank during flight. In some embodiments, the control computer controls delivery of fuel from the third fuel tank to one or more of the first fuel tank and the second fuel tank based on a determination to maintain balance of the aircraft. In some embodiments, the aircraft is disassembled to fit in an aircraft cargo envelope (e.g., a V-22 envelope, which measures 68"×108"×66").

Figure 8:
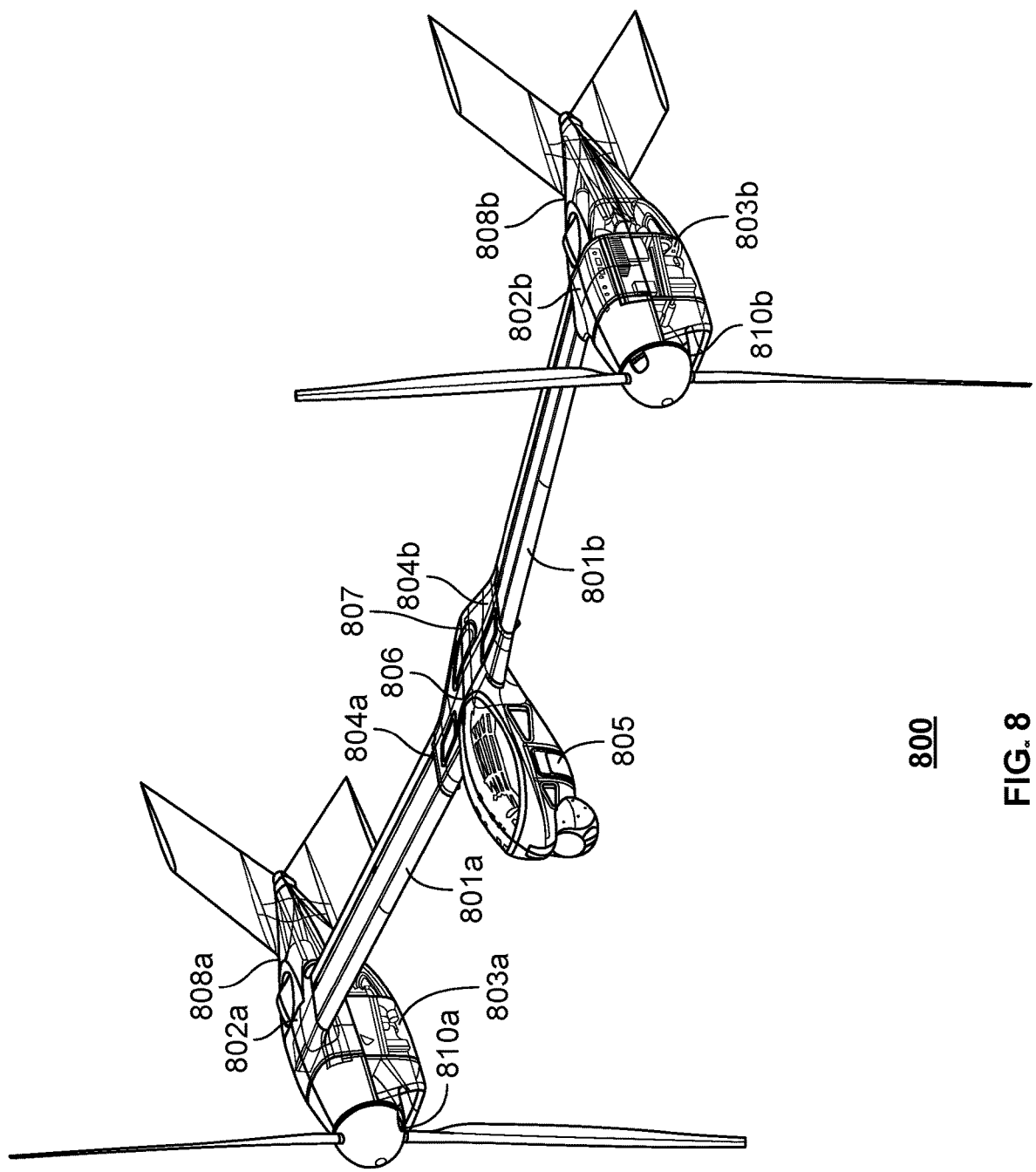
FIG. 8 is a diagram of an aircraft according to various embodiments.

FIG. 8 is a diagram of an aircraft according to various embodiments. According to various embodiments, aircraft 800 comprises several points of connection between various components. Because aircraft 800 is designed for rapid deployment, the connections between components are designed to ensure quick and secure connection.

In the example shown, aircraft 800 comprises first wing nacelle mount 802*a* that connects (e.g., mounts) first wing 801*a* to first nacelle 803*a*. Aircraft 800 further comprises second wing nacelle mount 802*b* that connects second wing 801*b* to second nacelle 803*b*. Referring to FIGS. 7A-7C, the wings include nacelle support members that are inserted into a hole of the nacelles and the nacelles are then mounted (e.g., bolted) to the wings. The nacelles are detachably mounted to the wings to enable aircraft 800 to be compactly stored in a disassembled state. In some embodiments, the connections between the wings and the nacelles are blind-mate connections that allow for quick and secure connections of support members and various other modules (e.g., fuel lines, communication lines, wiring, controls for controlling the engines and/or landing modules, etc.).

As illustrated, aircraft 800 comprises first wing center mount 804*a* that connects (e.g., mounts) first wing 801*a* to center wing 807. Aircraft 800 further comprises second wing center mount 804*b* that connects second wing 801*b* to center wing 807. In some embodiments, connection at first wing center mount 804*a* and connection at second wing center mount 804*b* are hinged to allow for first wing 801*a* and second wing 801*b* to be folded relative to center wing 807 (e.g., to form a horseshoe shape). Connection at first wing center mount 804*a* and connection at second wing center mount 804*b* between first wing 801*a* and second wing 801*b*, respectively, and center wing 807 provide support for connecting various systems between the wing and fuselage 805 (e.g., fuel line, wiring, communication lines, avionics, etc.).

Aircraft 800 further comprises fuselage-center wing mount 806 that connects fuselage 805 to center wing 807. In some embodiments, in a disassembled state, fuselage 805 is folded down between first wing 801*a* and second wing 801*b* that are folded relative to center wing 807 (e.g., in a U or horseshoe shape). In some embodiments, fuselage-center wing mount 806 includes a hinge that allows fuselage 805 to move relative to center wing 807. In an assembled state, fuselage 805 is fixedly mounted (e.g., bolted) to center wing 807. The connections between fuselage 805 and center wing 807 provide support for fuselage 805 and connections for various systems between fuselage 805 and center wing 807. For example, avionics may be comprised in fuselage 805 and the connection of fuselage 805 and center wing 807 via fuselage-center wing mount 806 provides connection (e.g., electrical connection) for various systems (e.g., wiring for communications or for controlling the engines and/or landing modules).

The connection between the winglets or landing modules and the nacelles includes first nacelle-winglet mount 808*a* and second nacelle winglet mount 808*b*. The nacelle-winglet mounts provide support for the landing modules to allow aircraft 800 to retract/extend the landing modules and to allow aircraft 800 to be supported by the landing modules during landing.

Aircraft 800 further comprises proprotor mounts (e.g., first proprotor mount 810*a* and second proprotor mount 810*b*) that provide connection between the rotor blades and engines.

Figure 9A:
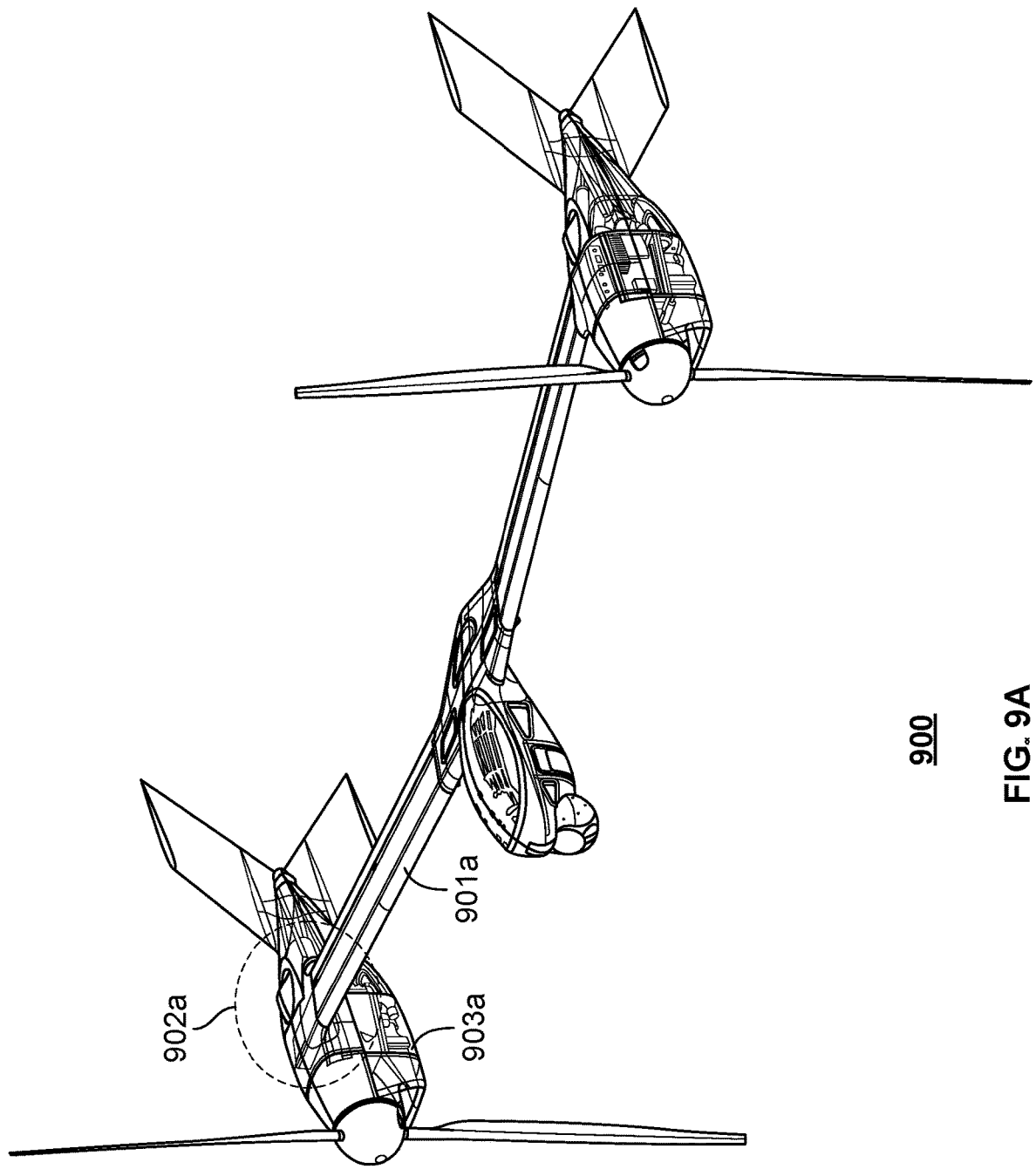
FIG. 9A is a diagram of an aircraft according to various embodiments.
Figure 9B:
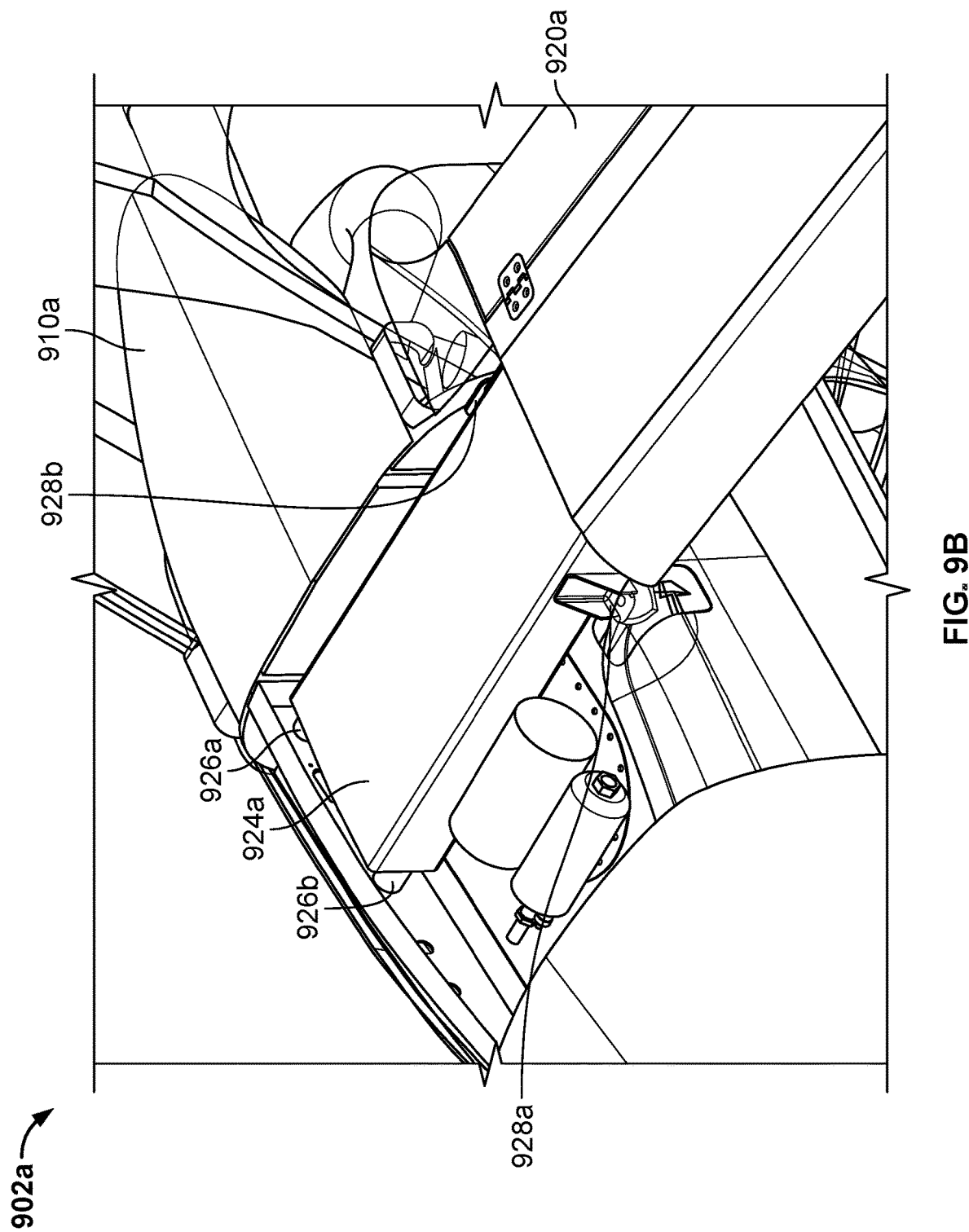
FIG. 9B is a diagram of a connection between a wing and a nacelle of an aircraft according to various embodiments.

FIG. 9A is a diagram of an aircraft according to various embodiments. FIGS. 9A and 9B illustrate the connection between first wing 901*a* and first nacelle 903*a* for aircraft 900. For example, aircraft 900 comprises first wing nacelle mount 902*a* via which first nacelle 903*a* is mounted to first wing 901*a*.

FIG. 9B is a diagram of a connection between a wing and a nacelle of an aircraft according to various embodiments. In the example shown, first wing 920*a* is inserted into first nacelle 910*a*. For example, first nacelle 910*a* may include hole (e.g., a female mating connector) that corresponds to a mounting location for first wing 920*a*. In particular, first wing 920*a* includes first nacelle support member 924*a*, and during assembly of aircraft 900, first nacelle support member 924*a* is inserted into first nacelle 910*a*, and first wing 920*a* is mounted to first nacelle 910*a* via wing-nacelle mountings (e.g., first outboard wing-nacelle mountings 926*a*, 926*b*, first inboard wing-nacelle mounting 928*a*, first inboard wing-nacelle mounting 928*b*, etc.). In some embodiments, the wing-nacelle mountings use bolts and through hole connectors that connect a wing and a nacelle. Various other types of attachment mechanisms may be implemented as the wing-nacelle mountings such as locating pins and/or Kwik-Lok® pins, ball lock pins, cotter pins, etc.

In some embodiments, first wing nacelle mount 902*a* comprises a blind-mate connection for various aircraft systems. The blind-mate connection may be at the interface between first wing 920*a* (e.g., first nacelle support member 924*a* that serves as a male end for the connection between first nacelle 910*a* and first wing 920*a*) and first nacelle 910*a* (e.g., a hole or slot in first nacelle 910*a* that serves as the female end for the connection). When first wing 920*a* is placed in position during assembly (e.g., when the nacelle support member of the wing is inserted into the hole/slot of the nacelle) the connection at the blind-mate connector is established. The blind-mate connection may connect electronics to aircraft avionics, or otherwise provide electrical connection for components in the nacelle or winglet. Examples of connections established by the blind-mate include (i) a connection of the avionics to the engine within nacelle 910a, (ii) a connection of the avionics to the landing module in nacelle 910a or winglet attached to, or integral with, nacelle 910a, (iii) a connection of a communications system such as between the avionics and an antenna disposed in the nacelle or a winglet. Various other connections may be implemented to cross over the detachable/blind-mate connection. In some embodiments, a fuel line between first wing 920a and first nacelle 910a is established during connection of first wing 920a (e.g., first nacelle support member 924a) to first nacelle 910a.

In some embodiments, nacelle 910a comprises a fuel reservoir. The nacelle fuel reservoir may be located beneath the wing-nacelle interface. As an example, the nacelle fuel reservoir for first nacelle 910a is located beneath an area at which first nacelle support member 924a is mounted to first nacelle 910a via the wing-nacelle mountings. The location of the nacelle fuel reservoir enables an easy connection to the fuel line in wing 920a and the fuel reservoir in the fuselage or center wing. In some embodiments, the fuel lines are located at an inside edge of wing 920a and run the length between nacelle 910a and the fuselage/center wing. The aircraft controls system controls delivery of fuel from the fuel reservoir in the fuselage or center wing to the respective nacelle fuel reservoirs to ensure that the nacelle fuel reservoirs are maintained at substantially even levels or to otherwise ensure that the aircraft is balanced during flight.

In some embodiments, the interface between nacelle 910a and wing 920a is located at a top of nacelle 910a when in flight. For example, the nacelles are connected to the wings in a manner that the nacelles extend downwards from the wing towards the ground when in flight. Connection a top part of the nacelle to a bottom part of the wing (e.g., the nacelle support member) gives the aircraft a high-wing structure. The high-wing structure provides certain benefits pertaining to aerodynamics and packaging of the aircraft.

Figure 10A:
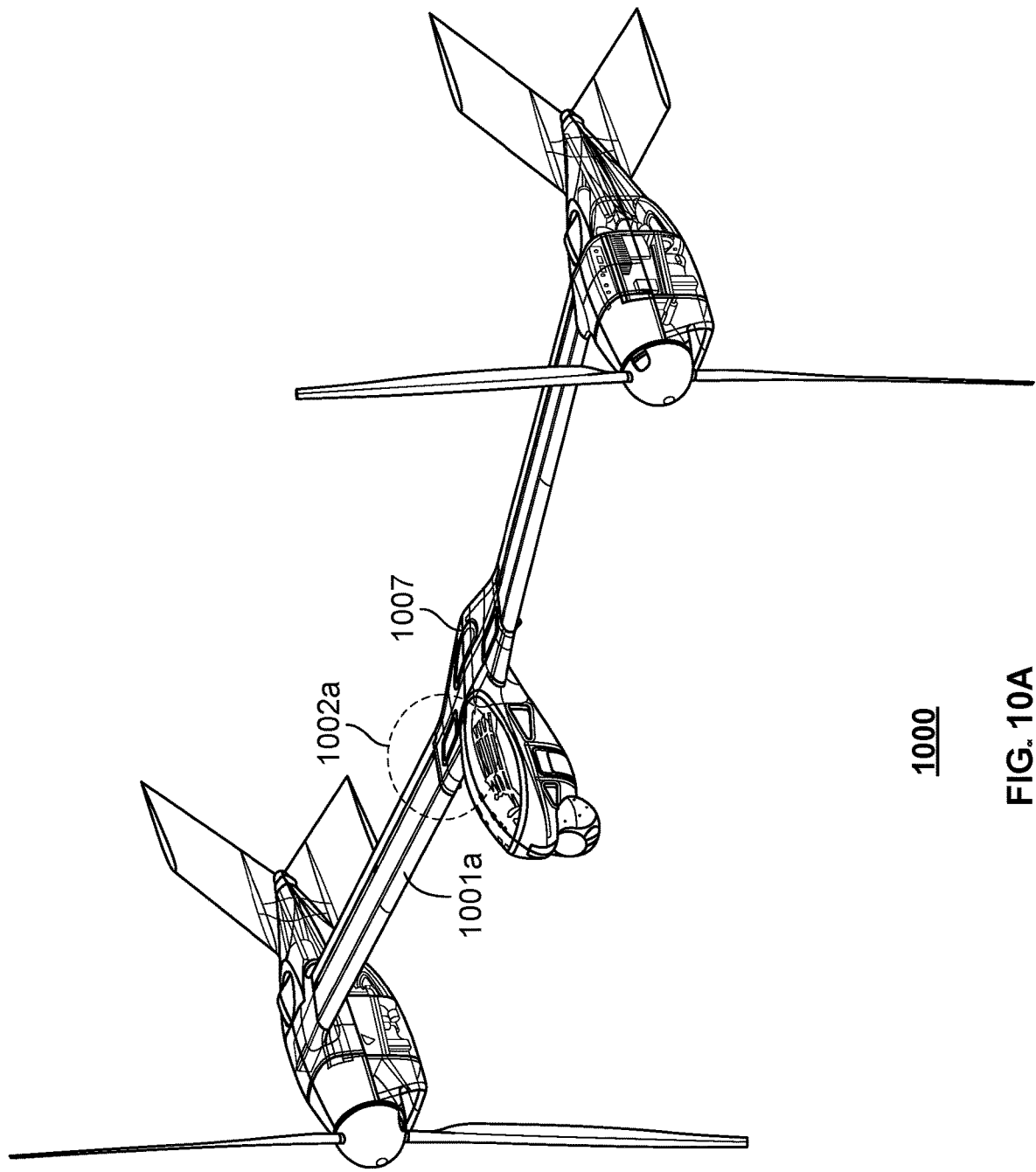
FIG. 10A is a diagram of an aircraft according to various embodiments.
Figure 10B:
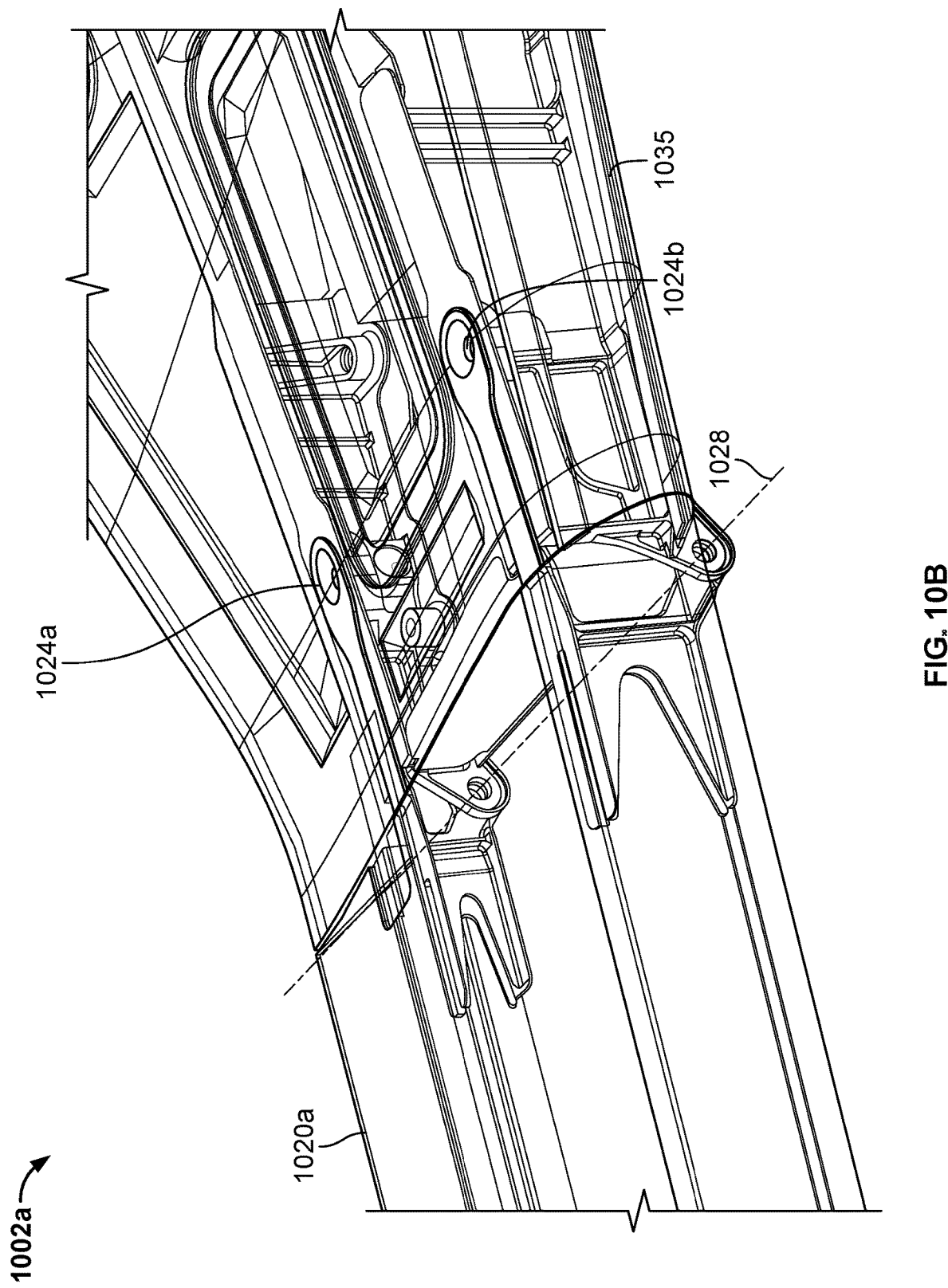
FIG. 10B is a diagram of a connection between a wing and a center wing of an aircraft according to various embodiments.

FIG. 10A is a diagram of an aircraft according to various embodiments. FIGS. 10A, 10B, and 10C are diagrams of a connection between first wing 1001a and center wing 1007 of aircraft 1000 according to various embodiments. For example, aircraft 1000 comprises first wing-center wing mount 1002a via which first wing 1001a is mounted/connected to center wing 1007.

In some embodiments, wing 1001a is fixedly mounted to center wing 1007 in a manner that allows wing 1001a to rotate around an axis to allow wing 1001a to be folded relative to center wing 1007 during disassembly and to be positioned in an extended position relative to center wing 1007 during assembly. The interface between first wing 1002a and center wing 1007 contributes a relatively low drag to aircraft 1000. Further, the interface between first wing 1002a and center wing 1007 enables quick assembly with minimal tools.

FIG. 10B is a diagram illustrating an embodiment of a joint between a wing and a center wing. As shown in FIG. 10B, first wing 1020a rotates around fold axis 1028 (e.g., via hinge pin) during assembly/disassembly to transition between the assembled state and the disassembled state. First wing-center wing mount 1002a may include one or more stoppers that restrict rotation of first wing 1020a to an extent substantially further than the assembled state, such as to prevent damage to first wing 1020a or center wing 1035.

In some embodiments, during assembly of aircraft 1000, first wing 1020a is rotated around fold axis 1028 until first wing 1020a is in an assembled state relative to center wing 1035. First wing 1020a is then fixedly connected to center wing 1035 to provide strong/rigid support at the wing-center wing interface. For example, interface bolts are inserted and tightened into mounting hole 1024a and mounting hole 1024b. The interface between (e.g., mounting of) center wing 1035 and the second wing is similar to the interface between center wing 1035 and first wing 1020a.

First wing-center wing mount 1002a is designed to minimize drag contribution to flight of aircraft 1000. For example, the interface is between the wing and the center wing is designed to eliminate kinks between the wings and center wing. For example, the wings have an angled shoulder, or no shoulder, at the interface between the wings and the center wing.

The double-hinged design of the interface between center wing 1035 and the wings shortens field-assembly time. For example, the hinged design of the interface between first wing 1020a and center wing 1035 facilitates quick assembly that requires minimal resources. Center wing 1035 (or fuselage to which center wing 1035 is mounted) is supported, such as by a support member of the cart, and the wings are then easily rotated around the respective hinges without significant support of the wings by the cart or other support structure. For example, human operators can manipulate the wings to rotate around the hinges and mount first wing 1020a to center wing 1035 via the interface bolts. The double-hinged design for the mounting of the wing to the center wing shortens the field assembly time because the wings do not need to be inserted/plugged into the aircraft body/center wing and various connections do not need to be established. In various embodiments, connections for electrical connections and/or fuel line connections are maintained intact through assembly/disassembly. The connections may be integrated into the hinged design such that the connections flow through the interface without requiring the connections to be made during assembly. In some embodiments, the connections for electrical or fuel between center wing 1035 and first wing 1020a are not maintained when disassembled and are connected when assembled or reassembled.

Although the double-hinged design may be relatively heavier than other mechanisms for mounting wings to center wings, the hinged interface between the wing and center wing provides a relatively stiffer/stronger joint for the wings. The use of the double hinged design may rely on tight tolerances in the hinges (e.g., using a hinge pin) connecting the wings and center wing and the improved stiffness provided by the hinge mounting relative to other mounting mechanisms.

FIG. 10C is a diagram illustrating an embodiment of a joint between a wing and a center wing. In the example shown, for first wing-center wing mount 1002a, first wing 1040a can pivot about hinge pin 1049 to a folded position and to an assembled position with respect to center wing 1055. In the assembled position, first wing 1040a can be fixed using mounting bolt 1044b to center wing 1055.

Figure 11A:
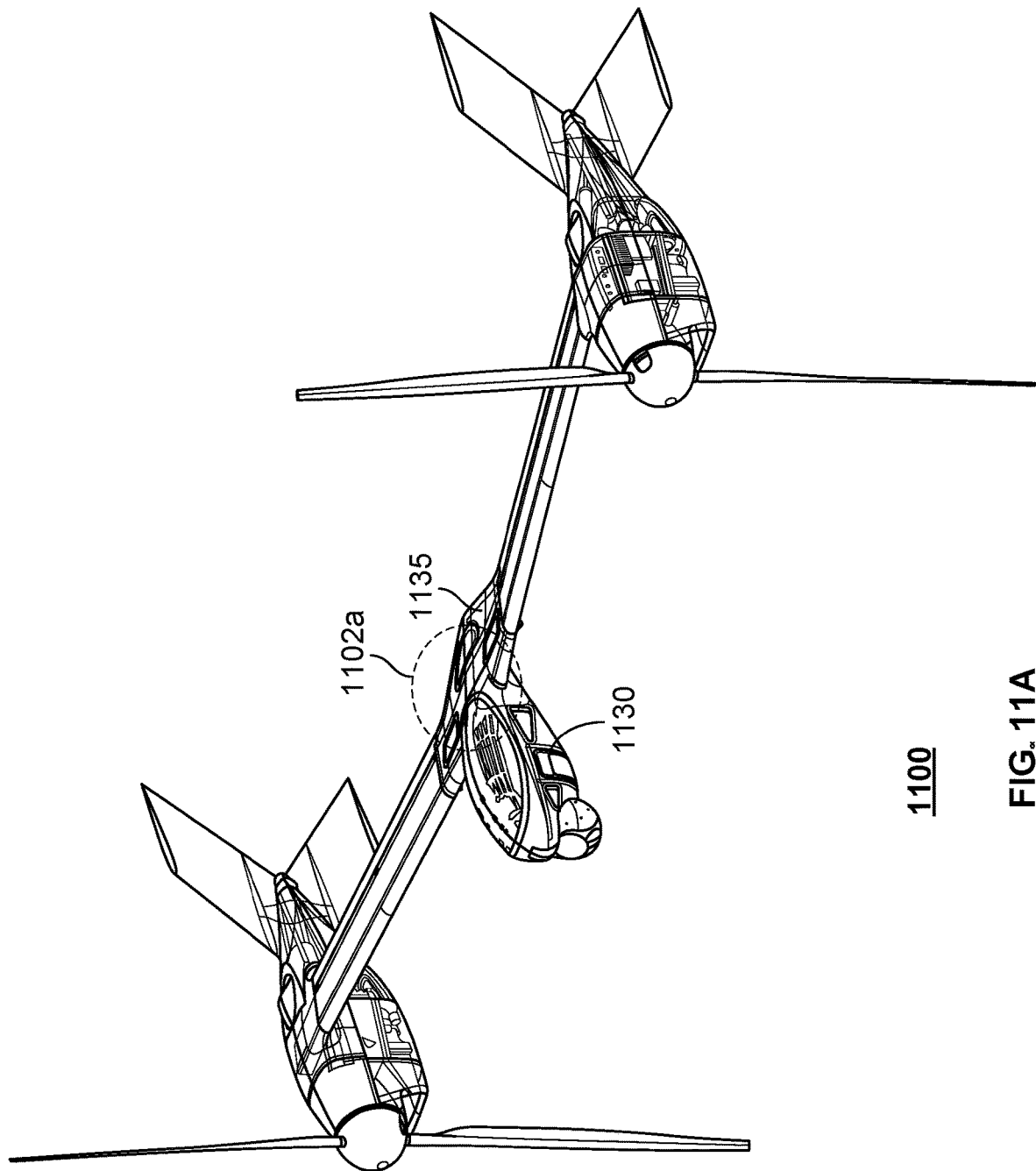
FIG. 11A is a diagram of an aircraft according to various embodiments.

FIG. 11A is a diagram of an aircraft according to various embodiments. In the example shown, fuselage-center wing mount 1102a comprises a connection joint between fuselage 1130 and center wing 1135 for aircraft 1100.

Figure 11B:
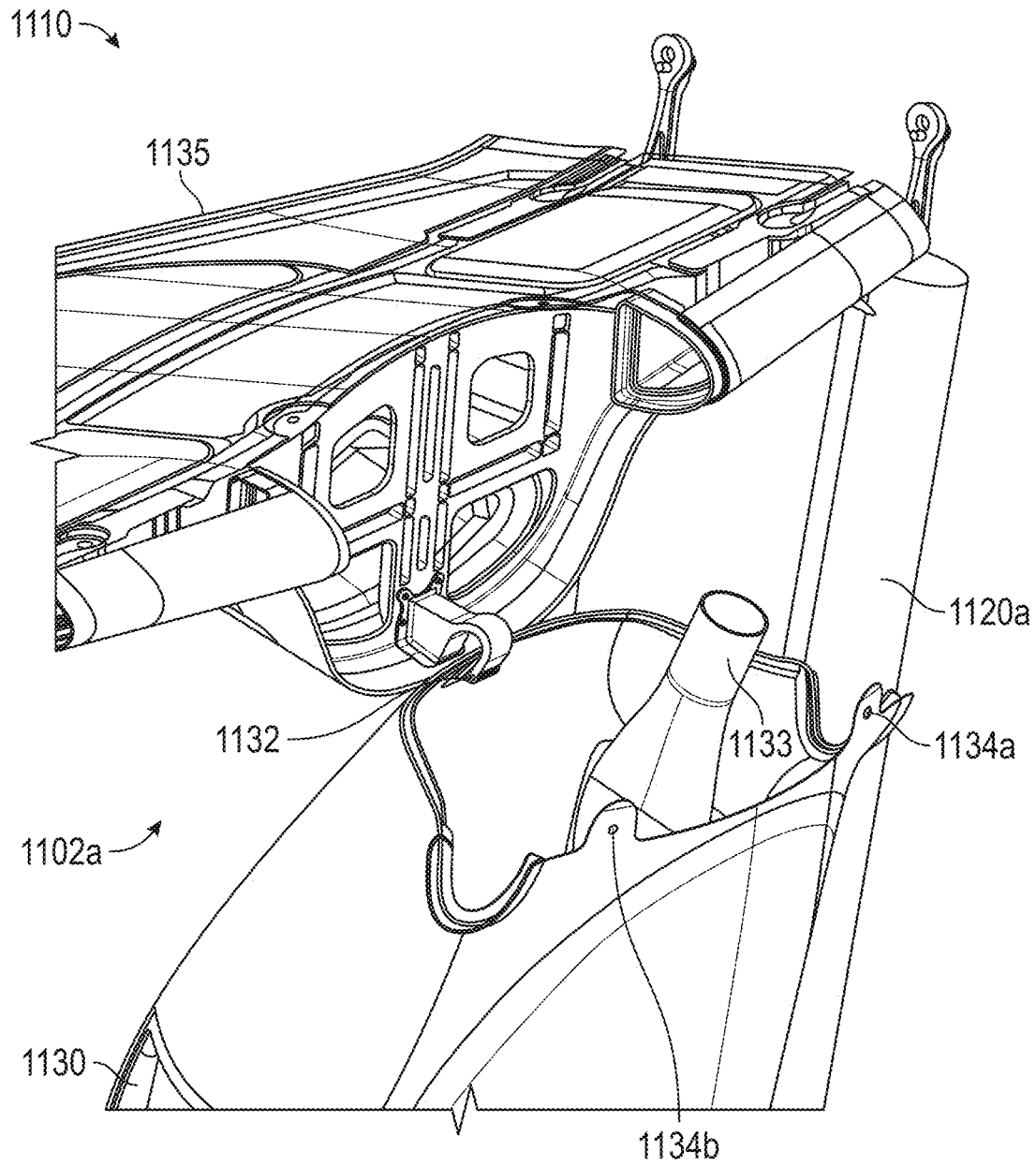
FIG. 11B is a diagram of a connection between a fuselage and a center wing of an aircraft according to various embodiments.

FIG. 11B is a diagram of a connection between a fuselage and a center wing of an aircraft according to various embodiments. In some embodiments, the fuselage-center wing mount 1102a of FIG. 11A (assembled state) is shown in a rotated state in FIG. 11B. In the example shown, aircraft 1100 comprises fuselage-center wing mount 1102a via which fuselage 1130 (or other central pod) is mounted/connected to the center wing 1135.

In the example shown, fuselage-center wing mount 1102a comprises a hinged-design. Fuselage 1130 rotates around an axis defined by hinge 1132 during assembly/disassembly. For example, in a disassembled state, fuselage 1130 is folded into a space defined by the wings (e.g., first wing 1120a and the second wing) and center wing 1135. Hinge 1132 may be disposed on a side of fuselage 1130 that corresponds to the bottom of the aircraft during flight. Fuselage-center wing mount 1102a may include one or more stoppers that restrict rotation of fuselage 1130 to an extent substantially further than the assembled state, such as to prevent damage to fuselage 1130 to or center wing 1135. In some embodiments, during assembly of aircraft 1100, fuselage 1130 is rotated around fold axis defined by hinge 1132 until fuselage 1130 is in an assembled state relative to center wing 1135. Fuselage 1130 is then fixedly connected to center wing 1135 to provide strong/rigid support at the fuselage-center wing interface. For example, interface bolts are inserted and tightened into mounting holes 1134a, 1134b.

Fuselage-center wing mount 1102a is designed to minimize drag contribution to flight of aircraft 1100. For example, the interface is between fuselage and the center wing is designed to eliminate kinks between the fuselage and center wing. For example, fuselage 1130 has an angled shoulder, or no shoulder, at the interface between fuselage 1130 and center wing 1135.

The hinged design of the interface between fuselage 1130 and center wing 1135 shortens field-assembly time. For example, the hinged design of the interface between fuselage 1130 and center wing 1135 facilitates quick assembly that requires minimal resources. Center wing 1135 is supported, such as by a support member of the cart, and fuselage 1130 is then easily rotated around the axis defined by hinge 1132 without significant support of the wings by the cart or other support structure. For example, human operators can manipulate fuselage 1130 to rotate around the axis defined by hinge 1132 and mount fuselage 1130 to center wing 1135 via the interface bolts. As another example, the cart includes a hydraulic or motor driven support member (e.g., a hydraulic piston) that moves fuselage 1130 from a disassembled state to an assembled state to reduce the reliance on human operators. The hinged design for the mounting of fuselage 1130 to center wing 1135 further shortens the field assembly time because various connections do not need to be specifically established. For example, connections for electrical connections and fuel line connections are maintained intact through assembly/disassembly or are automatically made based on the movement of fuselage 1130 from the disassembled state to the assembled state. In the example shown, fuselage fuel reservoir line 1133 is connected via fittings (e.g., dry lock fittings) via which fuel flows from the fuselage fuel reservoir to the nacelle fuel reservoirs is connected to a center-wing fuel line when fuselage 1130 is rotated around the axis defined by hinge 1132 to position fuselage 1130 in the assembled state. In some embodiments, electrical connections are made using connectors (e.g., 38999 connectors) that can are made when the hinges joints are closed. In some embodiments, the connections may be integrated into the hinged design such that the connections flow through the interface without requiring the connections to be made during assembly.

Figure 12A:
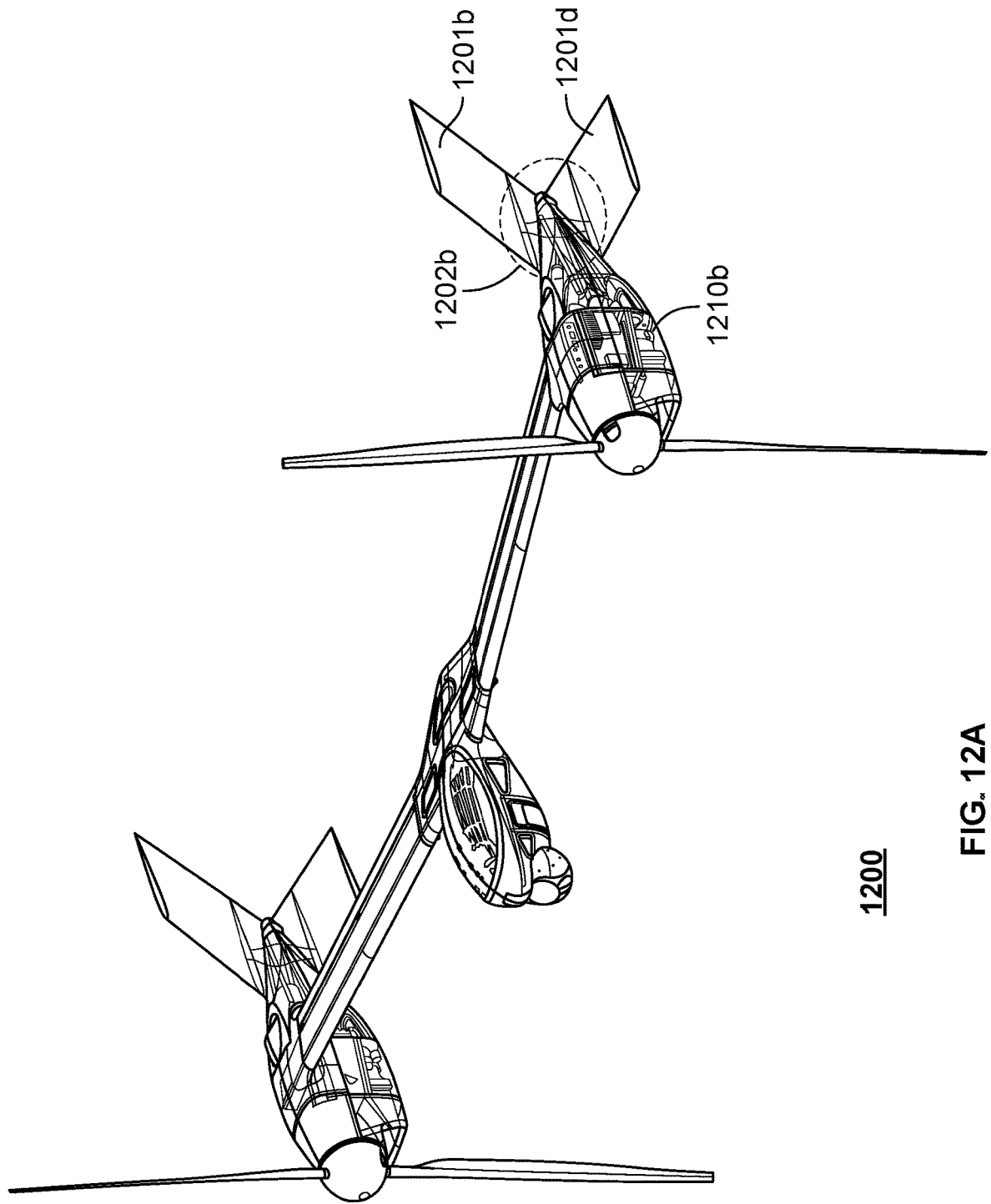
FIG. 12A is a diagram of an aircraft according to various embodiments.

FIG. 12A is a diagram of an aircraft according to various embodiments. In the example shown, aircraft 1200 includes second nacelle 1210b with landing module-nacelle mount 1202b. Winglet 1201b and winglet 1201d are coupled to second nacelle 1210b.

Figure 12B:
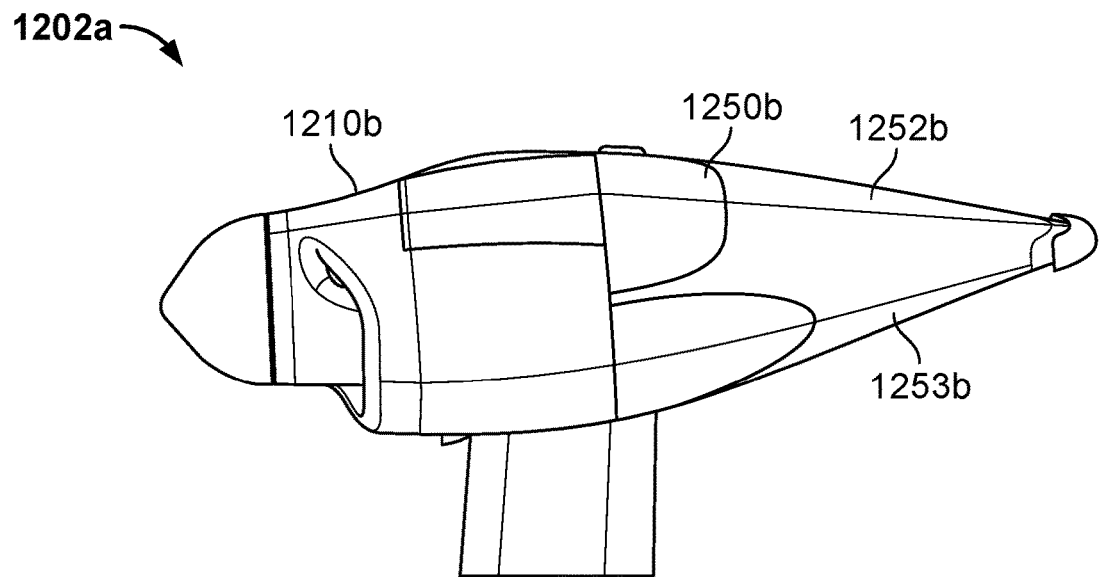
FIG. 12B is a diagram of a landing module of an aircraft according to various embodiments.
Figure 12C:
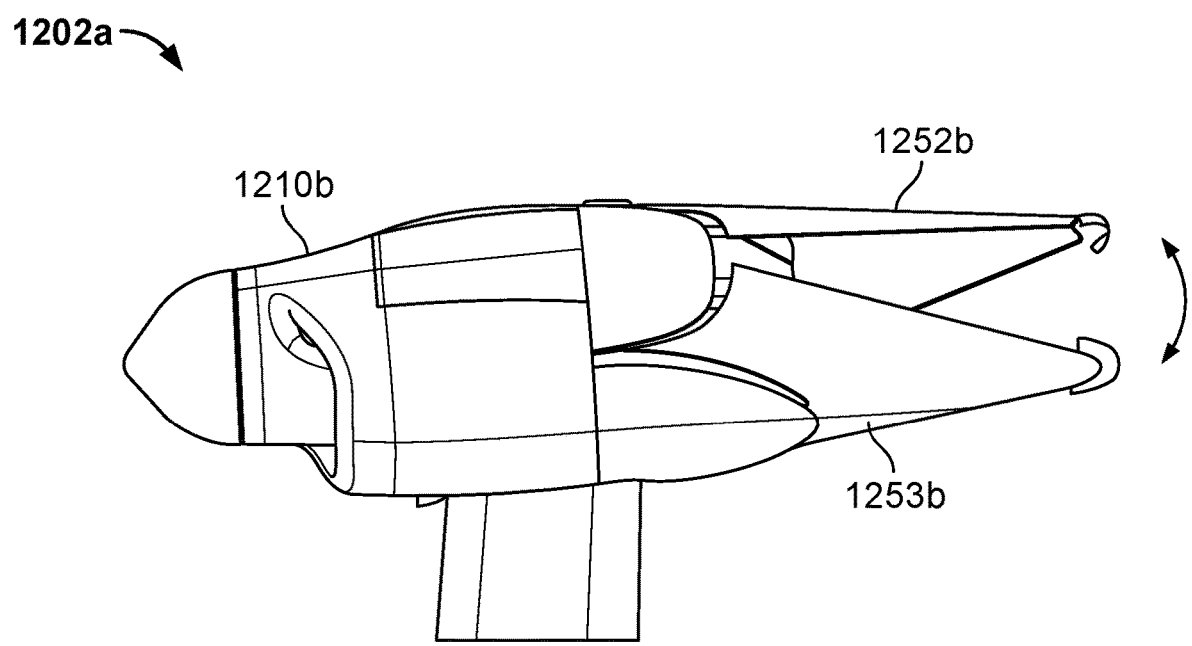
FIG. 12C is a diagram of a landing module of an aircraft according to various embodiments.
Figure 12D:
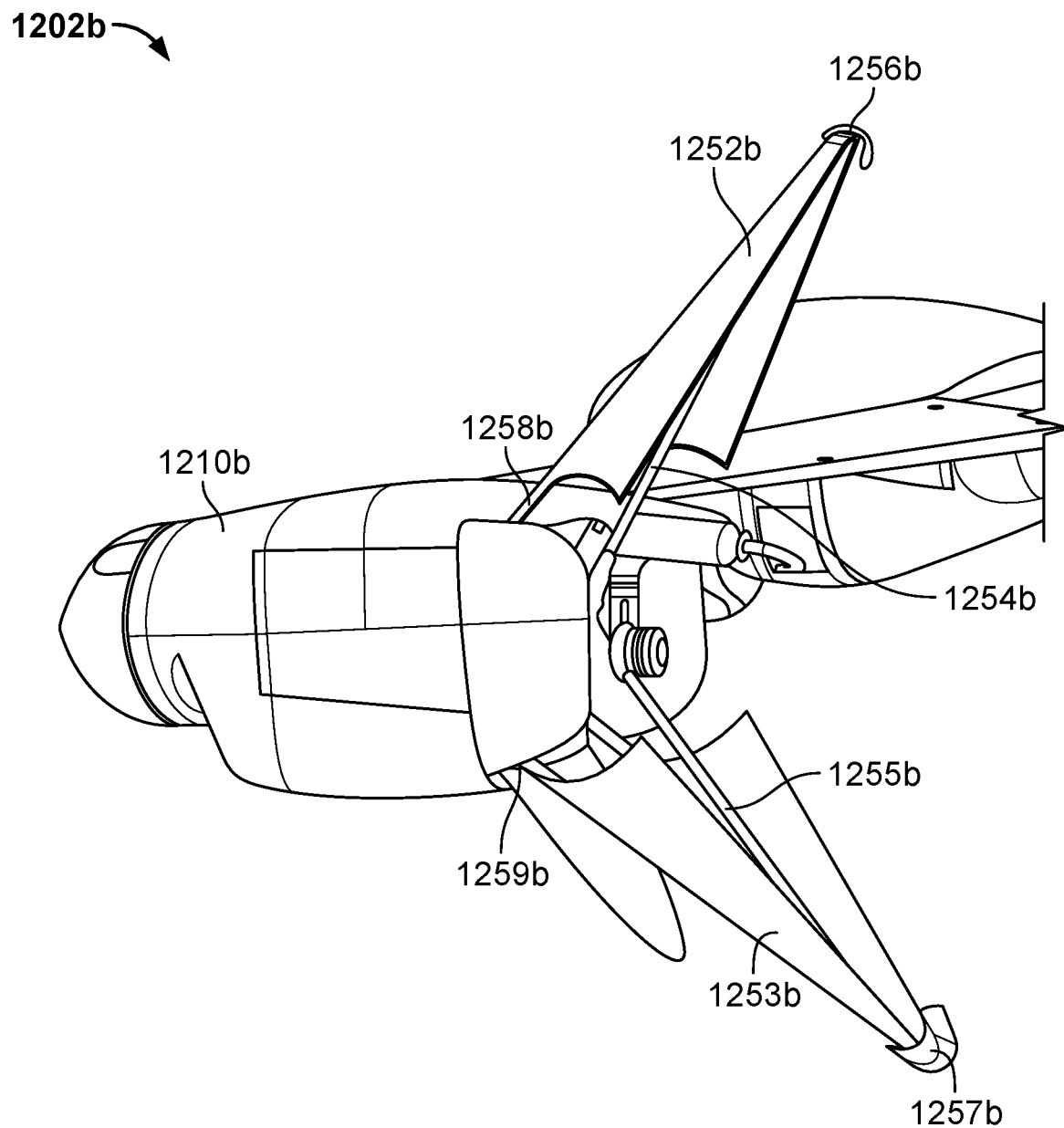
FIG. 12D is a diagram of a landing module of an aircraft according to various embodiments.

FIGS. 12B-D are diagrams of a landing module of an aircraft according to various embodiments. As illustrated in FIGS. 12B-12D, the landing module may be controlled to extend respective landing support members for landing/take-off, or to retract the landing support members for flight. The actuation of landing support members to transition between an extended state and retracted state enables the landing module to be integrated with the nacelle or winglet connected to nacelle. For example, landing module-nacelle mount 1202b is configured in a manner that the landing module (e.g., respective landing support members) contribute low drag when the landing module is retracted during flight but are sufficiently strong to support the aircraft (e.g., aircraft 1200 of FIG. 12A). Note the winglets (e.g., winglet 1201b and winglet 1201d in FIG. 12A) are not shown in FIGS. 12B, 12C, and 12D. In some embodiments, the landing support members are rotated around an axis that is substantially defined by the length of the wings. Such rotation of the landing support members ensures that the landing module does not interfere with wings and provides more stable aerodynamics. In some implementations, the landing support modules are rotated along an axis substantially perpendicular to the axis defined by the length of the wings.

In some embodiments, landing support members 1252b, 1253b connected to nacelle 1210b are configured to be sufficiently long to provide clearance between the ground and the wings, the center wing, and/or any payloads mounted to aircraft 1200 when aircraft 1200 is landed. Further, the landing support members connected to corresponding nacelles are sufficiently strong to support the weight of aircraft 1200 and any payloads mounted to aircraft 1200.

According to various embodiments, the landing support members are transitioned between a retracted state and an extended state based on actuating one or more actuation mechanisms. The retracted state is illustrated in FIG. 12B in which landing support members 1252b, 1253b are closed to create an aerodynamic shape that contributes low drag during flight. A 20% extended state is illustrated in FIG. 12C in which landing support members 1252b, 1253b are extended to open the landing module and to form a wide and stable base on which aircraft is landed. Examples of actuation mechanisms include an electric motor, such as a servomotor, a hydraulically driven piston, a pneumatically driven piston, etc. Various other actuation mechanisms may be implemented.

A 100% extended state is illustrated in FIG. 12D in which landing support members 1252b, 1253b are extended to open the landing module and to form a wide and stable base on which aircraft is landed. In the example shown in FIG. 12D, the landing module (e.g., landing module-nacelle mount 1202b) includes actuation members 1254b, 1255b that are controlled to extend/retract landing support members 1252b, 1253b, respectively. A control computer (e.g., located in the fuselage) may control to actuate actuation members 1254b, 1255b in connection with take-off and landing.

In some embodiments, landing support members 1252b, 1253b are mounted to second nacelle 1210b via hinge to facilitate the opening/closing of the landing module (e.g., extension/retraction of the landing support members). In the example shown, landing support member 1252b is connected to second nacelle 1210b by one or more landing support member arms (e.g., landing support member arm 1258b), and landing support member 1253b is connected to second nacelle 1210b by one or more landing support member arms (e.g., landing support member arm 1259b).

In some embodiments, the landing module forms a base that is strong and forms a wide base to ensure that aircraft is stable when landed. The landing module may be configured to ensure that aircraft 1200 can stably land on various types of surfaces (e.g., inclines, uneven surfaces, surfaces of different material, etc.). As an example, the landing module is configured to comprise feet mounted to the landing support members (e.g., foot 1256b mounted to landing support member 1252b and foot 1257b mounted to landing support member 1253b). Feet 1256b, 1257b may be configured to stably rest on different types of surfaces. For example, the shape and material of feet 1256b and 1257b or selected to optimize the landing/deployment of aircraft 1200 on different types of surfaces. In some embodiments, foot 1257b and/or foot 1256b include adjustment mechanisms to enable slight adjustment for uneven ground (e.g., spring or screw mechanisms).

Figure 13A:
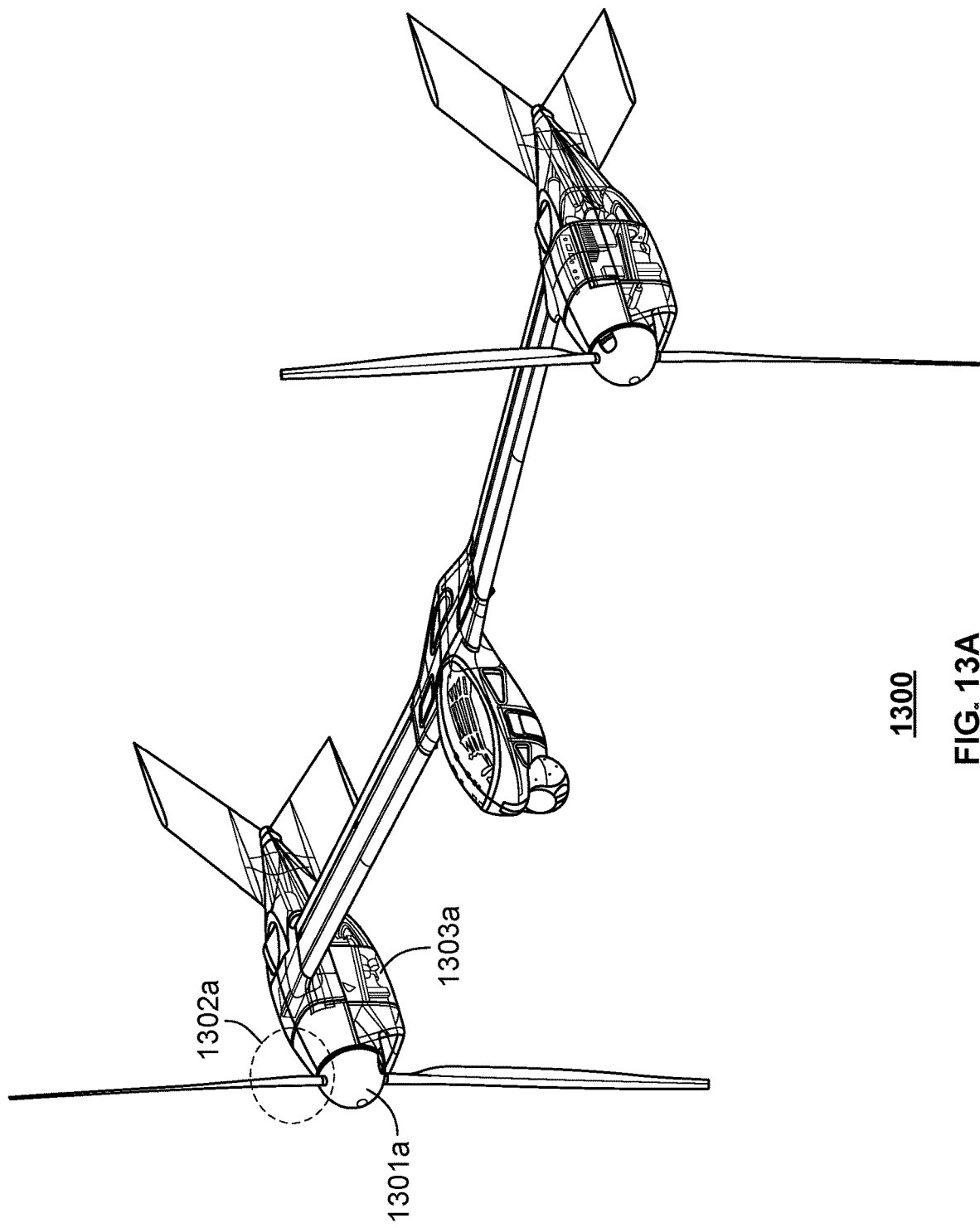
FIG. 13A is a diagram of an aircraft according to various embodiments.

FIG. 13A is a diagram of an aircraft according to various embodiments. In the example shown, first nacelle 1303a of aircraft 1300 includes an engine with rotating cone 1301a that includes one or more joints (e.g., blade-nacelle mount 1302a) between the engine of first nacelle 1303a via rotating cone 1301a.

FIGS. 13B-13G are diagrams of a connection between a blade and an engine of a nacelle of an aircraft according to various embodiments. In some embodiments, blade-nacelle mount 1302a of FIGS. 13B-13G are details of blade-nacelle mount 1302a of FIG. 13A. In the example shown, blade-nacelle mount 1302a connects proprotor blades (e.g., proprotor blade 1342a) to the proprotor (e.g., proprotor hub 1341a in rotating cone of the engine of a nacelle). In some embodiments, blade-nacelle mount 1302a is configured to allow for a toolless assembly/disassembly. For example, a human operator may install the proprotor blades to the proprotor by hand.

According to various embodiments, blade-nacelle mount 1302a comprises a push and twist connector. The push and twist connector enables the proprotor to be mounted to the nacelle (e.g., to the proprotor, etc.) without any additional tools. In some embodiments, the proprotor has one or more notches located on the internal circumference of the cavity formed at the proximal end of proprotor. The proprotor hub (or the nacelle) has one or more ridges disposed on the outer circumference of the male end of the hub connector interface. Further, the proprotor hub includes a set of gaps between the ridges on the hub connector interface such that no single ridge is disposed along the entire outer circumference of proprotor hub 1341a. Proprotor blade 1342a is installed by aligning the notches on the proprotor blade with corresponding gaps in the ridges of proprotor hub 1341a and pushing proprotor blade 1342a such that the notches pass (e.g., in insertion direction 1343a) corresponding ridges on proprotor hub 1341a. In response to the proprotor blade 1342a being sufficiently pushed to provide clearance between the notches on proprotor blade 1342a and a corresponding ridge passed which the notch was inserted, proprotor blade 1342a is twisted (e.g., in direction of 1344a) such that the notches on proprotor blade 1342a are no longer aligned with the set of corresponding gaps in the ridges of proprotor hub 1341a. Proprotor hub 1341a comprises a biasing structure (e.g., a spring) that pushes proprotor blade 1342a in a direction opposite the insertion direction, thereby causing proprotor blade 1342a to be connected to proprotor hub 1341a until disassembly when proprotor blade 1342a is pushed in the insertion direction (e.g., insertion direction 1343a) and twisted to re-align the notches with the set of gaps to allow for extraction of proprotor blade 1342a.

Figure 13B:
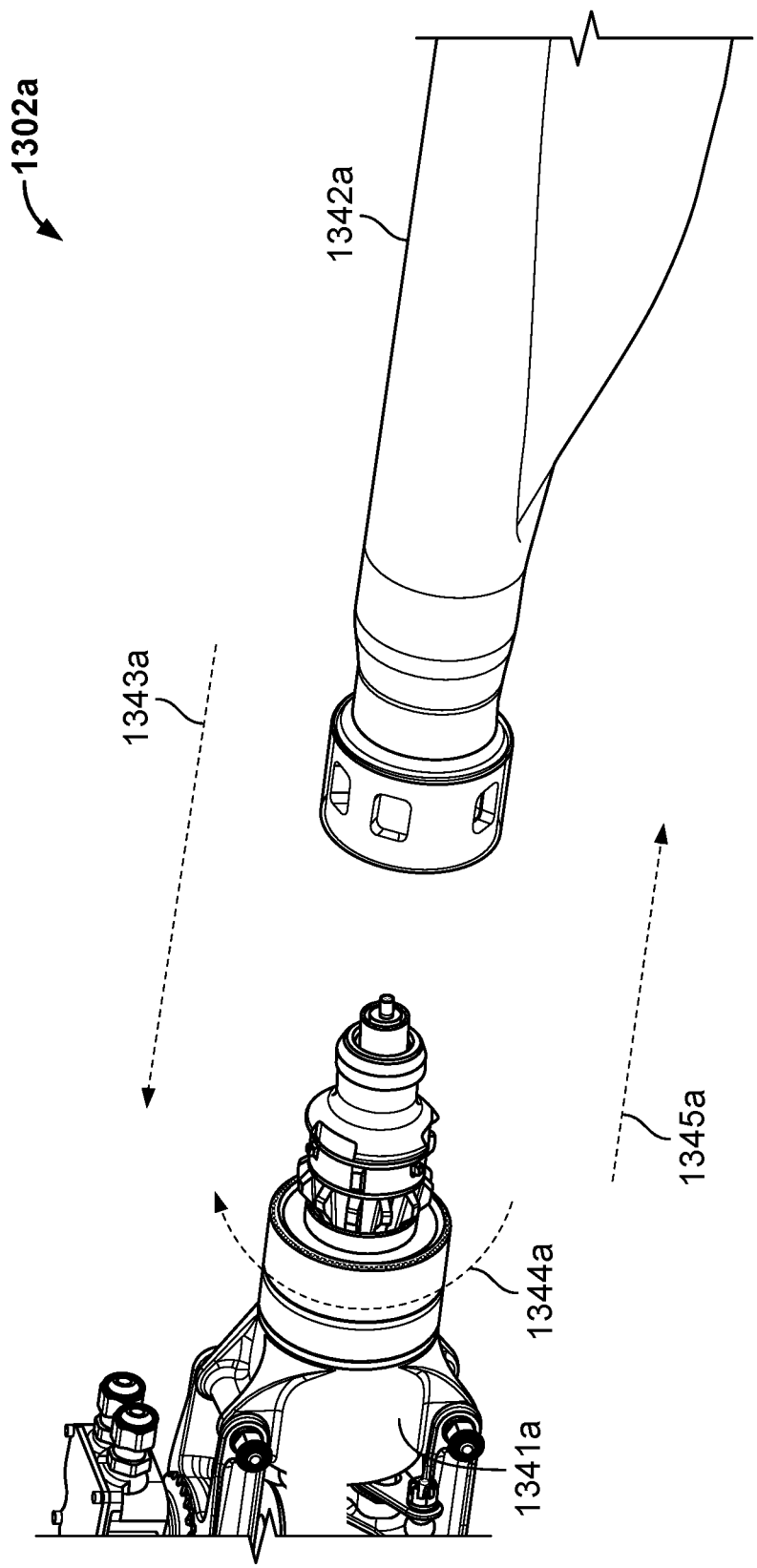
FIG. 13B is a diagram of a connection between a blade and a nacelle of an aircraft according to various embodiments.

As illustrated in FIG. 13B, the sequence of steps for installing proprotor blade 1342a to the proprotor includes pushing proprotor blade 1342a in the push preload direction 1343a to engage a proximal end of proprotor blade 1342a with proprotor hub 1341a. In response to proprotor blade 1342a being moved to a position at which a distal end of proprotor hub 1341a is engaged with proprotor blade 1342a (e.g., a distal end of proprotor hub 1341a being within a cavity defined by the proximal end of proprotor blade 1342a), proprotor blade 1342a is twisted in twist direction 1344a, which is defined by an axis that is perpendicular to the length of proprotor blade 1342a and/or proprotor hub 1341a. After proprotor blade 1342a is sufficiently rotated around twist direction 1344a (e.g., proprotor blade 1342a is configured in a clocking feature restrain position), the proprotor blade 1342a is released by the installer (e.g., a human operator) and a biasing spring pushes proprotor blade 1342a out along spring out direction 1345a (e.g., in a direction opposite push preload direction 1343a).

Figure 13C:
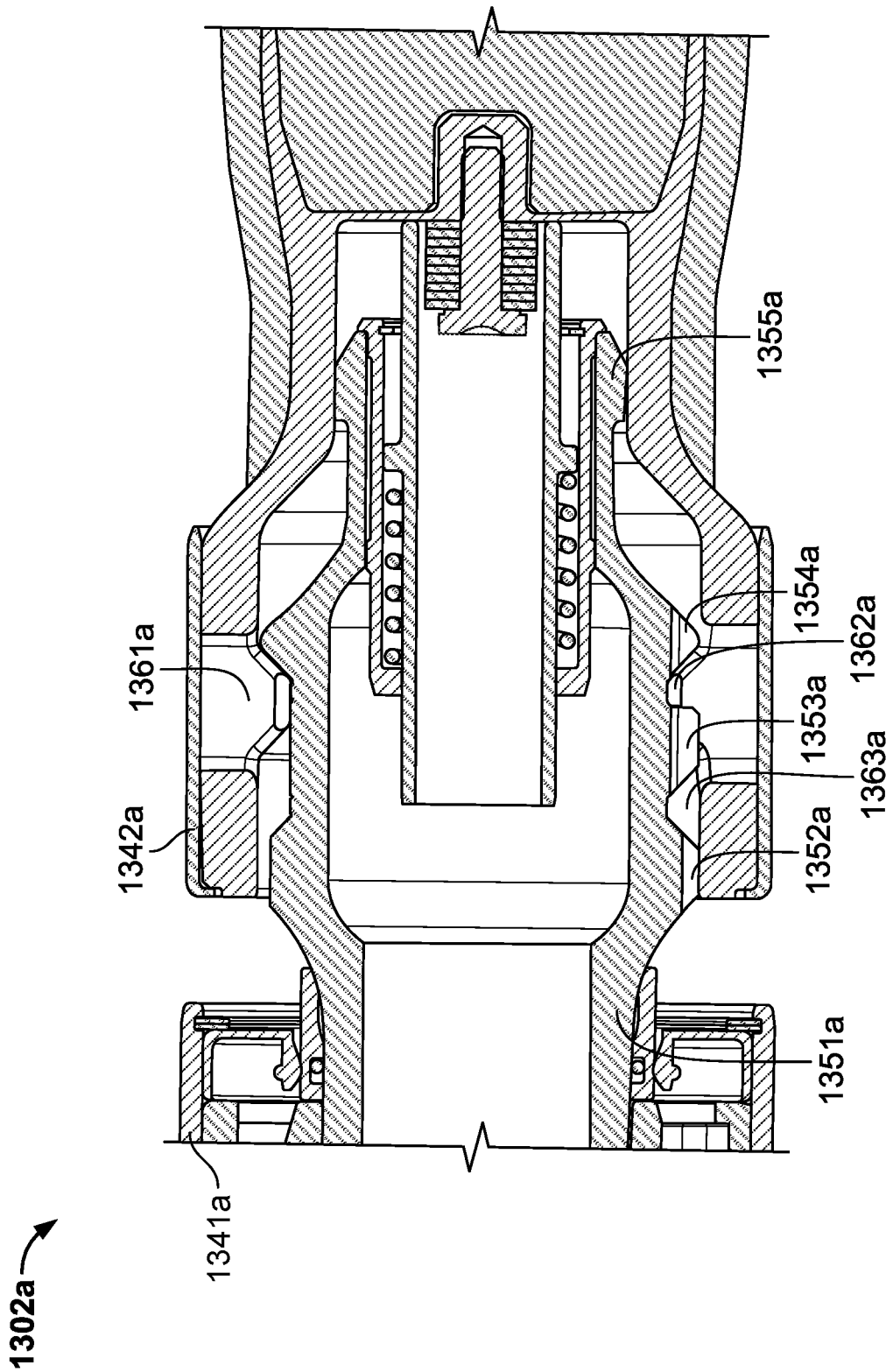
FIG. 13C is a diagram of a connection between a blade and a nacelle of an aircraft according to various embodiments.

As illustrated in FIG. 13C, proprotor blade 1342a has a set of notches (e.g., notches 1361a, 1362a, and 1363a) disposed on the internal circumference of the cavity defined by proprotor blade 1342a. The notches are protrusions located on a part of the internal circumference but do not stretch the entire internal circumference. After insertion of proprotor blade 1342a such that the set of notches is aligned corresponding gaps in ridges of proprotor hub structure 1351a of proprotor hub 1341a. The proprotor blade 1342a is twisted to cause mis-alignment between the set of notches and corresponding gaps in the ridges, and proprotor hub 1341a causes a biasing force to be applied to proprotor blade 1342a so that the set of notches engage parts of the ridges, thereby preventing removal of proprotor blade 1342a. Proprotor hub 1341a comprises hub structure 1351a that includes a set of ridges on the outer circumference of hub structure 1351a (e.g., clocking feature contact feature 1353a, 1354a, and moment contact feature 1355a).

Figure 13E:
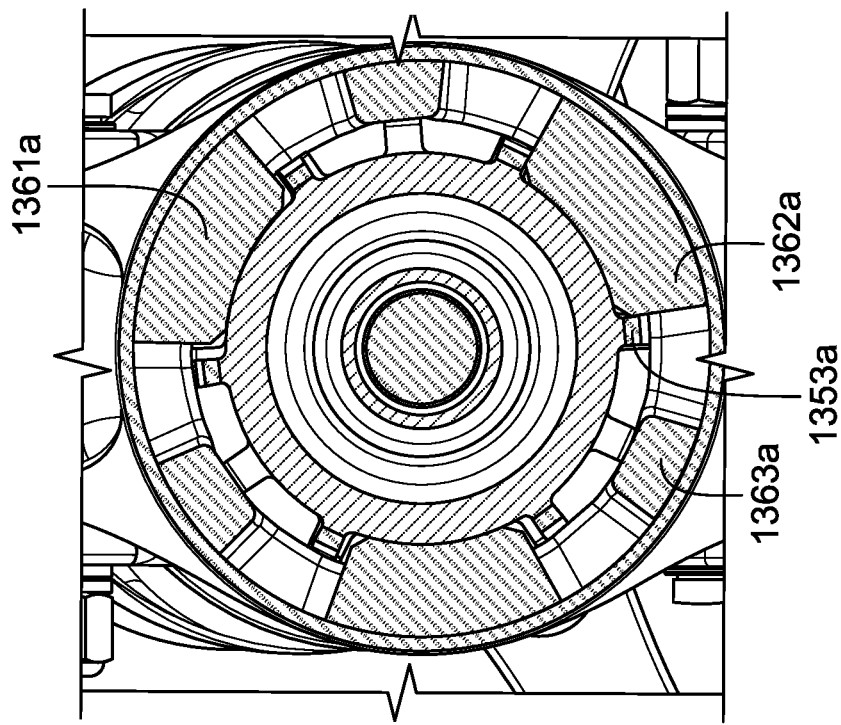
FIG. 13E is a diagram of a connection between a blade and a nacelle of an aircraft according to various embodiments.
Figure 13D:
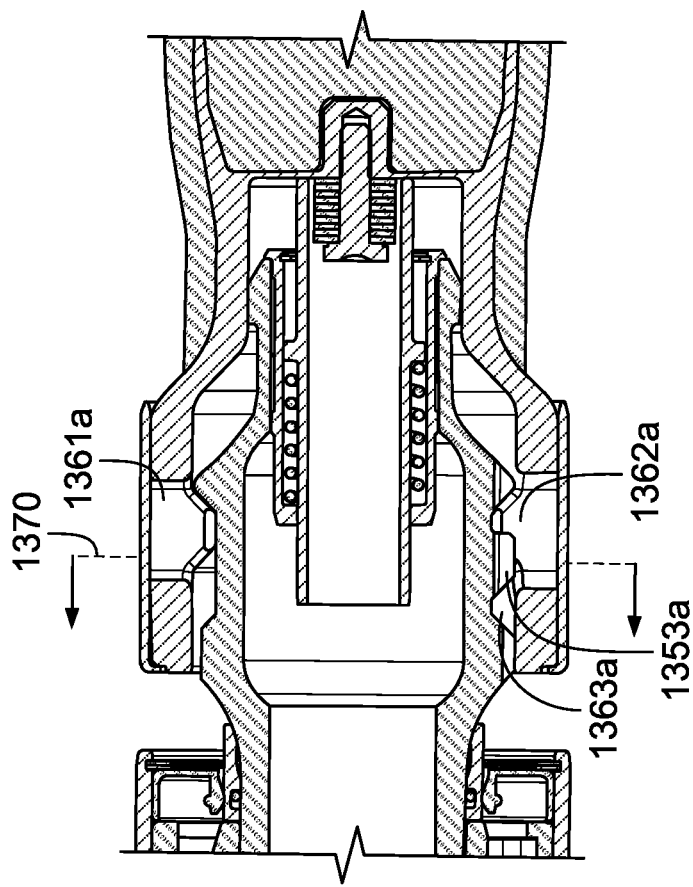
FIG. 13D is a diagram of a connection between a blade and a nacelle of an aircraft according to various embodiments.
Figure 13G:
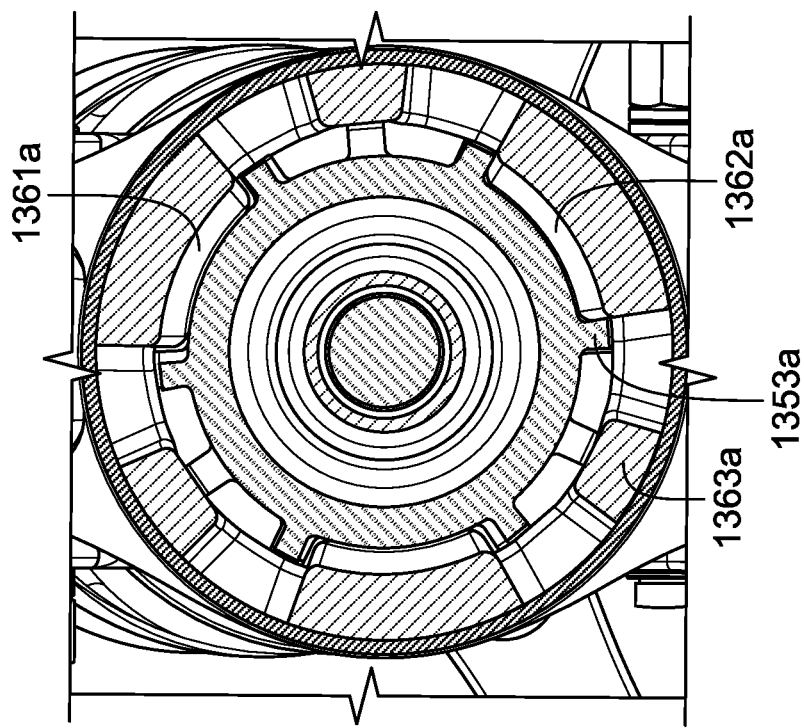
FIG. 13G is a diagram of a connection between a blade and a nacelle of an aircraft according to various embodiments.
Figure 13F:
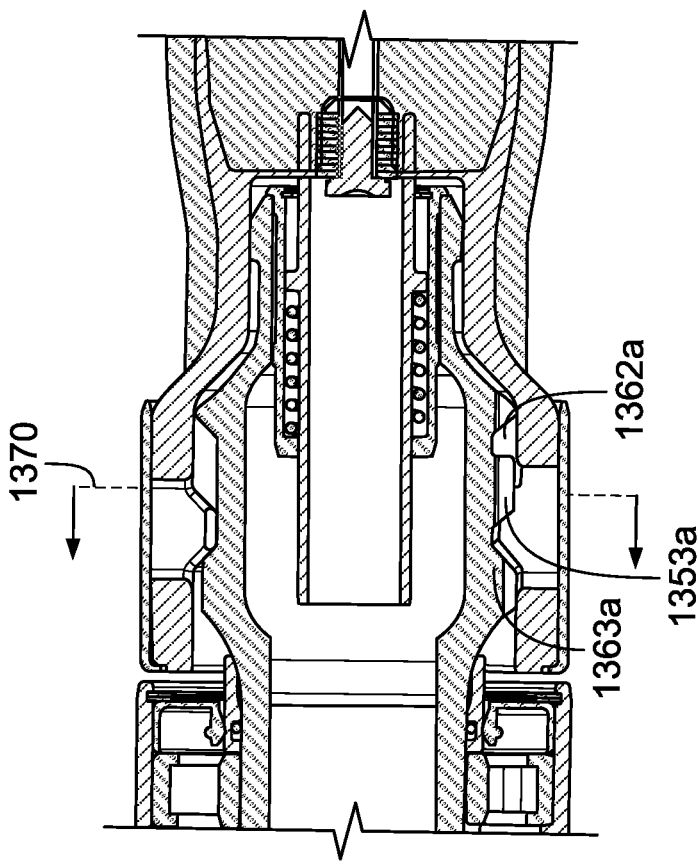
FIG. 13F is a diagram of a connection between a blade and a nacelle of an aircraft according to various embodiments.

A cross-sectional view of blade-nacelle mount 1302a is provided in FIGS. 13D-13G. FIGS. 13D and 13E illustrate a cross section when proprotor blade 1342a is installed. Conversely, FIGS. 13F and 13G illustrate a cross section when proprotor 1342 is pushed in the insertion direction during disassembly. Cross section 1370 is taken with respect to blade-nacelle mount 1302a and provided in FIGS. 13E and 13G.

As illustrated in FIG. 13E, the notches on the inside circumference of proprotor blade 1342a and the ridges on the outer circumference of proprotor hub 1341a are disposed at various positions along that the corresponding circumferences and relatively small subset of positions of proprotor blade 1342a relative to proprotor hub 1341a provide alignment with corresponding notches and gaps in the ridges. For example, as shown in FIG. 13E, the notches (e.g., notch 1362a) restrains the position of the proprotor blade 1342a and proprotor hub 1341a. For example, the engagement between the ridges and the notches restrains the position of proprotor blade 1342a relative to proprotor hub 1341a to preventing proprotor blade 1342a to rotate relative to proprotor hub 1341a.

As illustrated in FIG. 13G, when proprotor blade 1342a is pushed in the insertion direction (e.g., towards proprotor hub 1341a), the notches on the internal circumference of proprotor 1342 are not engaged with the ridges on the outer circumference of proprotor hub 1341*a*. For example, clocking feature contact feature 1353*a* is not engaged with notch 1362*a*, thereby allowing proprotor blade 1342*a* to be twisted and pulled out in the removal direction.

Figure 13H:
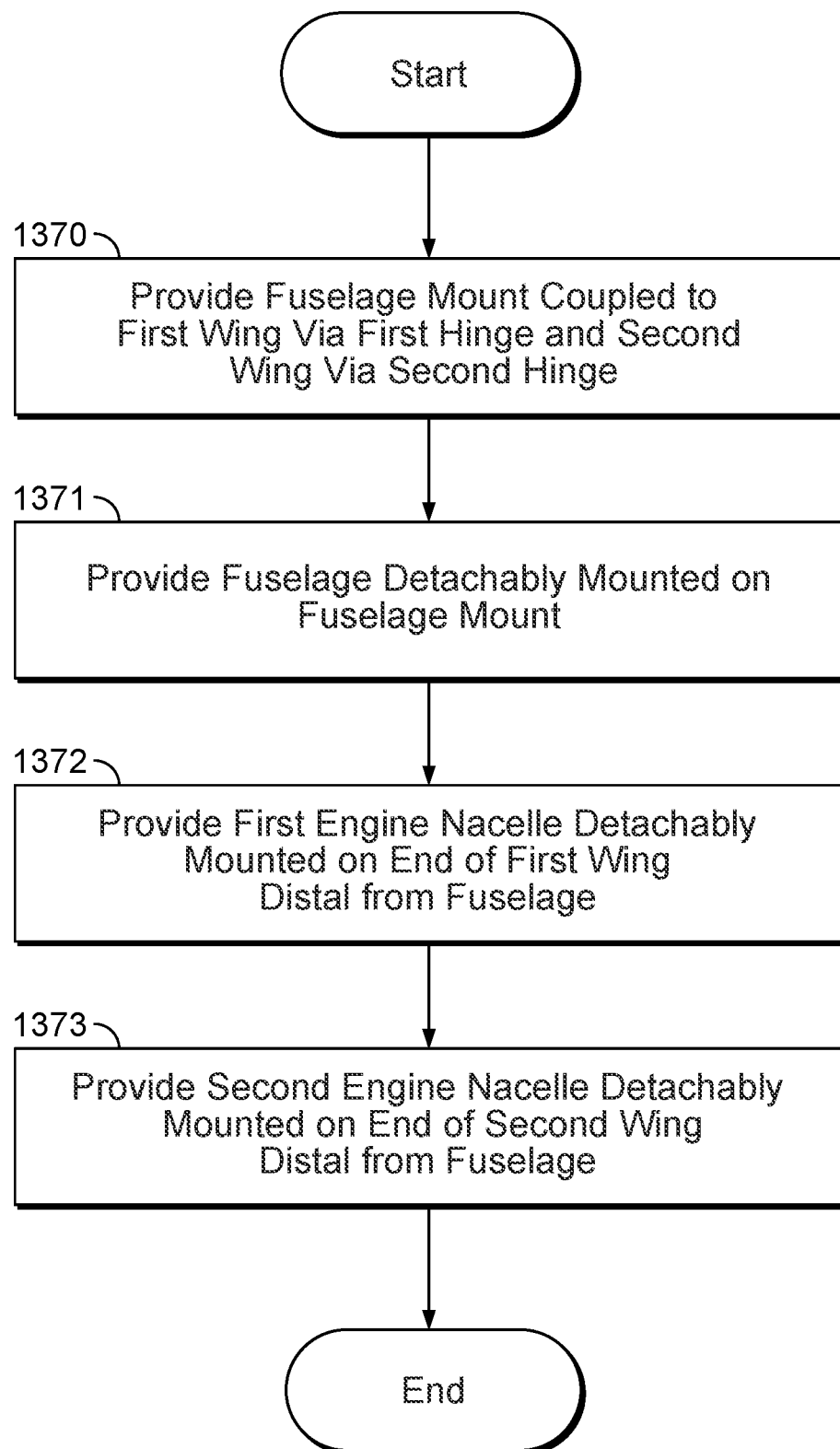
FIG. 13H is a flow diagram illustrating a process associated with a joint of a collapsible aircraft with two nacelles.

FIG. 13H is a flow diagram illustrating a process associated with a joint of a collapsible aircraft with two nacelles. In the example shown, in 1370, a fuselage mount coupled to a first wing via a first hinge and a second wing via a second hinge are provided. In 1371, a fuselage detachably mounted on the fuselage mount is provided. In 1372, a first engine nacelle detachably mounted on an end of the first wing distal from the fuselage is provided. In 1373, a second engine nacelle detachably mounted on an end of the second wing distal from the fuselage.

In some embodiments, a first nacelle mount between the first engine nacelle and the first wing is static; and a second nacelle mount between the second engine nacelle and the second wing is static. In some embodiments, the aircraft further comprises a fuselage detachably mounted on the fuselage mount. In some embodiments, the fuselage is detachably or foldably mounted on the fuselage mount by a hinge. In some embodiments, the aircraft comprises one or more first winglets detachably mounted to the first engine nacelle; and one or more second winglets detachably mounted to the second engine nacelle. In some embodiments, a first winglet connection between the one or more first winglets and the first engine nacelle is a blind mate connection. In some embodiments, a first winglet connection between the one or more first winglets and the first engine nacelle is a slide-in connection. In some embodiments, a first winglet connection between one or more first winglets and the first engine nacelle mounts the one or more first winglets to the first engine nacelle and establishes an electrical connection. In some embodiments, a connection between the between the first wing and the first engine nacelle is a slide-in connection. In some embodiments, a connection between the between the first wing and the first engine nacelle is a blind mate connection. In some embodiments, the aircraft further comprises a control computer, and a control circuit, where the control computer being connected to a first proprotor corresponding to the first engine nacelle and a second proprotor corresponding to the second engine nacelle; the first engine nacelle and the first wing respectively comprise first mating components that enable a first blind mate connection of the control circuit between the first engine nacelle and the first wing; and the second engine nacelle and the second wing respectively comprise second mating components that enable a second blind mate connection of the control circuit between the second engine nacelle and the second wing. In some embodiments, the first blind mate connection connects a fuel line and controls for the first proprotor. In some embodiments, a top of the first engine nacelle is mounted to a bottom of the first wing.

Figure 13I:
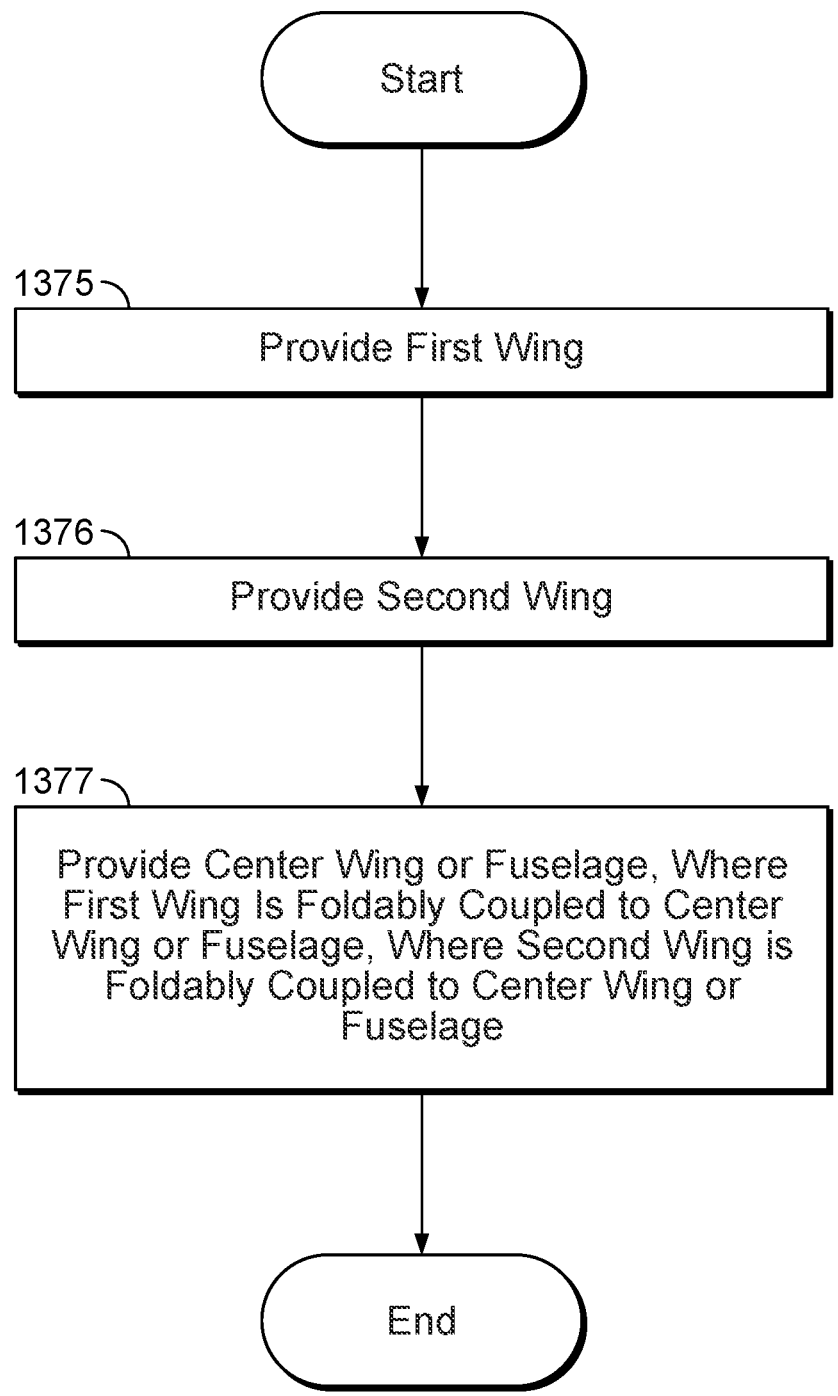
FIG. 13I is a flow diagram illustrating a process associated with a joint of a collapsible aircraft with two nacelles.

FIG. 13I is a flow diagram illustrating a process associated with a joint of a collapsible aircraft with two nacelles. In the example shown, in 1375, a first wing is provided. In 1376, a second wing is provided. In 1377, a center wing or fuselage is provided, where the first wing is foldably coupled to the center wing or fuselage, and where the second wing is foldably coupled to the center wing or fuselage. For example, the first wing folds about a pivot with respect to the center wing or fuselage, and the second wing folds about a pivot with respect to the center wing or fuselage. In some embodiments, when both wings are folded, the aircraft is in a horseshoe shape or U shape. In some embodiments, when both wings are folded, the aircraft is able to fit within a transportable envelope (e.g., a V22 transportable envelope).

In some embodiments, the first wing is coupled to a first nacelle and the second wing is coupled to a second nacelle, and wherein the first nacelle and second nacelle enable the aircraft to vertically take off and land.

Figure 13J:
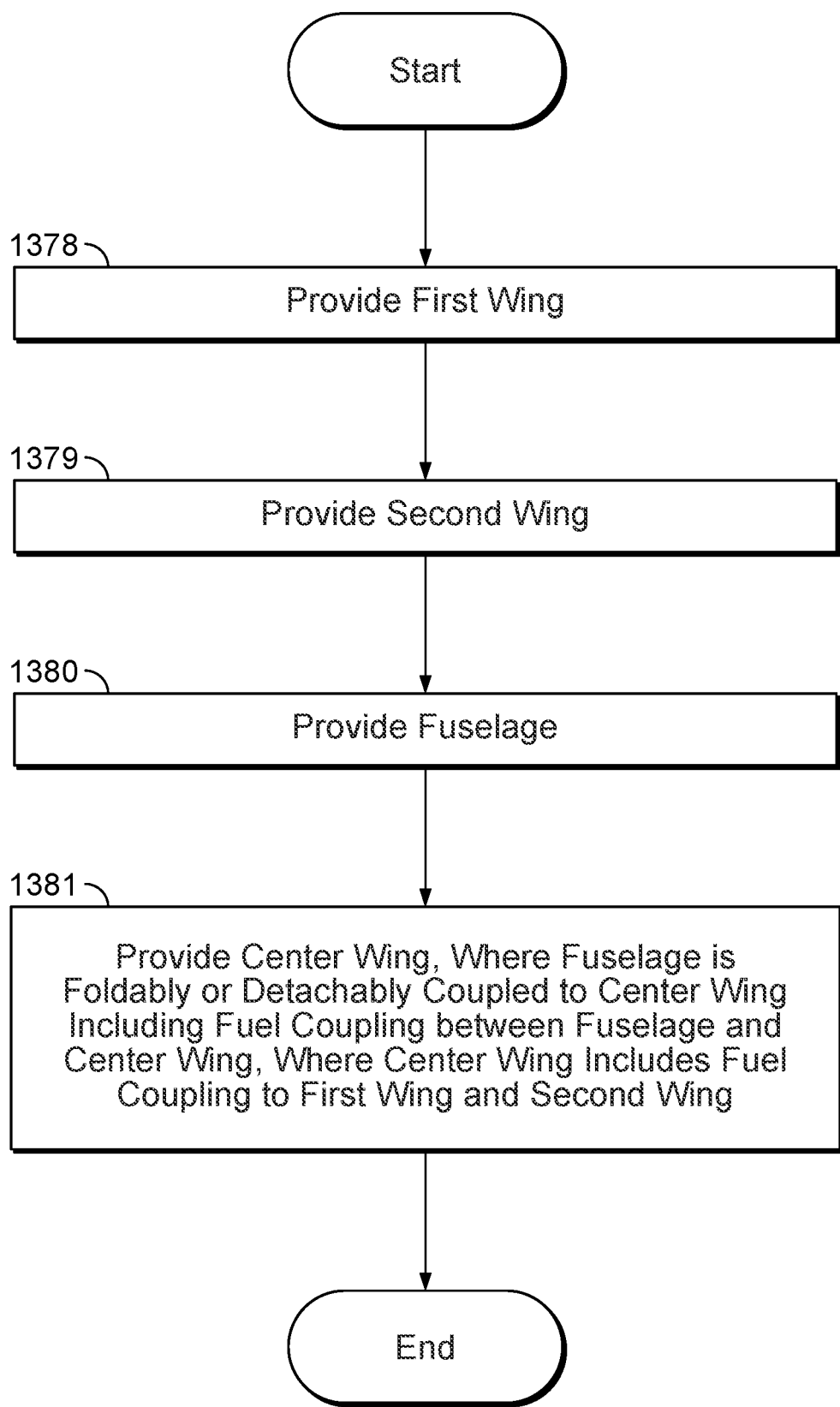
FIG. 13J is a flow diagram illustrating an embodiment of a process associated with a joint of a collapsible aircraft.

FIG. 13J is a flow diagram illustrating an embodiment of a process associated with a joint of a collapsible aircraft. In the example shown, in 1378, a first wing is provided. In 1379, a second wing is provided. In 1380, a fuselage is provided. In 1381, a center wing is provided, where the fuselage is foldably or detachably coupled to the center wing including a fuel coupling between the fuselage and the center wing, wherein the center wing includes a fuel coupling to the first wing and the second wing. In some embodiments, the fuselage is mechanically coupled to the center wing using a hinge or using fixed bolts. In some embodiments, the first wing is coupled to a first nacelle and the second wing is coupled to a second nacelle, and wherein the first nacelle and second nacelle enable the aircraft to vertically take off and land.

Figure 13K:
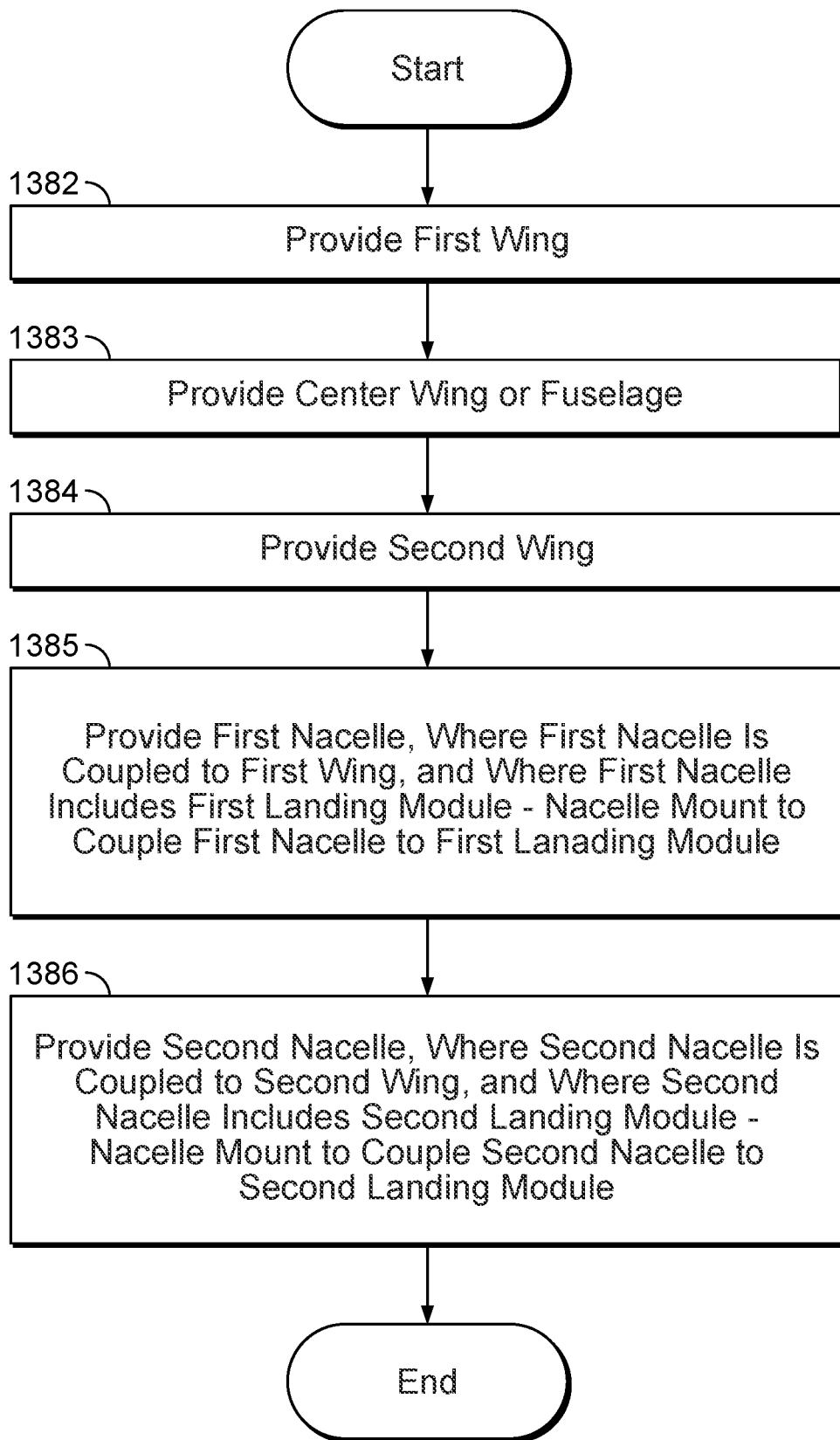
FIG. 13K is a flow diagram illustrating an embodiment of a process associated with a joint of a collapsible aircraft.

FIG. 13K is a flow diagram illustrating an embodiment of a process associated with a joint of a collapsible aircraft. In the example shown, in 1382, a first wing is provided. In 1383, a center wing or a fuselage is provided. In 1384, a second wing is provided. In 1385, a first nacelle is provided, where the first nacelle is coupled to the first wing, and wherein the first nacelle includes a first landing module—nacelle mount to couple the first nacelle to the first landing module. In 1386, a second nacelle is provided, where the second nacelle is couple to the second wing, and wherein the second nacelle includes a second landing module—nacelle mount to couple the first nacelle to the second landing module. In some embodiments, the aircraft is enabled to sit vertically using the first landing module and the second landing module. In some embodiments, the first nacelle and second nacelle enable the aircraft to vertically take off and land.

Figure 13L:
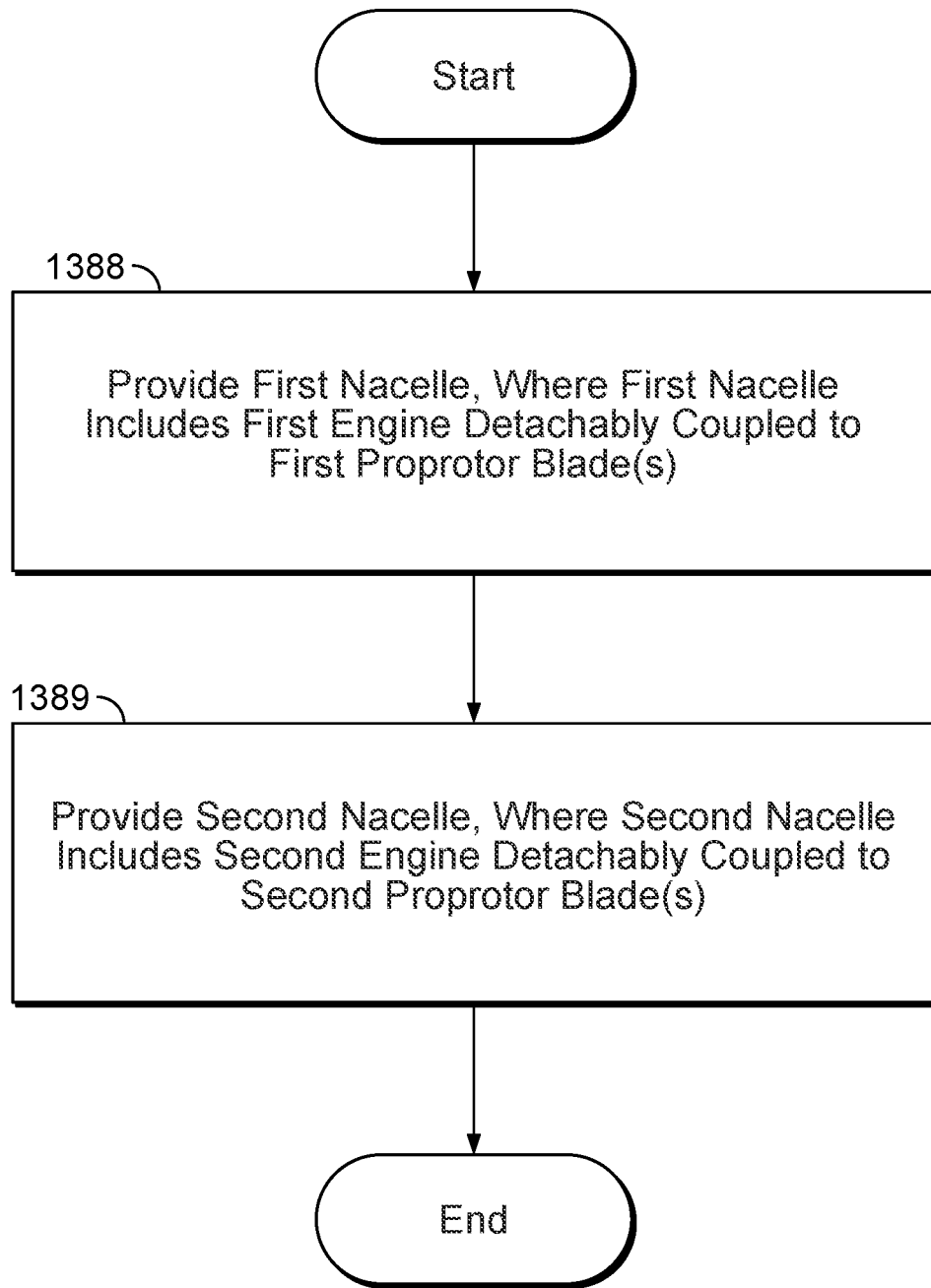
FIG. 13L is a flow diagram illustrating an embodiment of a process for a collapsible aircraft.

FIG. 13L is a flow diagram illustrating an embodiment of a process for a collapsible aircraft. In the example shown, in 1388, a first nacelle is provided, where the first nacelle includes a first engine detachably coupled to one or more first proprotor blades. In 1389, a second nacelle is provided, where the second nacelle includes a second engine detachably coupled to one or more second proprotor blades. In some embodiments, the first nacelle and second nacelle enable the aircraft to vertically take off and land. In some embodiments, each proprotor blade of the one or more first proprotor blades are connected to the first engine via a push and twist connection and of the one or more second proprotor blades are connected to the second engine via a push and twist connection.

FIGS. 14A-14K are diagrams of steps in a sequence of steps for assembling an aircraft to various embodiments. Although a sequence of steps 1475-1495 illustrates assembly of aircraft 1400 for deployment, various embodiments include a similar process for disassembly, such as a process that reverses the sequence of steps 1475-1495.

Figure 14A:
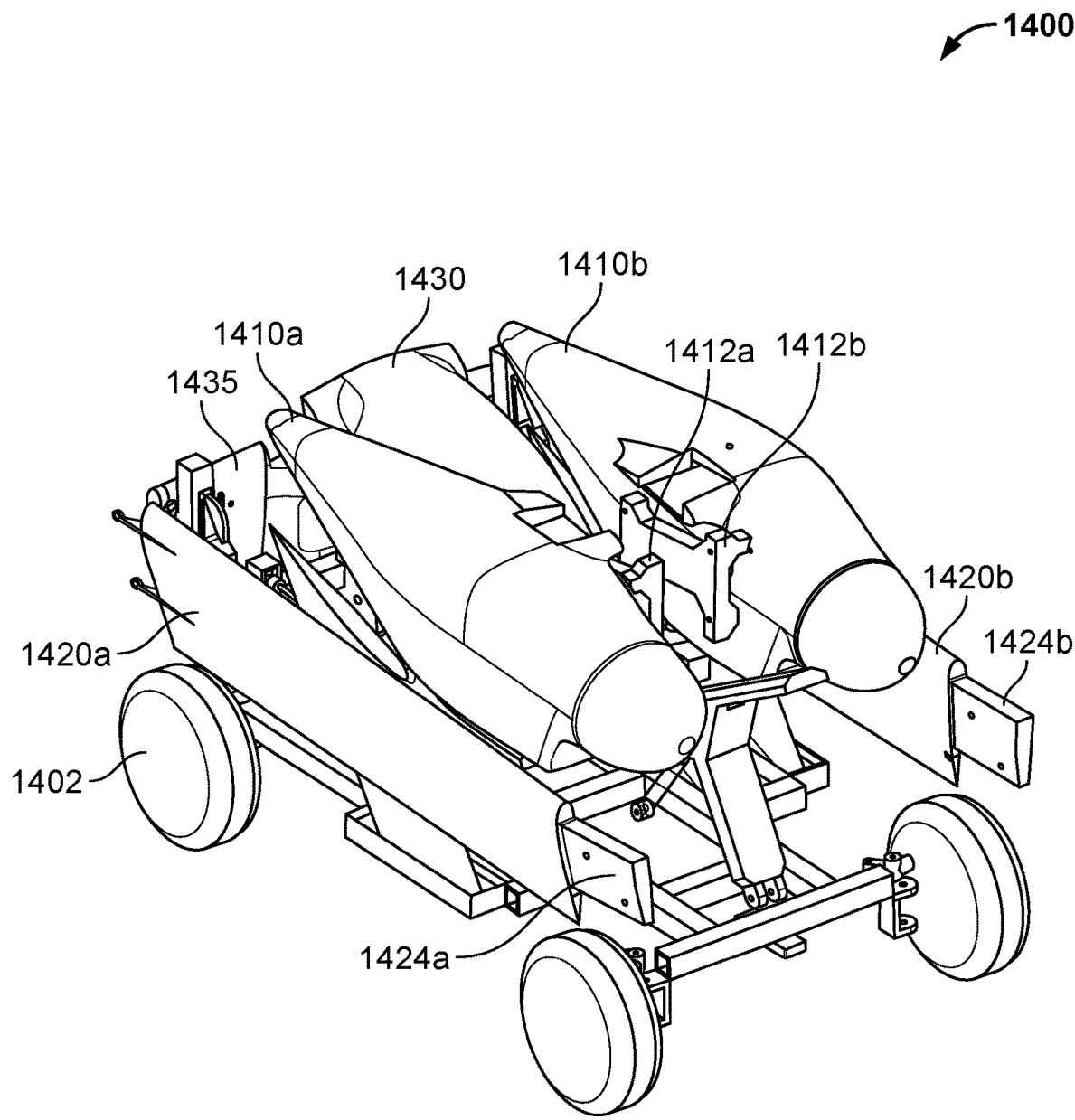
FIG. 14A-14K are diagrams of steps in a sequence of steps for assembling an aircraft according to various embodiments.

FIG. 14A is a diagram illustrating an embodiment of a collapsible aircraft. In the example shown in FIG. 14A of a state of aircraft 1400 labeled step 1475, cart 1402 carrying disassembled aircraft 1400 can be moved to a position at which aircraft 1400 is to be deployed. For example, cart 1402 carrying disassembled aircraft 1400 is removed from a transport vessel or a box/envelope in which aircraft 1400 was transported to the destination location at which aircraft 1400 is to be deployed.

As illustrated in FIG. 14A, first nacelle 1410*a* and second nacelle 1410*b* are respectively detached from first wing 1420a and second wing 1420b, respectively, and are placed/mounted on nacelle support structures (e.g., first nacelle support structure 1412a and second nacelle support structure 1412b) of cart 1402. In the disassembled state, first wing 1420a and second wing 1420b are folded around center wing 1435. First wing 1420a, second wing 1420b, and center wing 1435 may be respectively mounted/supported by support members of cart 1402, such as center support member 1440 illustrated in FIG. 14B. Fuselage 1430 is folded from center wing 1435 such that fuselage occupies the space between the folded first wing 1420a and second wing 1420b. During assembly, first nacelle 1410a is connected to first wing 1420a via first nacelle support member 1424a on first wing 1420a. Similarly, during assembly, second nacelle 1410b is connected to second wing 1420b via second nacelle support member 1424b on second wing 1420b. As an example, the nacelle support members on the wings are inserted into the corresponding nacelles and the nacelles are mounted (e.g., bolted) to the wings.

Figure 14B:
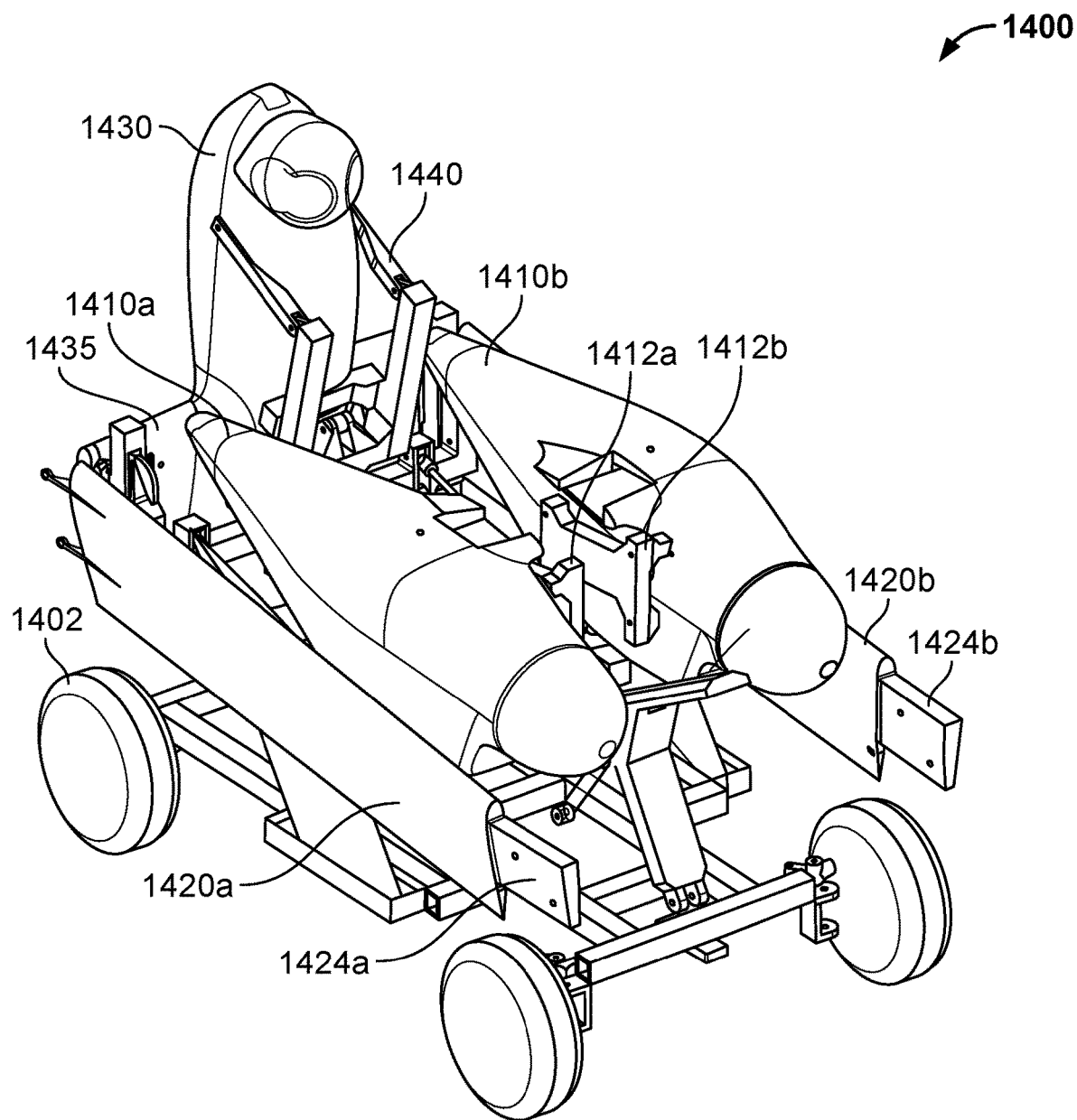

FIG. 14B is a diagram illustrating an embodiment of a collapsible aircraft. In the example shown in FIG. 14B of a state of aircraft 1400 labeled step 1477, fuselage 1430 is shown rotated upwards (e.g., using a hinge to pivot fuselage 1430 to a fuselage assembled state where fuselage 1430 is coupled to center wing 1435). Fuselage 1430 is transitioned from a disassembled state in which fuselage 1430 rests in the space defined by folded first wing 1420a and second wing 1420b to an assembled state in which fuselage 1430 engages with center wing 1435 and extends substantially vertically from the ground. In some embodiments, assembly of fuselage 1430 includes rotating fuselage around an axis defined by a hinge mount that connects fuselage 1430 and center wing 1435. In response to fuselage 1430 being rotated upwards and transitioned to an assembled state, fuselage 1430 is fixedly mounted to center wing 1435, such as by inserting/tightening interface bolts.

Figure 14C:
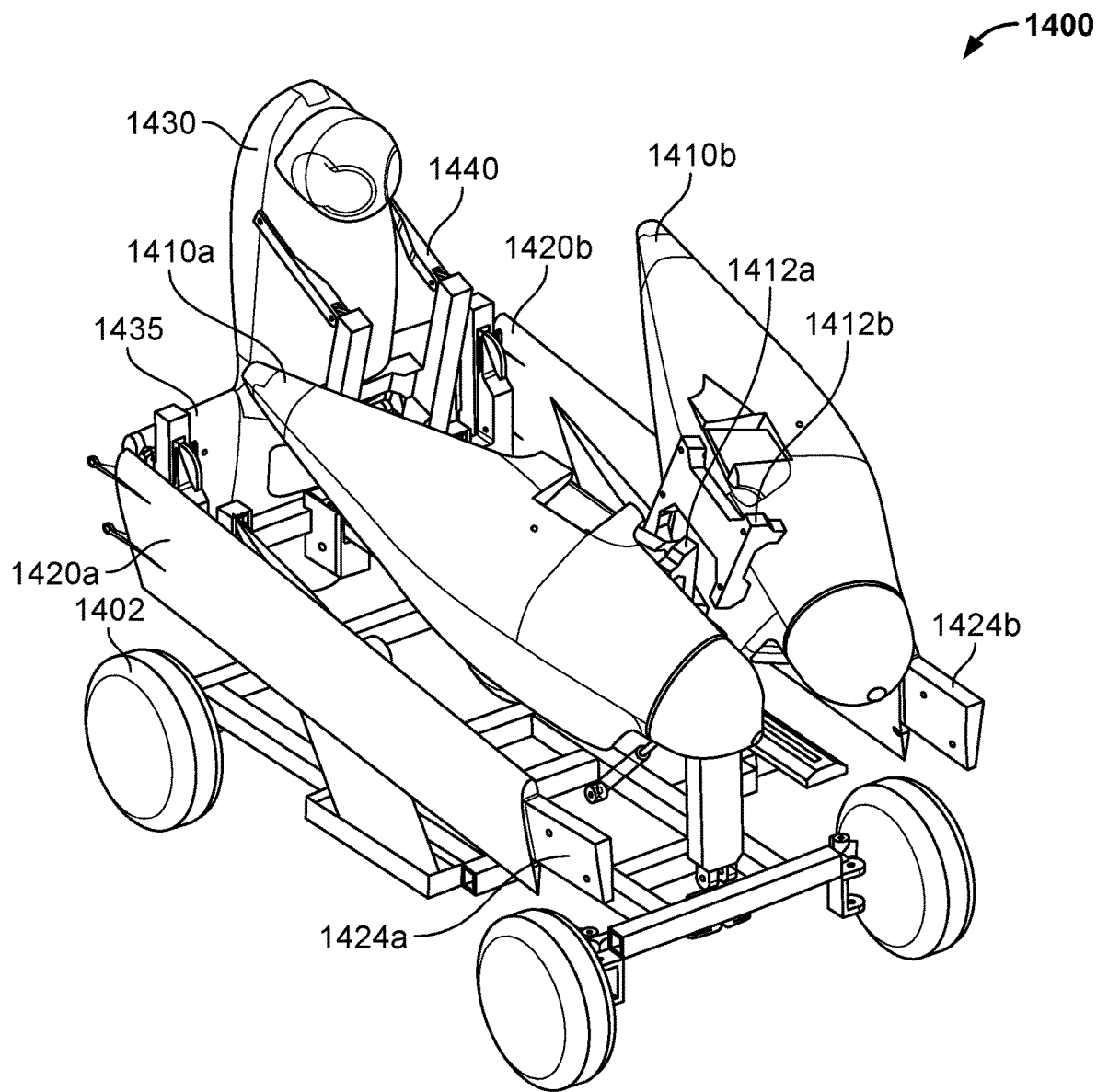

FIG. 14C is a diagram illustrating an embodiment of a collapsible aircraft. In the example shown in FIG. 14C of a state of aircraft 1400 labeled step 1479, first nacelle 1410a and second nacelle 1410b begin to move to a position for coupling with first wing 1420a and second wing 1420b, respectively. In some embodiments, the move to the position for coupling is assisted using first nacelle support structure 1412a and second nacelle support structure 1412b. In some embodiments, fuselage 1430 is rotated upwards by moving center support member 1440 of cart 1402. Cart 1420 may comprise a set of support members that support various components of the disassembled aircraft 1400. One or more of the support members may be moved based on actuating an actuating mechanism (e.g., a hydraulic piston, a pneumatic piston, a motor, etc.).

Figure 14D:
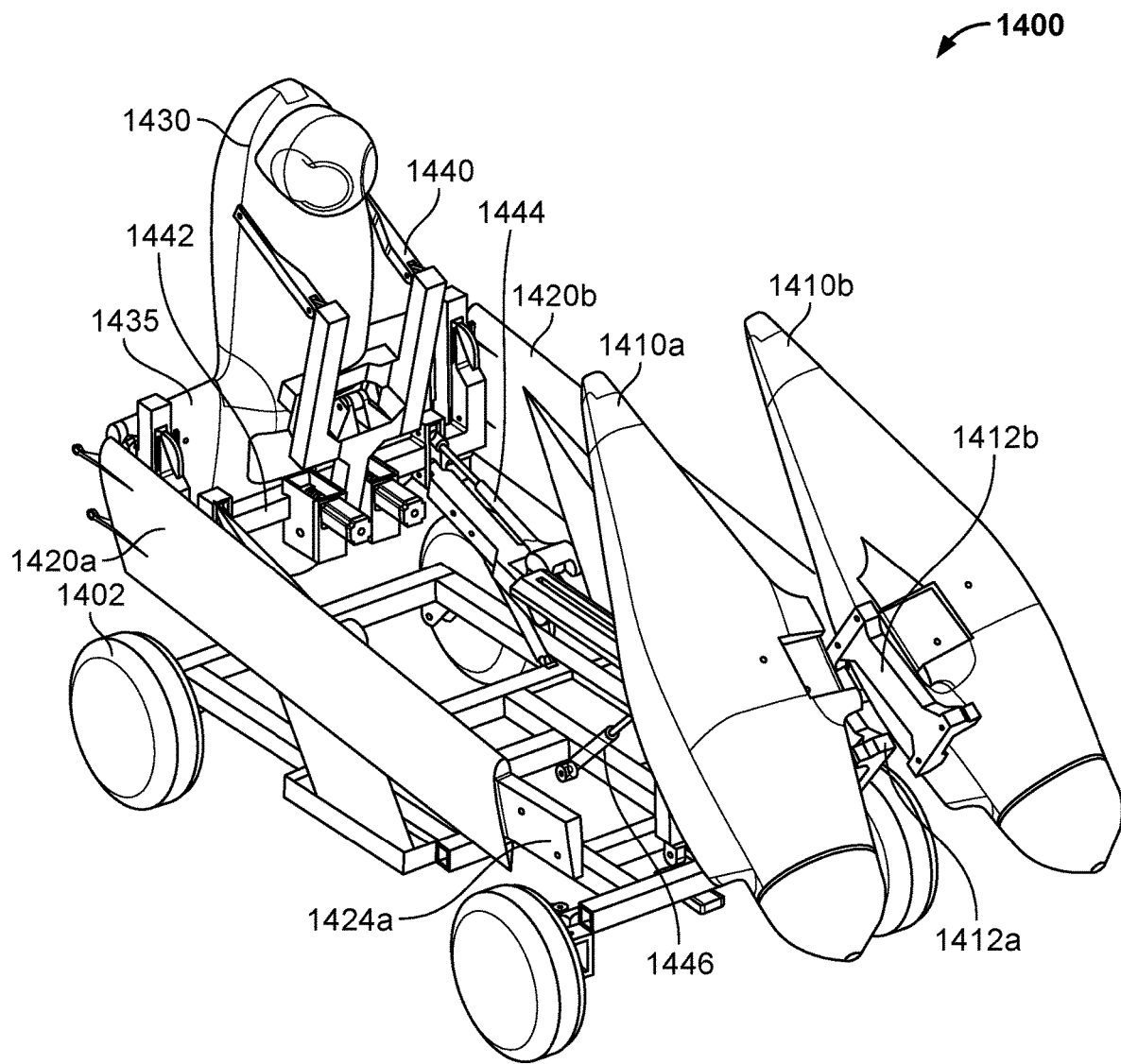

FIG. 14D is a diagram illustrating an embodiment of a collapsible aircraft. In the example shown in FIG. 14D of a state of aircraft 1400 labeled step 1481, center support member 1440 of cart 1402 raises center wing 1435, fuselage 1430, first wing 1420a, and second wing 1420b that are positioned in a horseshoe or U shape. First nacelle 1410a and second nacelle 1410b are raised using first nacelle support structure 1412a and second nacelle support structure 1412b towards a vertical position. In some embodiments, first nacelle 1410a and second nacelle 1410b are rotated in orientation to place the proprotor hub of the engine facing up and the landing support member ends of the nacelles facing down. Actuating mechanisms are more clearly illustrated in FIG. 14D and are no longer obstructed by the nacelles being in the disassembled position/state. For example, cart 1402 comprises actuating member 1444 (e.g., a hydraulic piston, a pneumatic piston, etc.) that is actuated to apply force to support member 1442 connected to center wing 1435. As another example, cart 1402 comprises actuating member 1446 (e.g., a hydraulic piston, a pneumatic piston, etc.) that is actuated to apply force to first nacelle support structure 1412a and/or second nacelle support structure 1412b connected to first nacelle 1410a and/or second nacelle 1410b. Cart 1402 may comprise mechanical or robotic support to moving components of the disassembled aircraft 1400 during assembly.

Figure 14E:
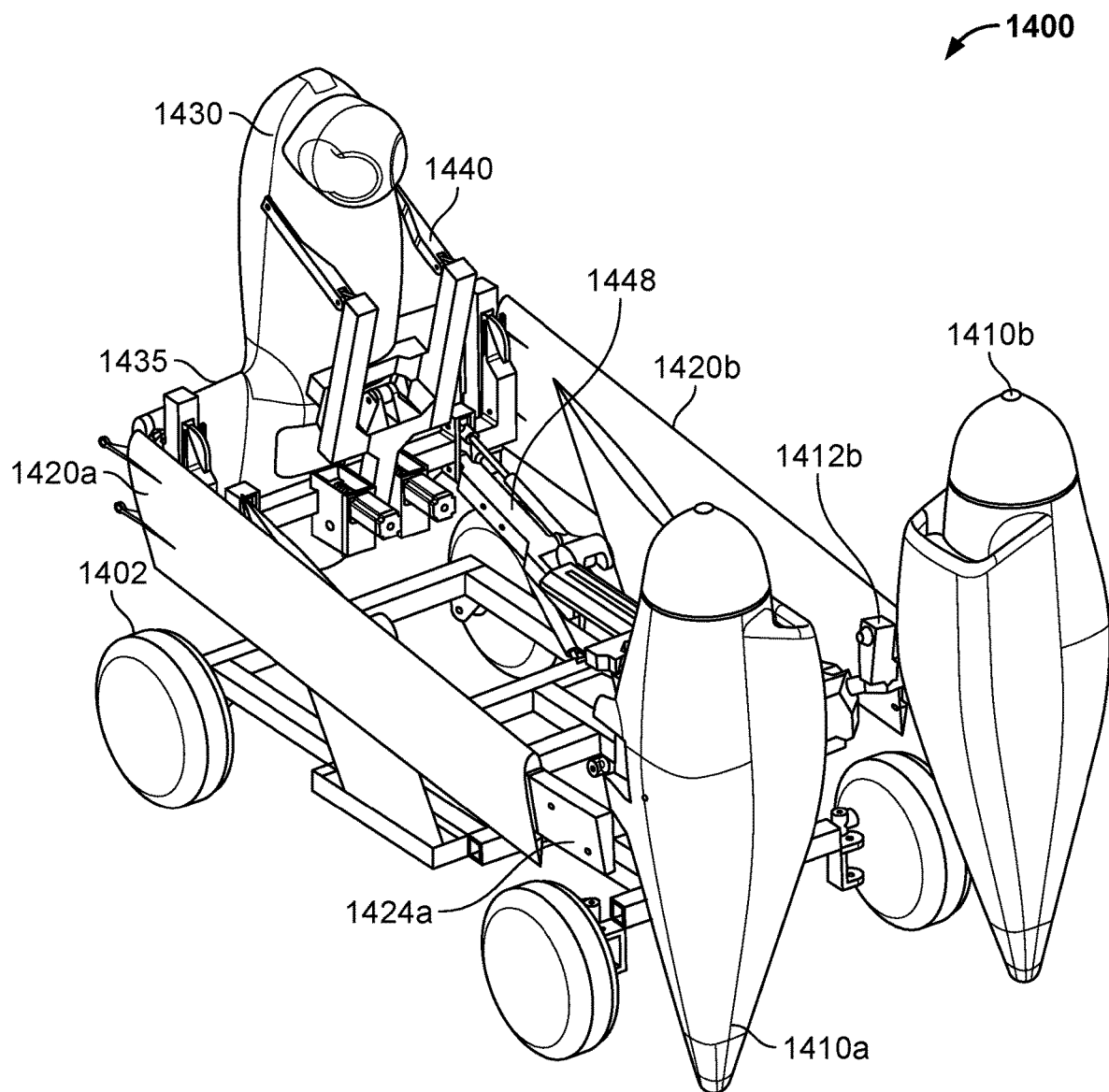

FIG. 14E is a diagram illustrating an embodiment of a collapsible aircraft. In the example shown in FIG. 14E of a state of aircraft 1400 labeled step 1483, center support member 1440 of cart 1402 raises center wing 1435, fuselage 1430, first wing 1420a, and second wing 1420b that are positioned in a horseshoe or U shape. First nacelle 1410a and second nacelle 1410b are shown in an upright position using first nacelle support structure 1412a and second nacelle support structure 1412b towards a vertical position. In some embodiments, first nacelle 1410a and second nacelle 1410b were rotated into the orientation to place the proprotor hub of the engine facing up and the landing support member ends of the nacelles facing down preparing the nacelles for mounting include moving the nacelles to a position at which nacelle support members on the wings can be inserted into, or otherwise engaged with, the nacelles. Actuating mechanisms and supports are more clearly illustrated in FIG. 14E and are no longer obstructed by the nacelles being in the disassembled position/state. For example, cart 1402 comprises actuating member 1448 (e.g., a support arm) that is actuated to apply force to support center support member 1440 connected to fuselage 1430.

FIGS. 14C-14E illustrates first nacelle 1410a and second nacelle 1410b being moved from the disassembled position/state of FIG. 14E. In some embodiments, the nacelles are moved from the disassembled position to the position at which the nacelles are mounted to the wings by actuating one or more actuation mechanisms. For example, as illustrated in FIG. 14D, actuating member 1446 may be actuated to extend and apply force one or more of nacelle support structures 1412a or 1412b to which first nacelle 1410a and second nacelle 1410b are respectively connected. In response to actuating member 1446 being actuated, actuating member 1446 causes nacelle support structures 1412a or 1412b (and thus first nacelle 1410a and second nacelle 1410b) to transition to a position at which nacelle support members on the wings can be inserted into, or otherwise engaged with, first nacelle 1410a and second nacelle 1410b.

Figure 14F:
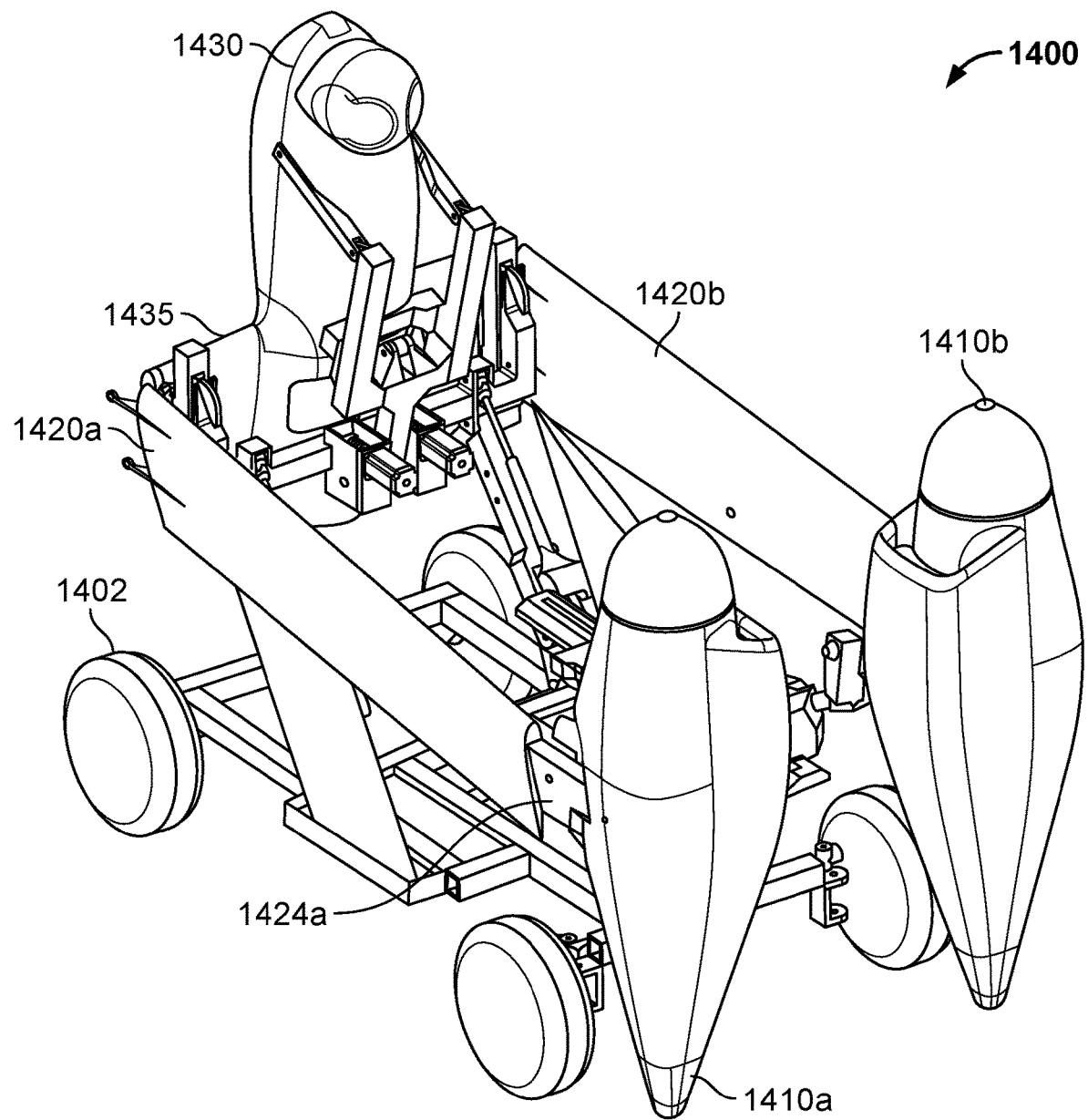

FIG. 14F is a diagram illustrating an embodiment of a collapsible aircraft. In the example shown in FIG. 14F of a state of aircraft 1400 labeled step 1485, the wings are positioned for mounting to the nacelles. In the example shown, first wing 1420a and second wing 1420b are moved (e.g., raised) to align nacelle support members 1424a, 1424b with first nacelle 1410a and second nacelle 1410b, respectively. In some embodiments, moving first wing 1420a and second wing 1420b for alignment includes raising fuselage 1430 and/or center wing 1435, such as by actuating movement of support member 1448. As fuselage 1430 and center wing 1435 are moved, first wing 1420a and 1420b are moved in turn.

Figure 14G:
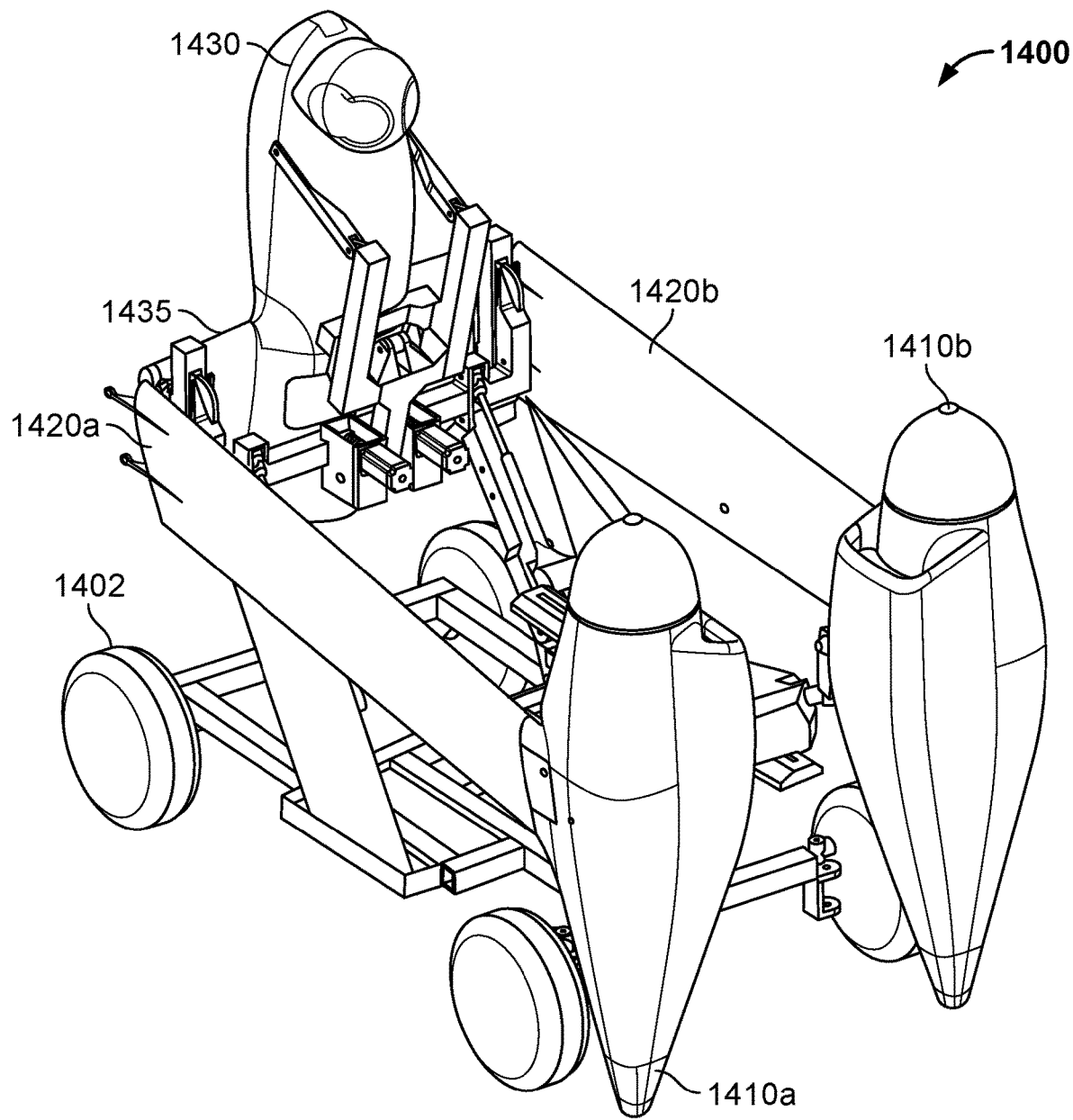

FIG. 14G is a diagram illustrating an embodiment of a collapsible aircraft. In the example shown in FIG. 14G of a state of aircraft 1400 labeled step 1487, the nacelles are attached to the wings. In the example shown, first nacelle 1410a is attached to first wing 1420a, and second nacelle 1410b is attached to second wing 1420b. For example, referring back to FIG. 9B, first nacelle support member 924*a* (e.g., corresponding to first nacelle support member 1424*a* of FIG. 14F) is mounted to first nacelle 910*a*. One or more attachment mechanisms, such as an interface bolt, is used to fixedly mount first nacelle 910*a* to first wing 920*a*. Attaching the wings to the nacelles may include moving the wings towards the nacelles (e.g., translating along an axis towards the nacelles) engaging the nacelles with the wings, and fixedly mounting the nacelles to the wings. In some embodiments, first nacelle 1410*a* and second nacelle 1410*b* are mounted to a bottom of first wing 1420*a* and second wing 1420*b*, respectively.

Figure 14H:
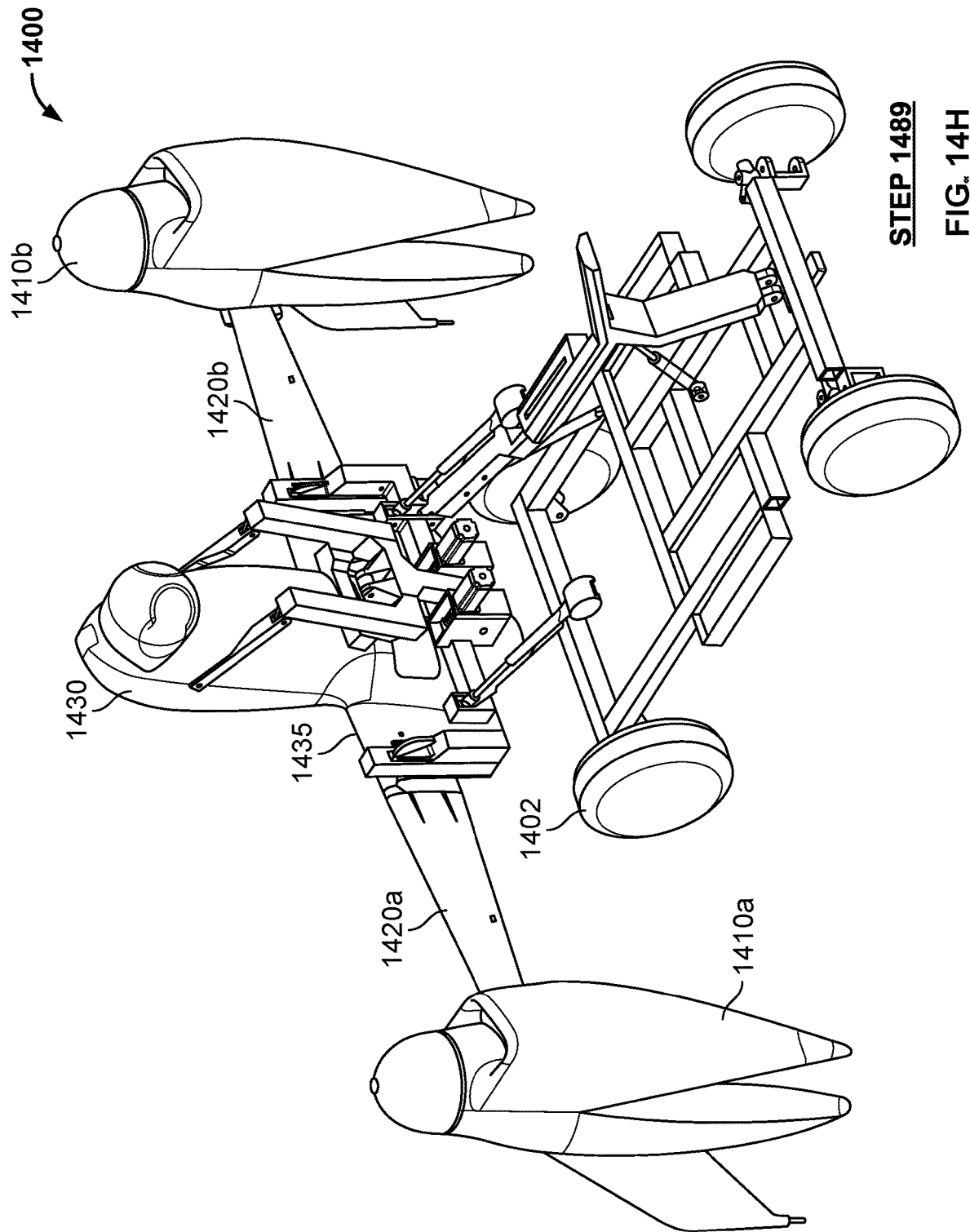

FIG. 14H is a diagram illustrating an embodiment of a collapsible aircraft. In the example shown in FIG. 14H of a state of aircraft 1400 labeled step 1489, the wings are extended for fixedly mounting the wings to the center wing. In response to the nacelles being fixedly mounted to the wings, the wings are moved to the position at which the wings are to be fixed to the center wing. In some embodiments, the wings are respectively connected to the center wing via a hinge. Accordingly, the wings are rotated around the axes respectively defined by the hinges until the wings are level (or substantially level) with the center wing. Mounting the wings to the center wing may include configuring an attachment mechanism, such as an interface bolt, to fixedly mount the wings to the center wing. In some embodiments, the winglets are attached using a ball spring pin and/or a spring load locking pin.

Figure 14I:
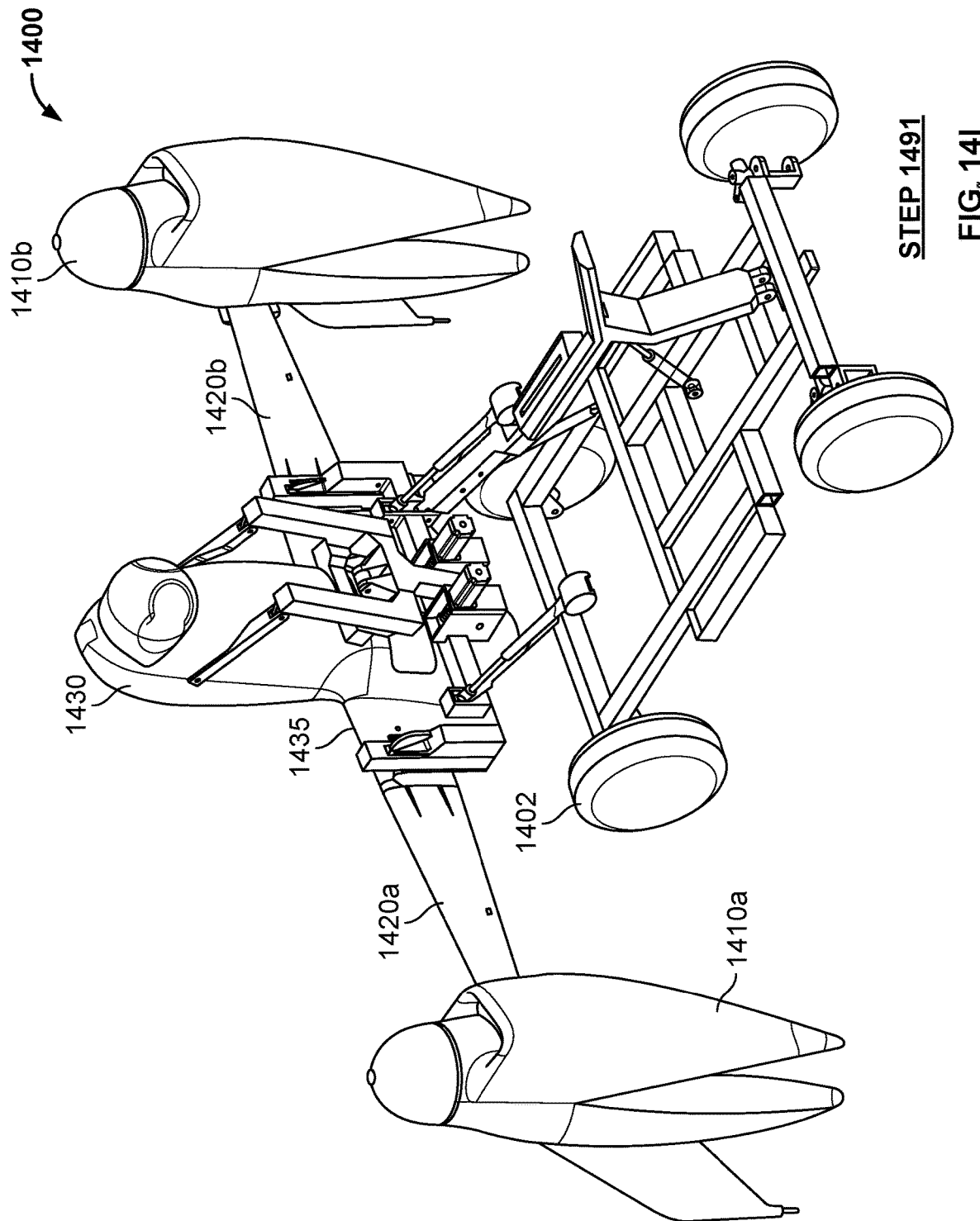

A FIG. 14I is a diagram illustrating an embodiment of a collapsible aircraft. In the example shown in FIG. 14I of a state of aircraft 1400 labeled step 1491, the landing module is configured to position landing support members in a landed position. For example, the landing support members are transitioned to a state in which aircraft 1400 may stand on the ground. Referring to the example illustrated in FIGS. 12B-12D, landing support members 1452*b* and 1453*b* are transitioned to an extended state, such by actuating an actuation mechanism.

Figure 14J:
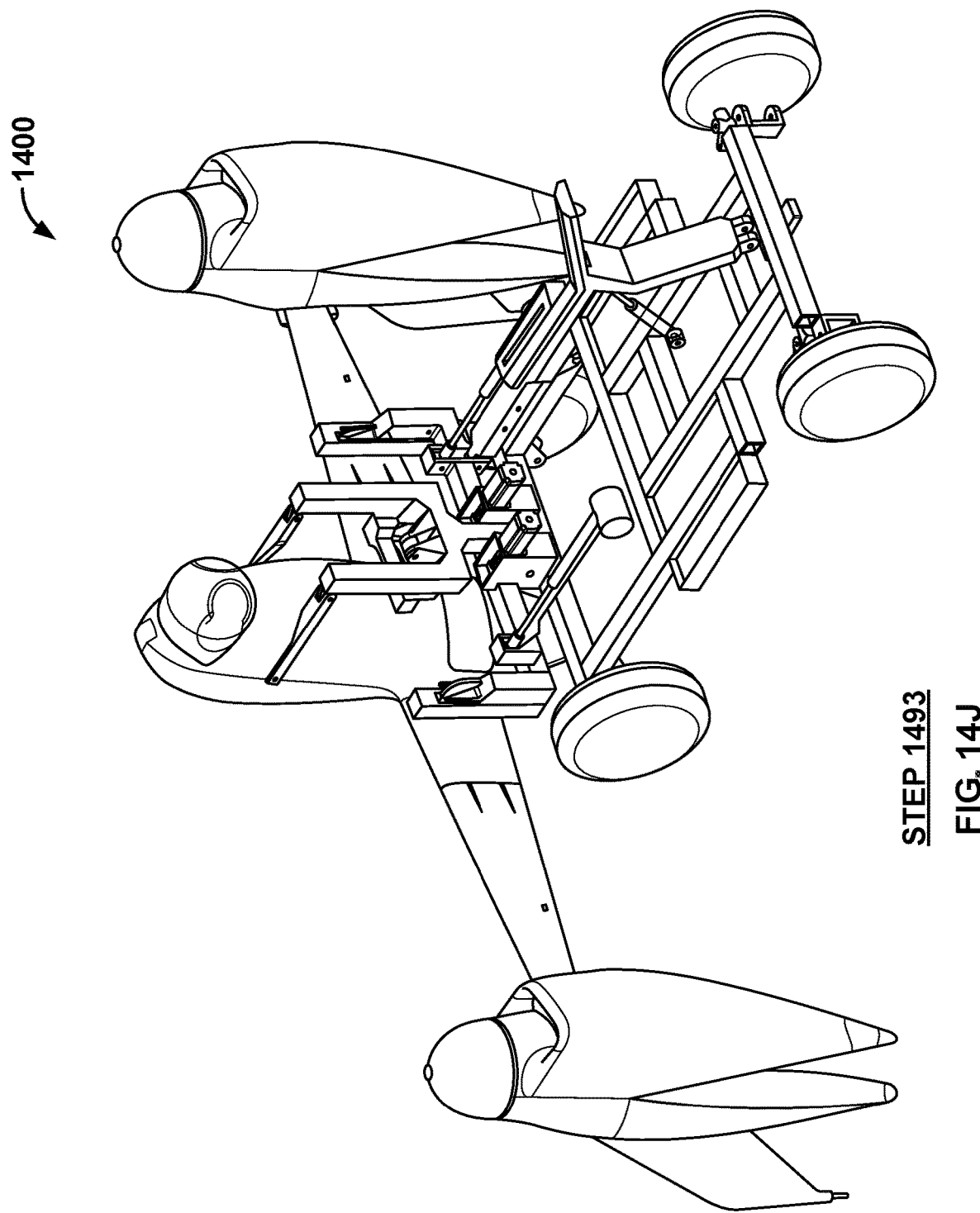

FIG. 14J is a diagram illustrating an embodiment of a collapsible aircraft. In the example shown in FIG. 14J of a state of aircraft 1400 labeled step 1493, aircraft 1400 is lowered to the ground. In some embodiments, lowering aircraft 1400 to the ground includes actuating one or more actuation mechanisms coupled to support members of cart 1402. For example, actuating member 1444 is actuated to cause center support member 1440 to be lowered until feet on the landing support members are resting on the ground. In response to aircraft 1400 being resting in a landed position on the ground, aircraft 1400 is detached from various support members. For example, center support member 1440 is detached from fuselage 1430 and/or center wing 1435.

Figure 14K:
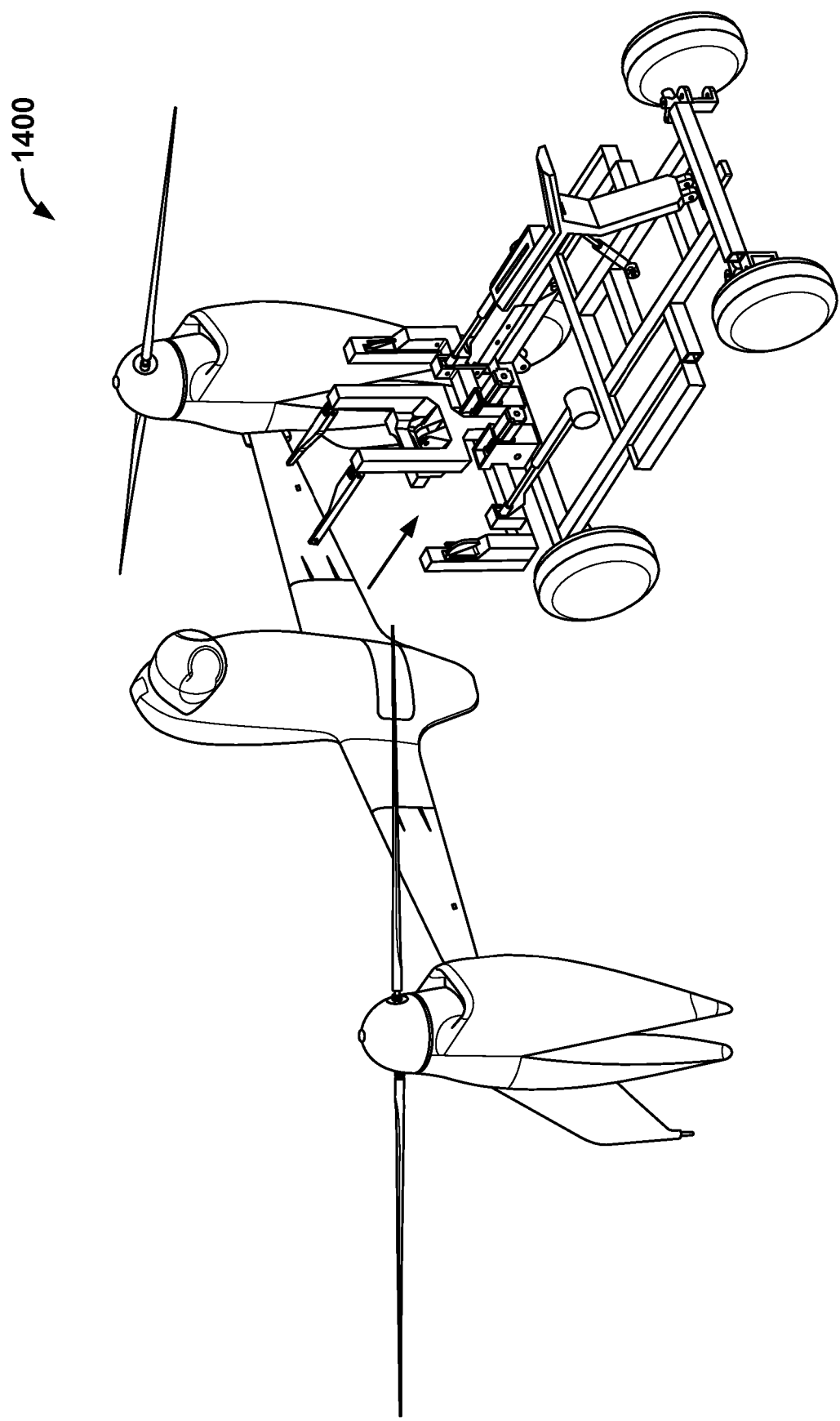

FIG. 14K is a diagram illustrating an embodiment of a collapsible aircraft. In the example shown in FIG. 14K of a state of aircraft 1400 labeled step 1495, cart 1402 is removed, such as by pulling cart away from aircraft 1400. In the case of an aircraft propelled using internal combustion engines, the fuel reservoirs in aircraft 1400 are filled with fuel, and aircraft 1400 is set ready for deployment. In response to aircraft 1400 being set ready for deployment, aircraft 1400 may be controlled to initiate a take-off sequence to vertically take off from the location at which aircraft 1400 was assembled.

In some embodiments, the proprotors are configured for flight. The proprotor blades are connected to the proprotor (e.g., proprotor hub). The connection of the proprotors blades may include pushing the proprotor blade in an insertion direction towards the proprotor hub, twisting the proprotor blade, and thereafter allowing a biasing force to bias the proprotor blade in a direction opposite to the insertion direction (e.g., in a removal direction). In some embodiments, the proprotor blades are connected in step 1493 while the aircraft is lowered but still connected to cart 1402.

Figure 15A:
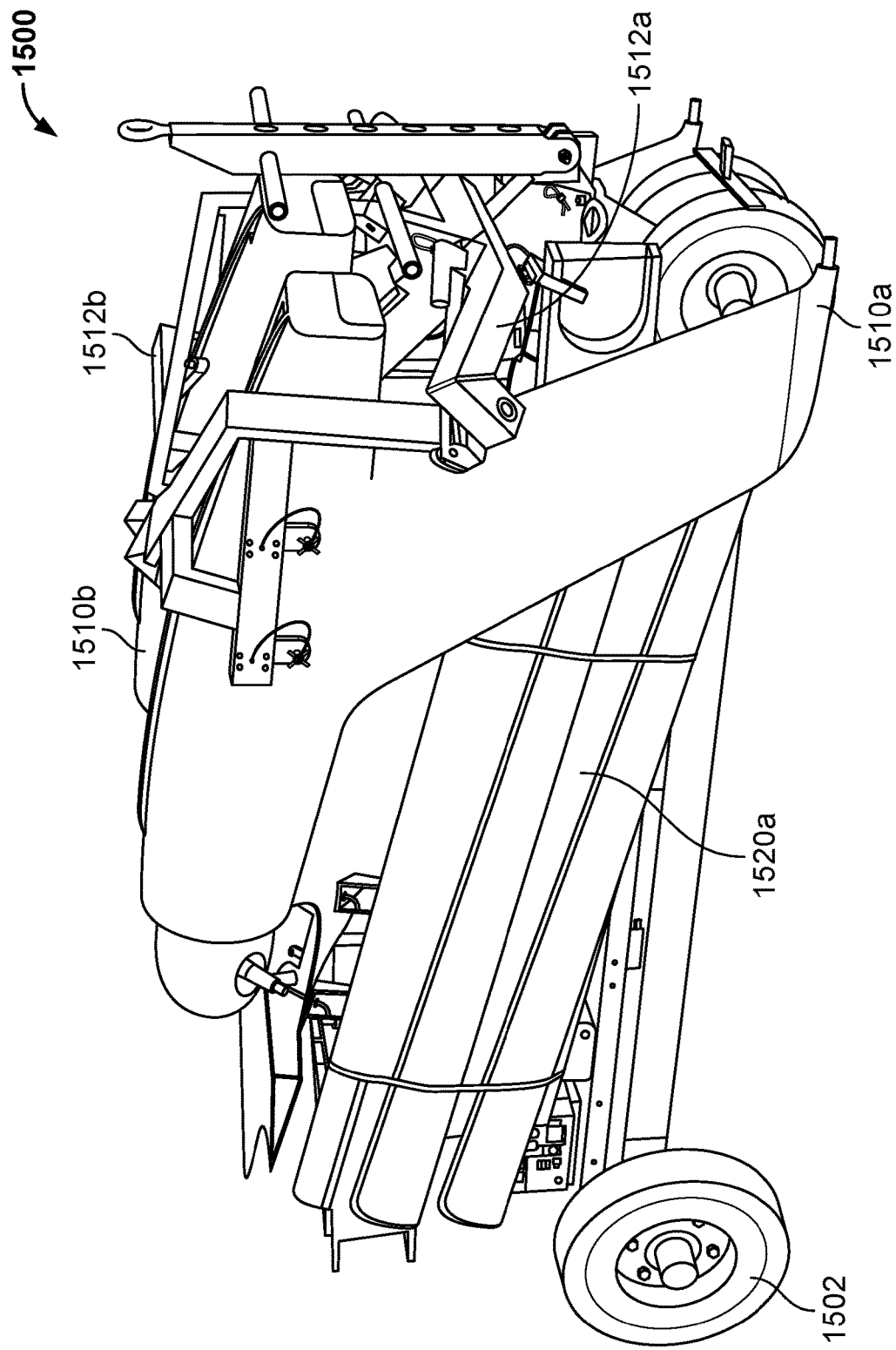
FIG. 15A-15R are diagrams of steps in a sequence of steps for assembling an aircraft according to various embodiments.
Figure 15B:
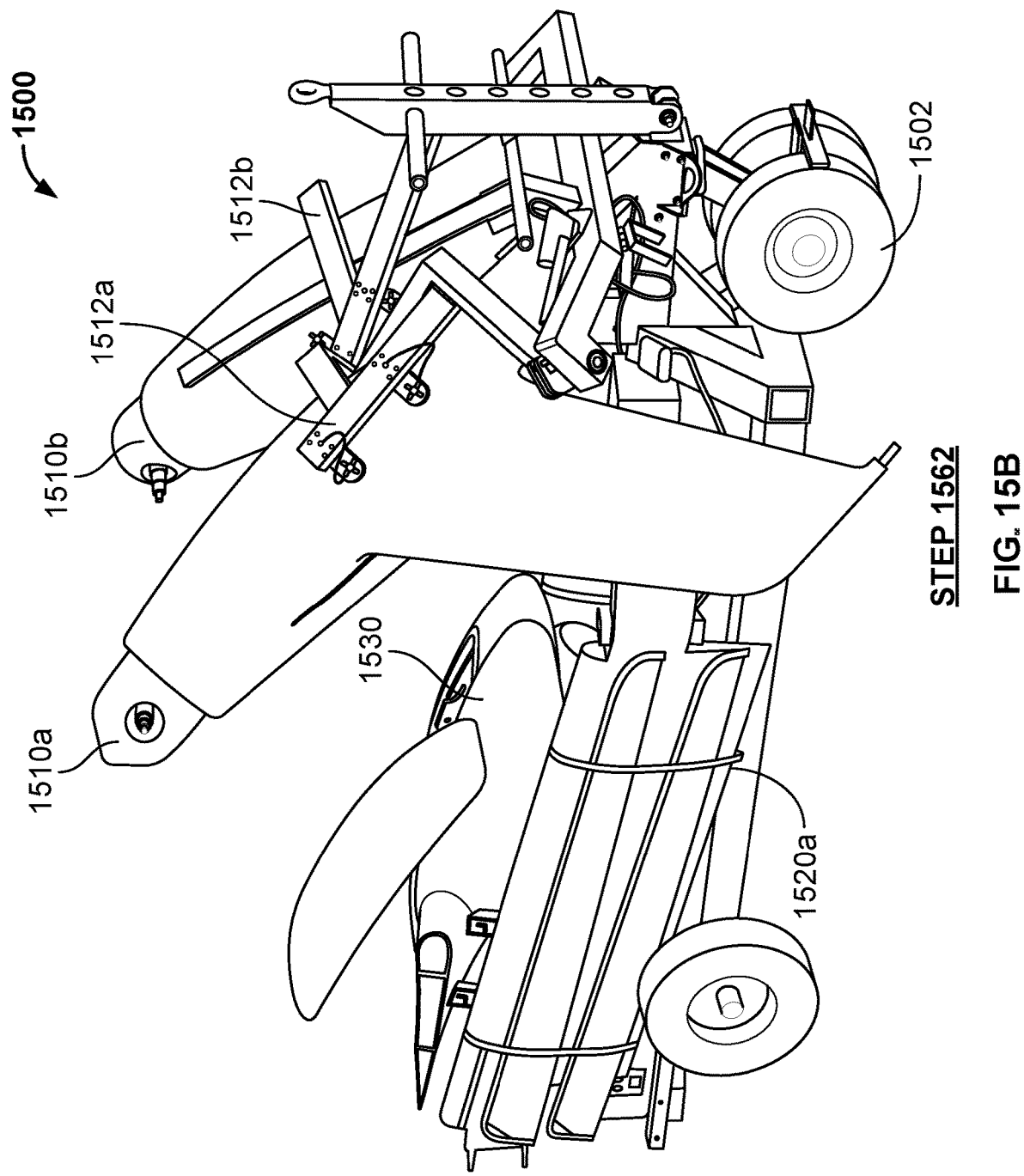
Figure 15C:
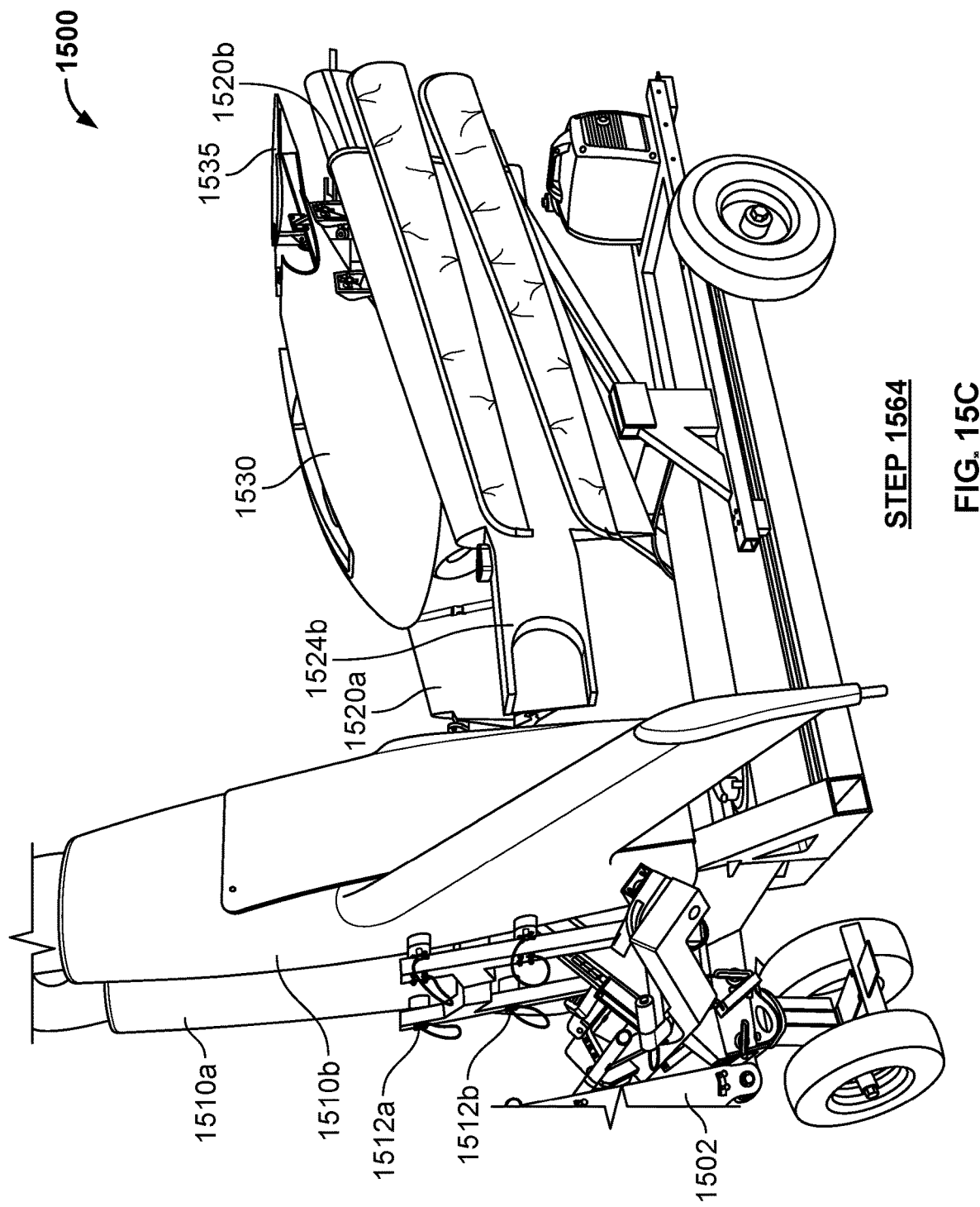
Figure 15D:
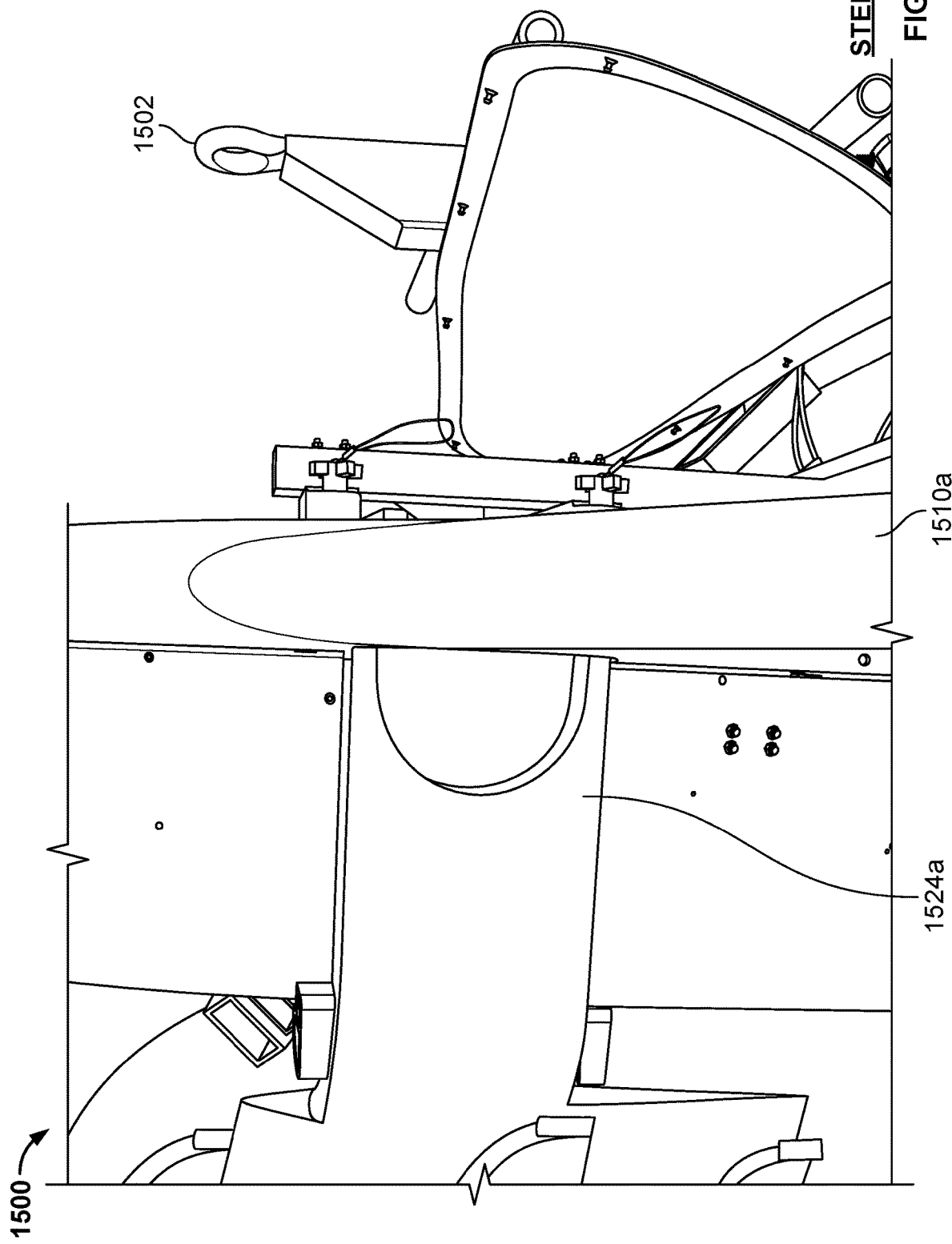
Figure 15E:
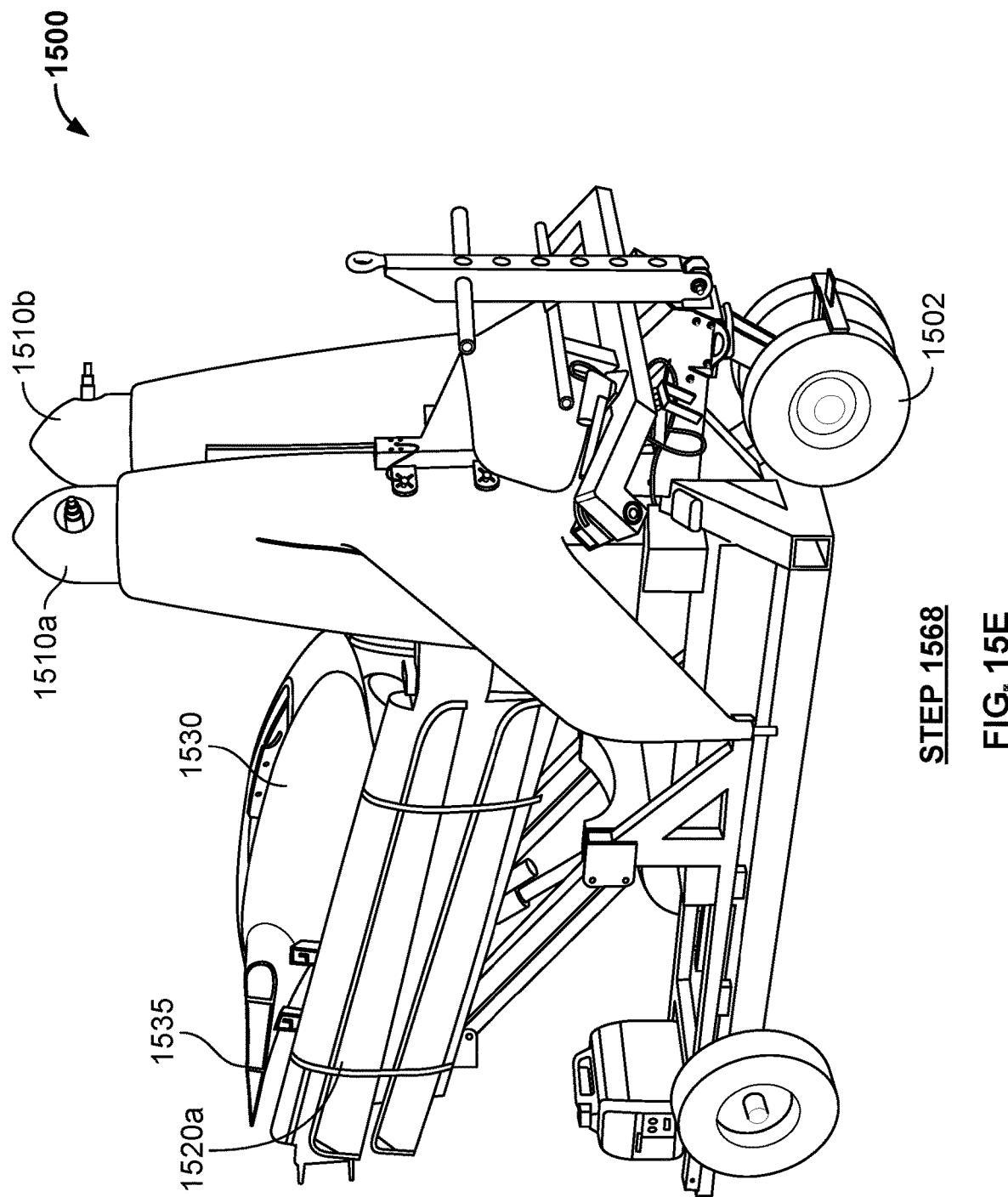
Figure 15F:
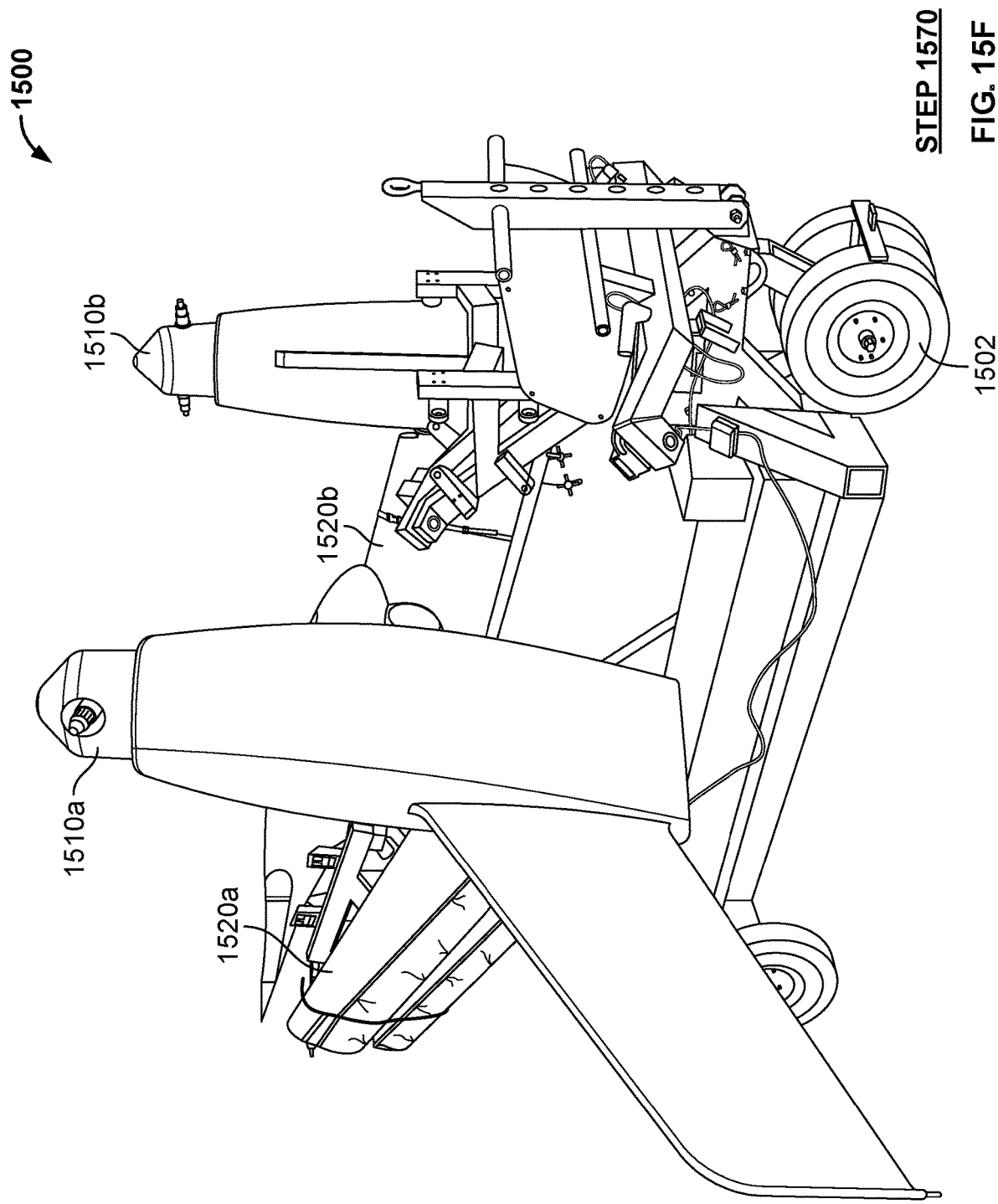
Figure 15G:
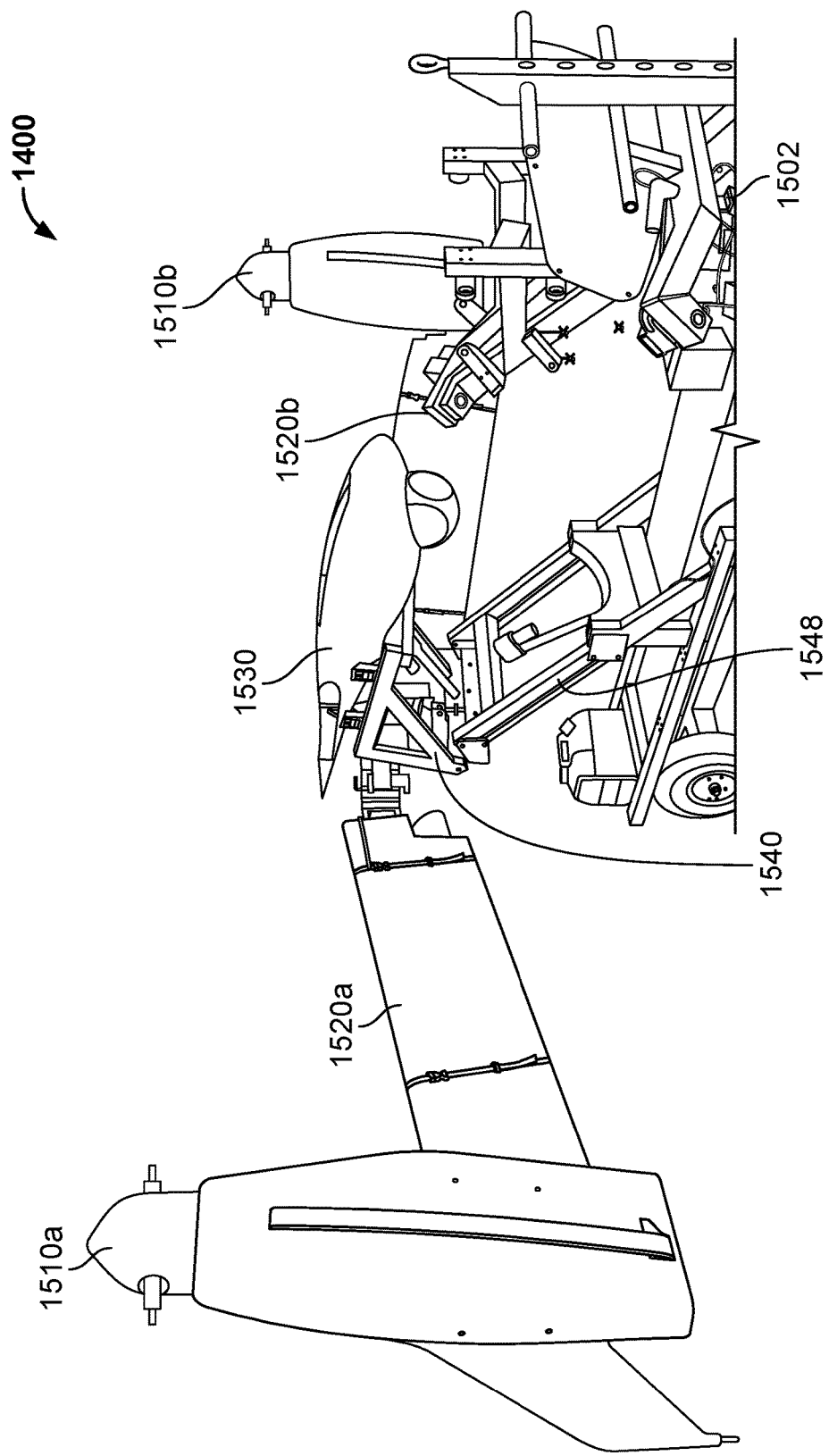
Figure 15H:
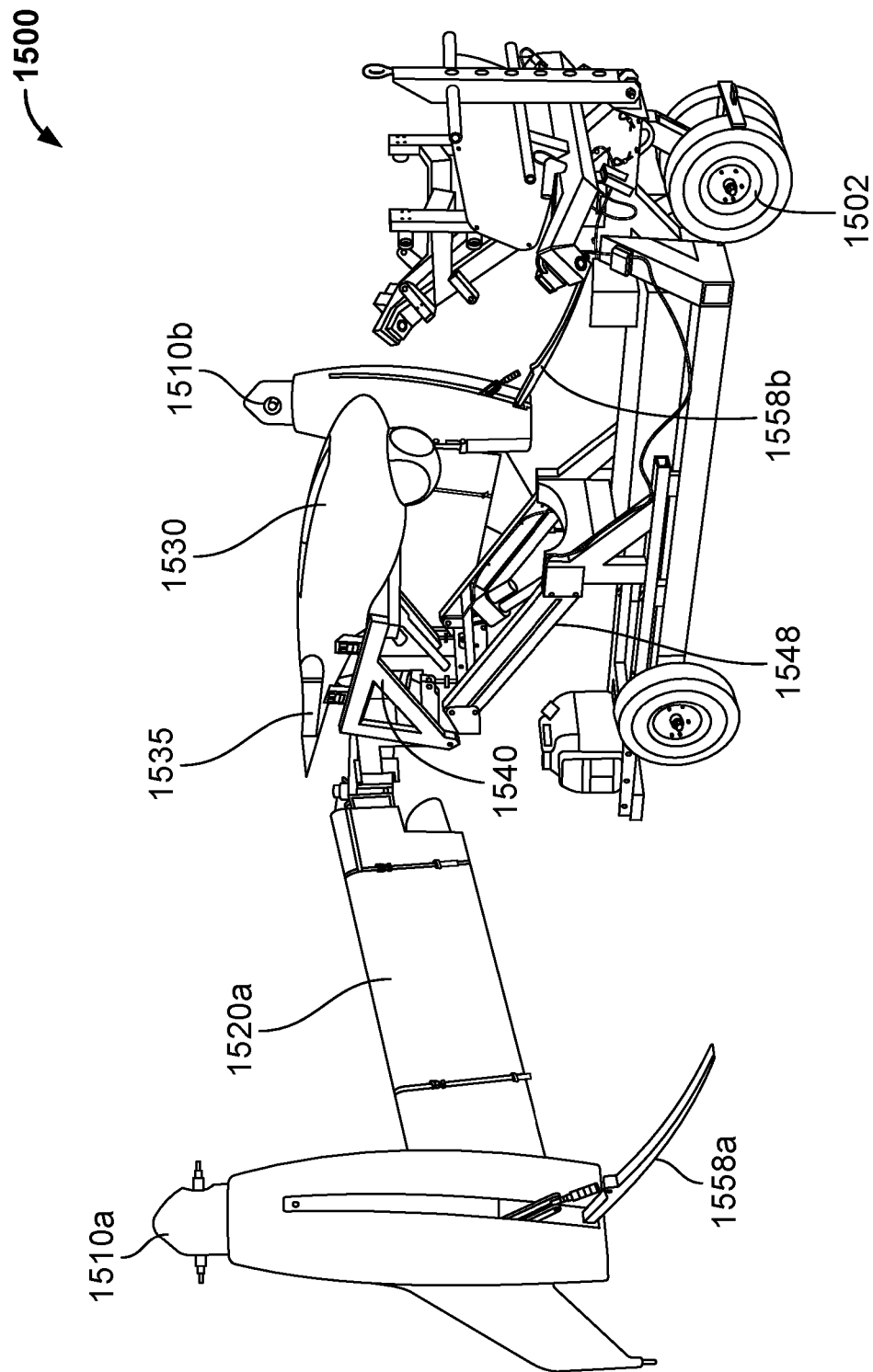
Figure 15I:
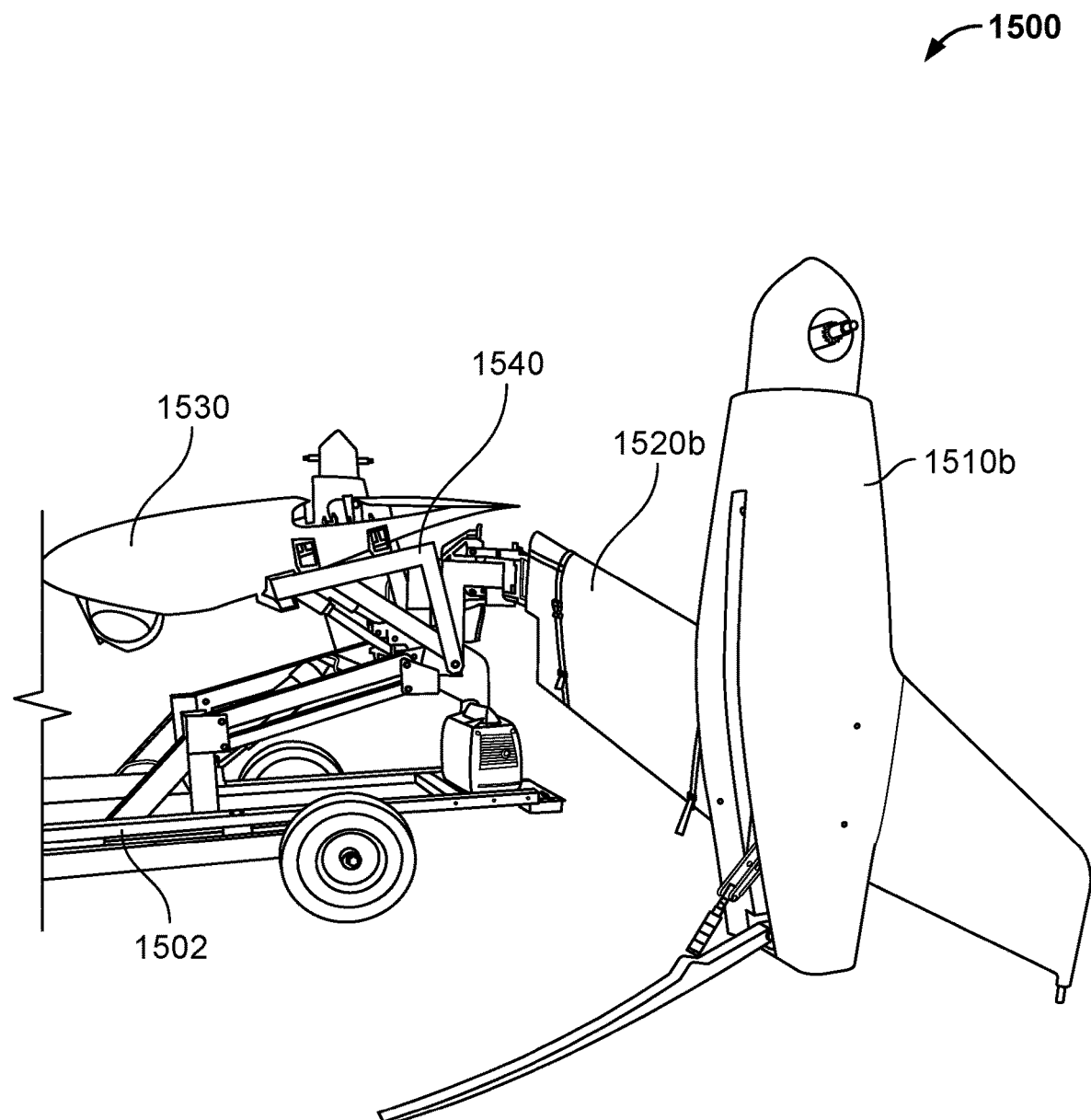
Figure 15J:
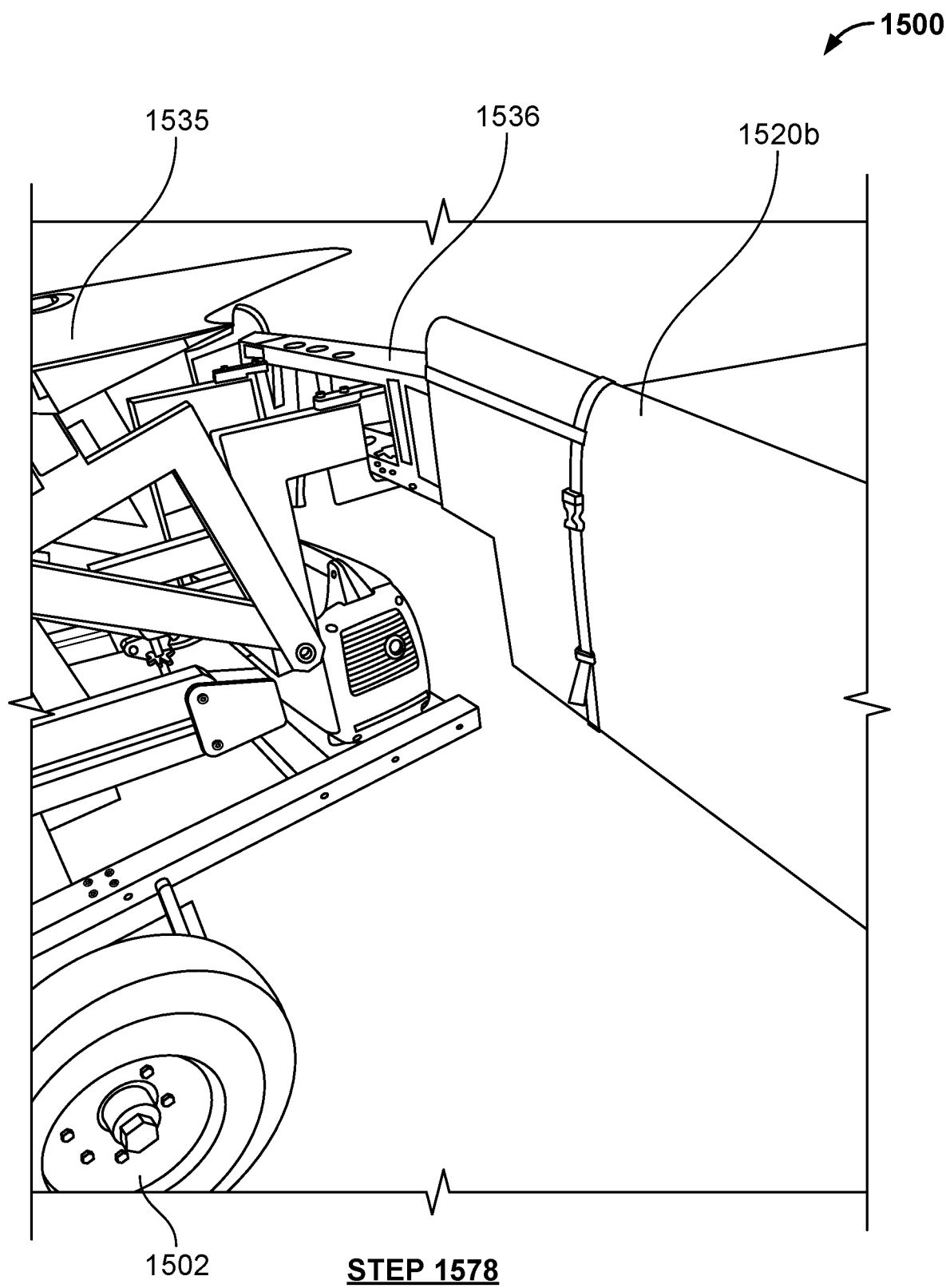
Figure 15K:
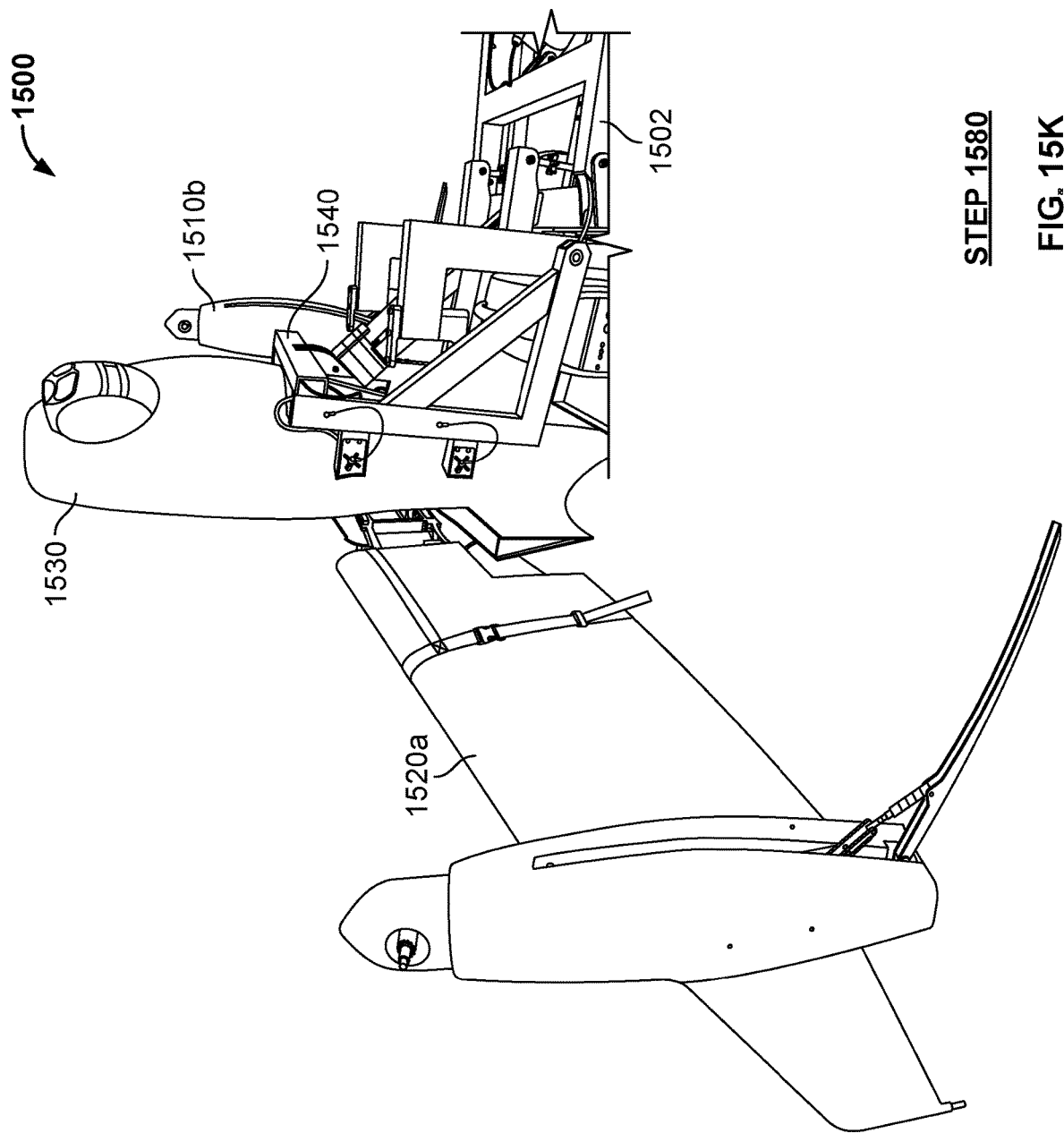
Figure 15L:
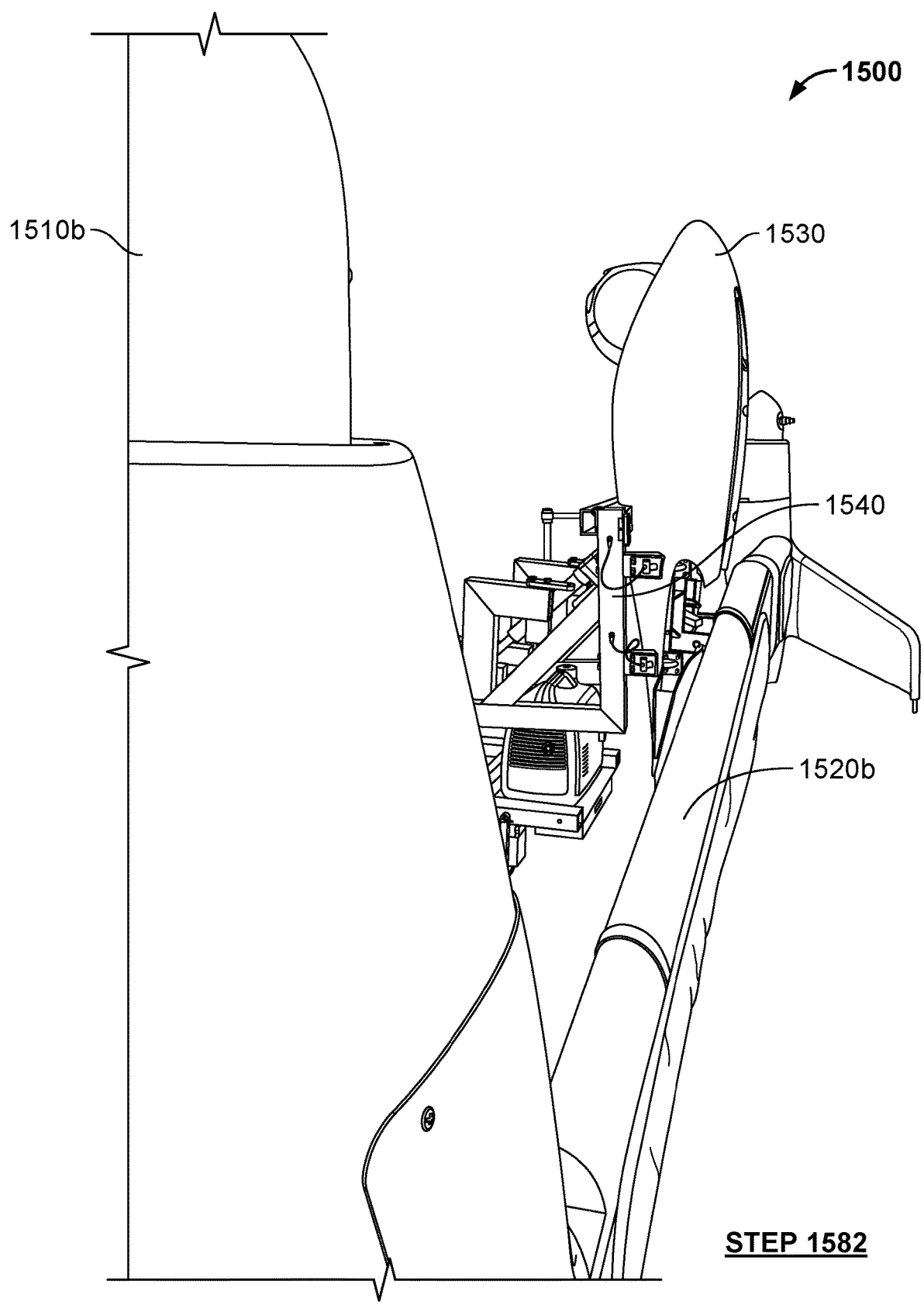
Figure 15M:
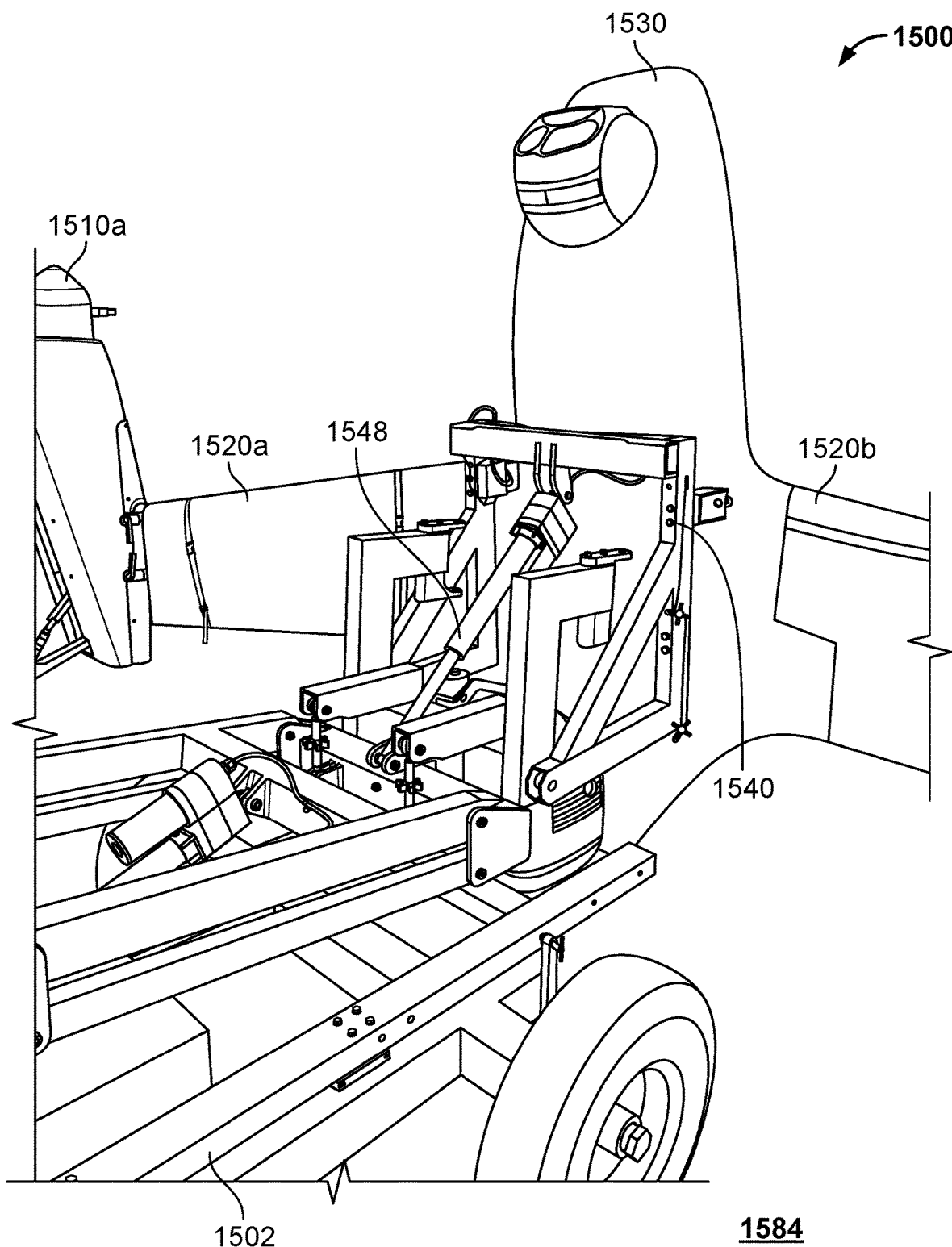
Figure 15N:
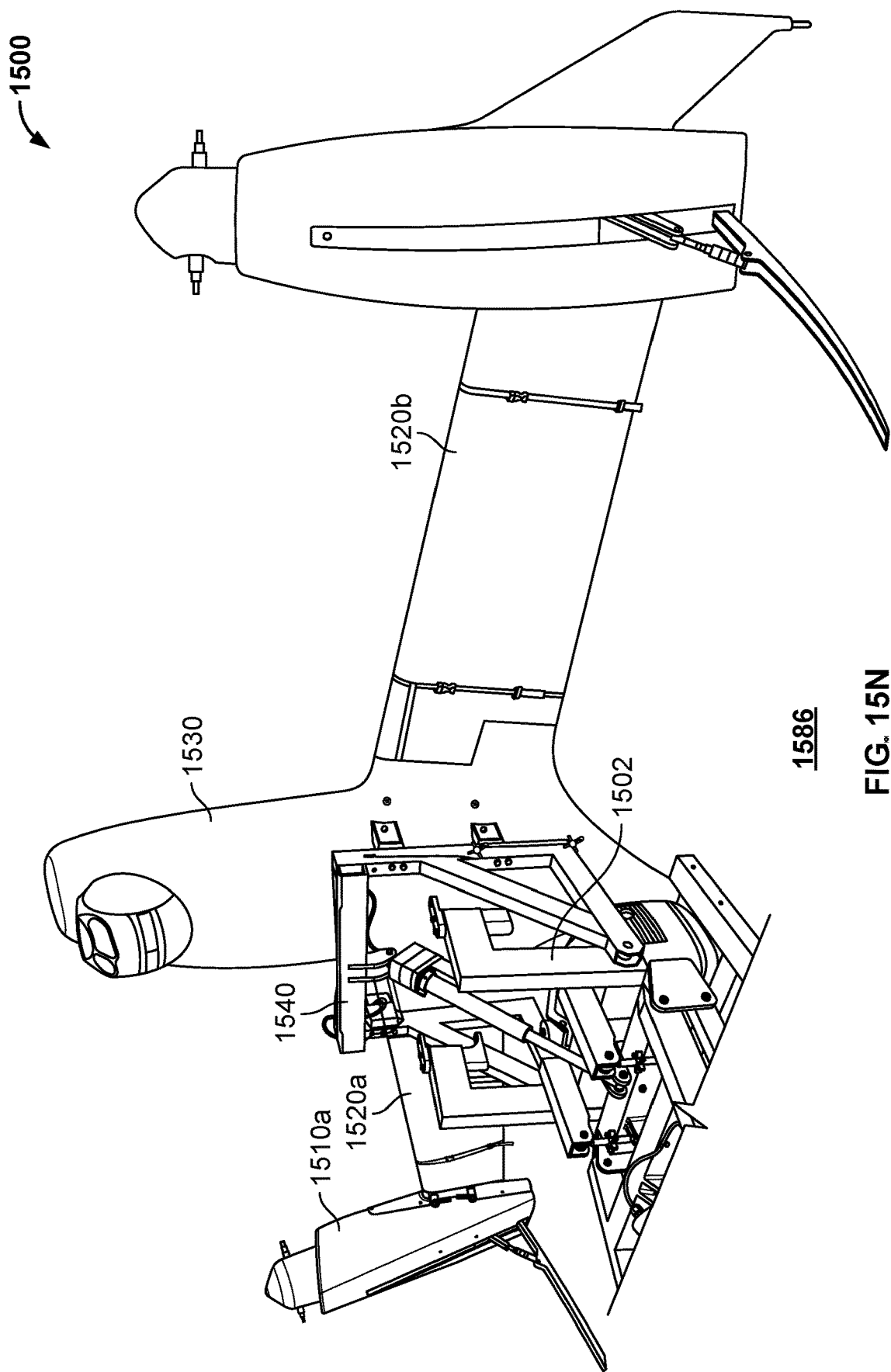
Figure 15O:
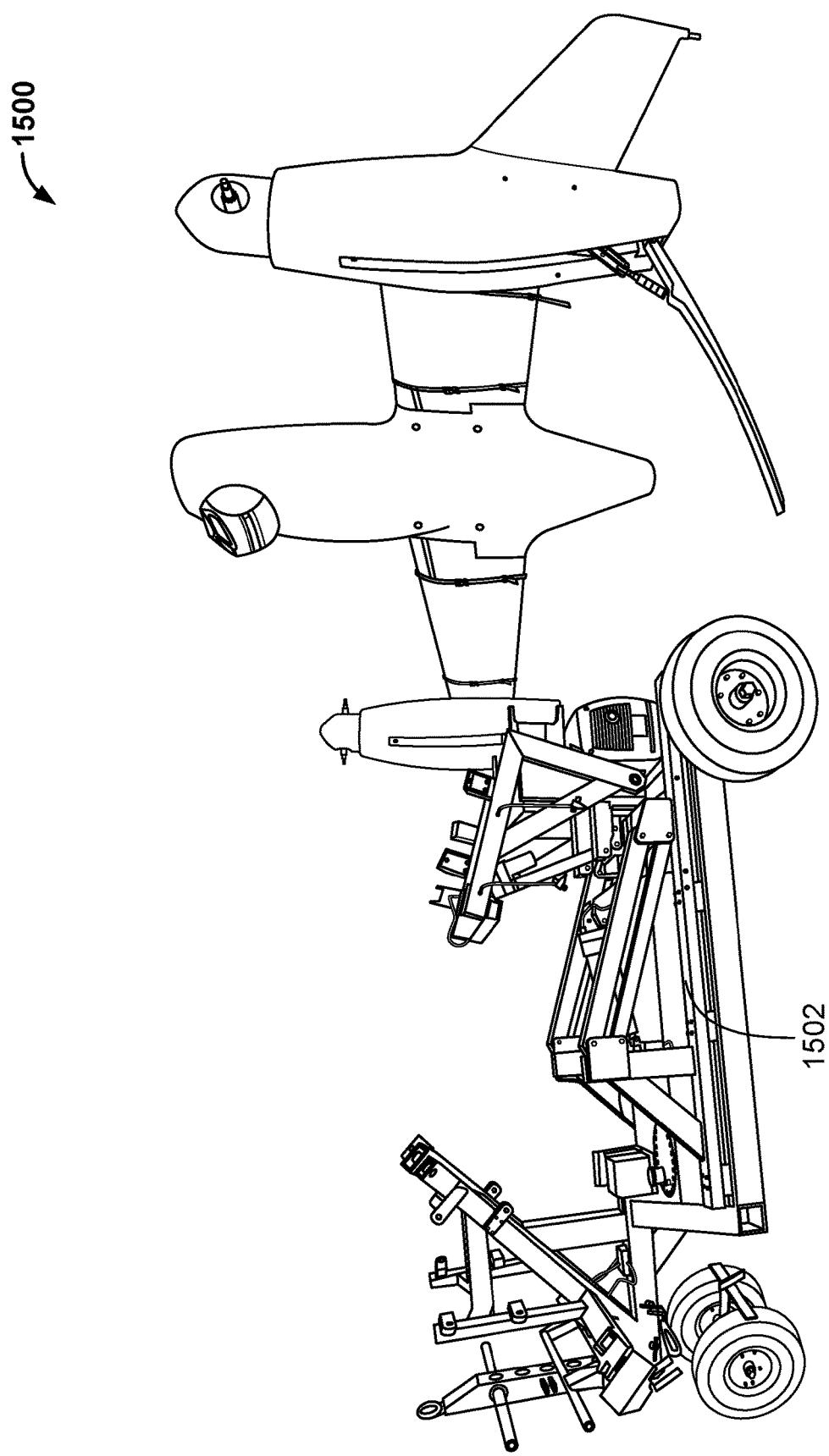
Figure 15P:
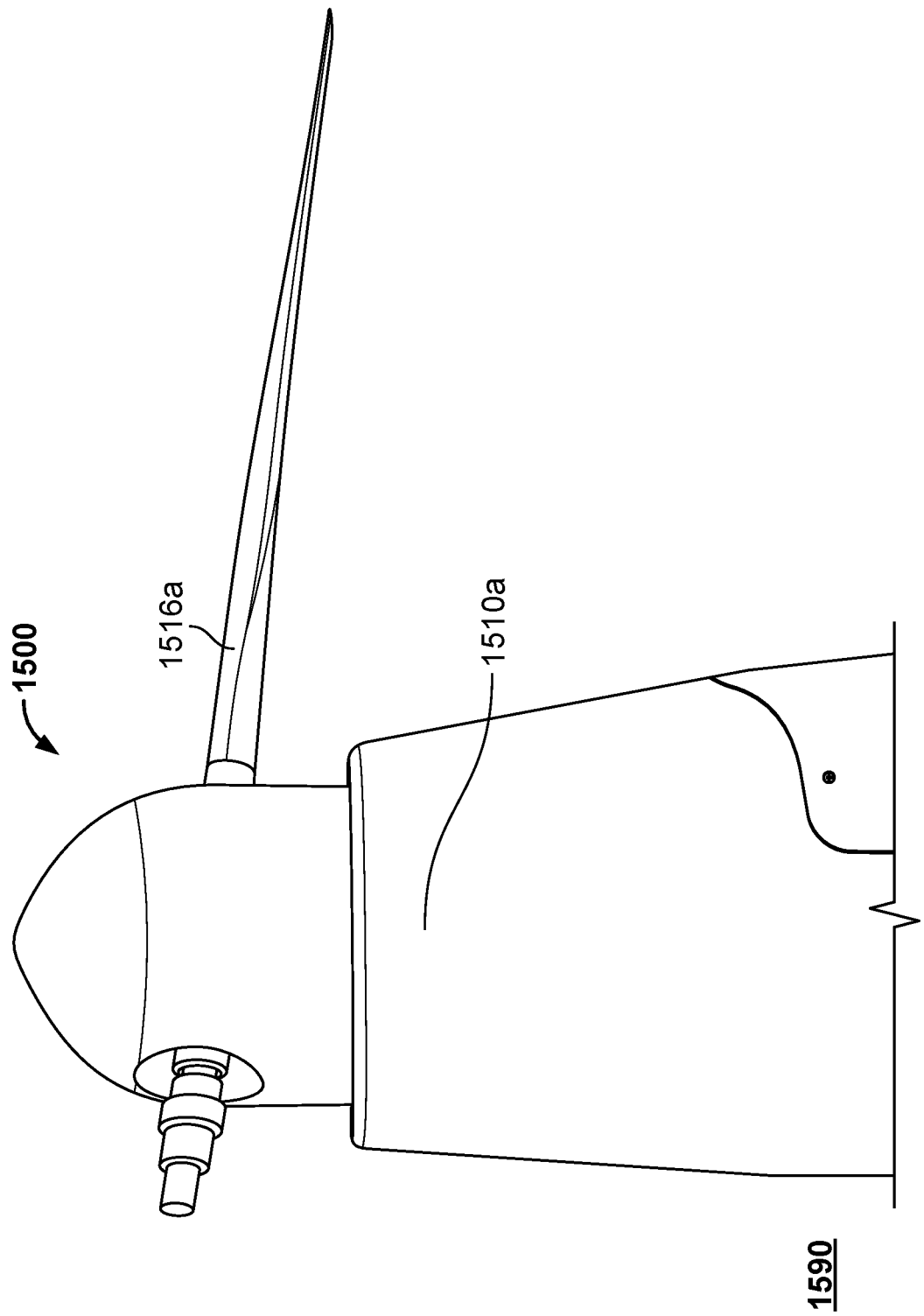
Figure 15R:
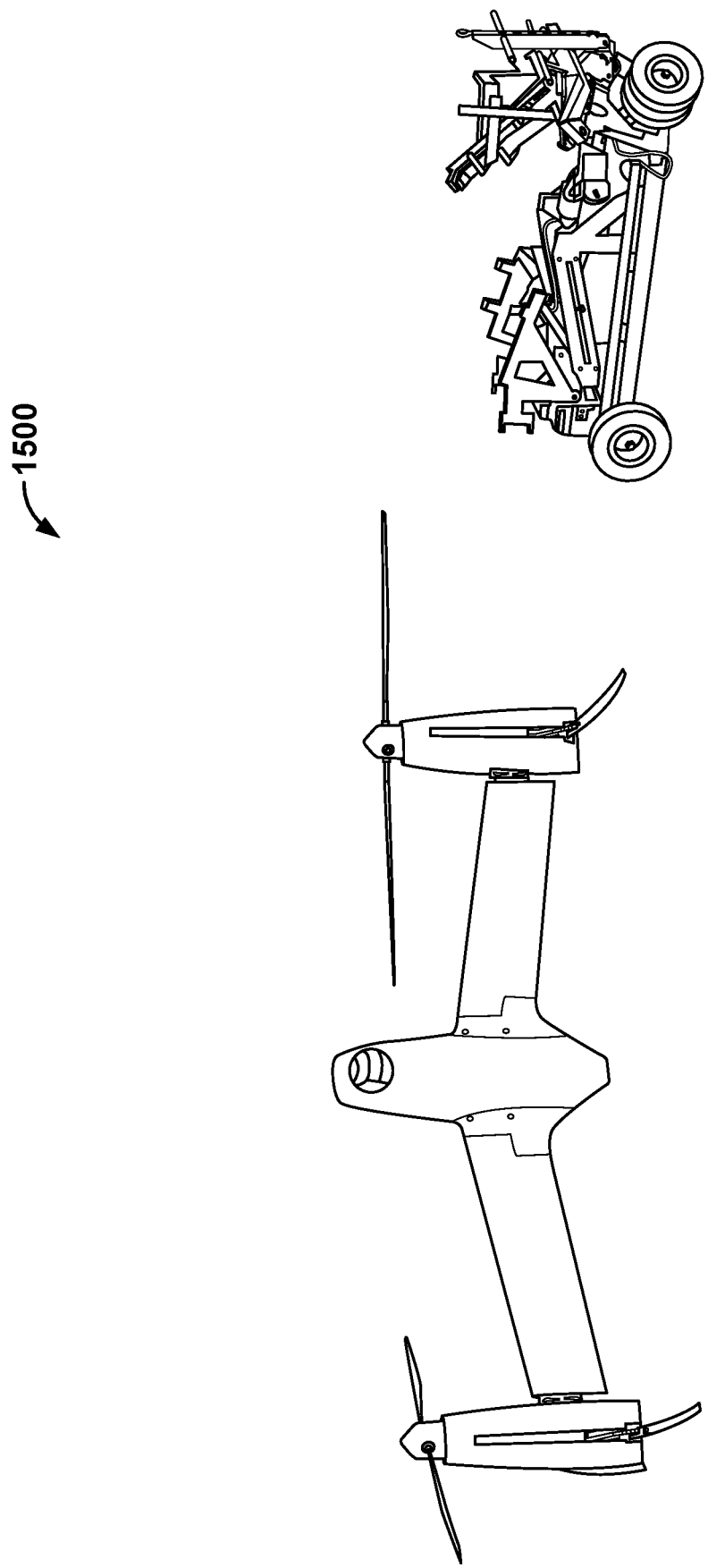

FIGS. 15A-15R are diagrams of steps in a sequence of steps for assembling an aircraft to various embodiments. Although a sequence of steps 1560-1595 illustrates assembly of aircraft 1500 for deployment, various embodiments include a similar process for disassembly, such as a process that reverses the sequence of steps 1560-1595. Assembly of aircraft 1500 is different from assembly of aircraft 1400 based at least in part on assembly of aircraft 1500 including mounting the nacelles to the wings before mounting the fuselage.

FIG. 15A is a diagram illustrating an embodiment of a collapsible aircraft. In the example shown at 1560, cart 1502 carrying disassembled aircraft 1500 is moved to a position at which aircraft 1500 is to be deployed. For example, cart 1502 is removed from a transport vessel or a box/envelope in which aircraft 1500 was transported to the destination location at which aircraft 1500 is to be deployed. Cart 1502 may be pushed by human operators or another robotic pushing system, or cart 1502 may comprise a motor that is controlled drives the wheels of cart 1502 to the desired location. Aircraft 1500 includes first nacelle 1510*a* supported by nacelle support structure 1512*a* on cart 1502, second nacelle 1510*b* supported by nacelle support structure 1512*b* on cart 1502, first wing 1520*a* on cart 1502, fuselage on cart 1502 (not visible in FIG. 15A), and second wing on cart 1502 (not visible in FIG. 15A).

FIG. 15B is a diagram illustrating an embodiment of a collapsible aircraft. In the example shown at 1562, aircraft 1500 includes first nacelle 1510*a* supported by nacelle support structure 1512*a* on cart 1502, second nacelle 1510*b* supported by nacelle support structure 1512*b* on cart 1502, first wing 1520*a* on cart 1502, fuselage 1530 on cart 1502, and second wing on cart 1502 (not visible in FIG. 15B). First nacelle 1510*a* is raised using nacelle support structure 1512*a* and second nacelle 1510*b* is raised using nacelle support structure 1512*b*.

FIG. 15C is a diagram illustrating an embodiment of a collapsible aircraft. In the example shown at 1564, aircraft 1500 includes first nacelle 1510*a* supported by nacelle support structure 1512*a* on cart 1502, second nacelle 1510*b* supported by nacelle support structure 1512*b* on cart 1502, first wing 1520*a* on cart 1502, fuselage 1530 on cart 1502, and second wing 1520*b* on cart 1502. First nacelle 1510*a* is raised using nacelle support structure 1512*a* and second nacelle 1510*b* is raised using nacelle support structure 1512*b*. The first nacelle 1510*a* and second nacelle 1510*b* of aircraft 1500 are prepared for mounting to the corresponding wings by positioning them vertically (e.g., substantially perpendicular to the ground), which enables first wing 1520*a* and second wing 1520*b* to be coupled (e.g., inserted into) first nacelle 1510*a* and second nacelle 1510*b*, respectively.

In some embodiments, the nacelles are moved from the disassembled position to the position at which the nacelles are mounted to the wings by actuating one or more actuation mechanisms. For example, nacelle support structures 1512*a* and/or 1512*b* to which first nacelle 1510*a* and second nacelle 1510*b* are respectively connected are manipulated (e.g., by hand or via actuation of an actuating member) to move first nacelle 1510a and second nacelle 1510b to the position at which the wings are to be connected.

As illustrated in FIG. 15C, the wings are positioned for mounting to the nacelles. In the example shown, first wing 1520a and second wing 1520b are moved (e.g., raised) to align nacelle support member 1524a (not visible in FIG. 15C) and nacelle support member 1524b with first nacelle 1510a and second nacelle 1510b, respectively. In some embodiments, moving first wing 1520a and second wing 1520b for alignment includes raising fuselage 1530 which is couple to center wing 1535, such as by actuating movement of a support member. As fuselage 1530 and center wing 1535 are moved, first wing 1520a and second wing 1520b are moved in turn.

FIG. 15D is a diagram illustrating an embodiment of a collapsible aircraft. In the example shown at 1566, in response to the wings being aligned with the nacelles, the wings are moved to engage the nacelles and the wings and nacelles are respectively mounted. In some embodiments, the wings and nacelles are brought closer supported using cart 1502 until nacelle support members are properly inserted to a cavity defined in the nacelles. As illustrated in FIG. 15D, first nacelle support member 1524a is moved and inserted into first nacelle 1510a. Upon insertion of first nacelle support member 1524a of first wing 1520a, first wing 1520a is fixedly mounted to first nacelle 1510a (e.g., via mounting first nacelle support member 1524a to first nacelle 1510a using a bolt, wingnut, mechanical connector, etc.).

Referring back to FIG. 9B, first nacelle support member 924a (e.g., corresponding to first nacelle support member 1524a of FIG. 15D) is mounted to first nacelle 910a. One or more attachment mechanisms, such as an interface bolt, is used to fixedly mount first nacelle 910a to first wing 920a. Attaching the wings to the nacelles may include moving the wings towards the nacelles (e.g., translating along an axis towards the nacelles) engaging the nacelles with the wings, and fixedly mounting the nacelles to the wings. In some embodiments, first nacelle 1510a and second nacelle 1510b are mounted to a bottom of first wing 1520a and second wing 1520b, respectively.

FIG. 15E is a diagram illustrating an embodiment of a collapsible aircraft. In the example shown at 1568, support members on cart 1502 are detached from the nacelles. As illustrated in FIGS. 15E and 15F, first nacelle 1510a and second nacelle 1510b are respectively detached from nacelle support structures 1512a, 1512b of cart 1502. First wing 1520a attached to first nacelle 1510a as well as second wing (not visible in FIG. 15E) attached to second nacelle 1510b and fuselage 1530 and center wing 1535 are supported by cart 1502.

FIGS. 15F and 15G are diagrams illustrating embodiments of a collapsible aircraft. In the example shown at 1570 and at 1572, first wing 1520a and second wing 1520b are progressively extended for fixedly mounting the first wing 1520a and second wing 1520b to the center wing. In response to first nacelle 1510a and second nacelle 1510b being fixedly mounted to first wing 1520a and second wing 1520b, first wing 1520a and second wing 1520b are moved to the position at which first wing 1520a and second wing 1520b are to be fixed to the center wing. In some embodiments, first wing 1520a and second wing 1520b are respectively connected to the center wing via a hinge. Accordingly, first wing 1520a and second wing 1520b are rotated around the axes respectively defined by the hinges until the wings are level (or substantially level) with the center wing. Mounting the wings to the center wing may include configuring an attachment mechanism, such as an interface bolt, to fixedly mount the wings to the center wing.

In some embodiments, the wings are respectively connected to a center wing support member via hinge, and the center wing is mounted to a center wing support member.

In some embodiments, in response to detaching first nacelle 1510a and second nacelle 1510b from the nacelle support structures of the cart, first wing 1520a and second wing 1520b are extended by causing first wing 1520a and second wing 1520b to rotate around the axes respectively defined by the hinge mechanism that connects first wing 1520a and second wing 1520b and to which first wing 1520a and second wing 1520b are connected to the fuselage 1530 and/or center wing.

Ins some embodiments, support member 1540 and support member 1548 of cart 1520 are used to support first wing 1520a coupled to first nacelle 1510a and second wing 1520b coupled to second nacelle 1510b. In some embodiments, support member 1540 and support member 1548 are caused to move using motors also mounted on cart 1520.

FIG. 15H is a diagram illustrating an embodiment of a collapsible aircraft. In the example shown at 1574, support member 1540 and support member 1548 of cart 1520 are used to support first wing 1520a coupled to first nacelle 1510a and second wing 1520b coupled to second nacelle 1510b. In some embodiments, support member 1540 and support member 1548 are caused to move using motors also mounted on cart 1520. The landing module is configured in a landing state. For example, in response to first wing 1520a and second wing 1520b being fully extended, the landing module is configured to move landing support member 1558a and landing support member 1558b to an extended state so that the landing module provide a wide base of support for aircraft 1500 as aircraft rests on the ground.

FIG. 15I is a diagram illustrating an embodiment of a collapsible aircraft. In the example shown at 1576, support member 1540 of cart 1520 are used to lower first wing 1520a coupled to first nacelle 1510a and second wing 1520b coupled to second nacelle 1510b to the ground. In some embodiments, support member 1540 and support member 1548 are caused to move using motors also mounted on cart 1520. Landing support member 1558a and landing support member 1558b provide a wide base of support for aircraft 1500 as aircraft rests on the ground. Aircraft 1500 is lowered to the ground to rest on the landing module. In some embodiments, lowering aircraft 1500 to the ground includes actuating one or more actuation mechanisms coupled to support members of cart 1502. For example, support member 1548 is actuated to cause center support member 1540 to be lowered until feet on the landing support members are resting on the ground.

FIGS. 15J, 15K, and 15L are diagrams illustrating embodiments of a collapsible aircraft. In the example shown at 1578, at 1580, and at 1582, fuselage 1530 is rotated upwards to engage fuselage 1530 with first wing 1520a and second wing 1520b and center wing support member 1536. For example, fuselage 1530 is rotated upwards using support member 1540 so that the length of fuselage 1530 extends vertically. Fuselage 1530 is transitioned from a disassembled state in which fuselage 1530 rests in the space defined by folded first wing 1520a and second wing 1520b to an assembled state in which fuselage 1530 and center wing 1535 are engaged with first wing 1520a and second wing 1520b by coupling fuselage 1530/center wing 1535 with center wing support member 1536. Fuselage 1530 and/or center wing 1535 is moved towards the extended wings to engage center wing support member 1536 and to allow for fuselage 1530 and/or center wing to be fixedly mounted to the wings In some embodiments, a mounting mechanism at the top of fuselage 1530 is used to mount the wings to fuselage. For example, fuselage 1530 is moved such that the mounting mechanism at the top of fuselage 1530 engages center wing support member 1536. In response to the mounting mechanism engaging the wings (e.g., center wing support member 1536), the wings are fixedly mounted to the mounting mechanism on fuselage 1530, such as via an attachment mechanism (e.g., a bolt).

FIGS. 15M and 15N are diagrams illustrating embodiments of a collapsible aircraft. In the example shown at 1584, center support member 1540 is detached from fuselage 1530/center wing 1535 that is coupled to first wing 1520a/first nacelle 1510a and second wing 1520b/second nacelle 1510b. At 1586, center support member 1540 and/or cart 1502 is moved away from aircraft 1500. For example, after detaching center support member 1540 from fuselage 1530/center wing 1535, center support member 1540 is retracted (e.g., folded into cart 1502 using mover 1548).

FIG. 15O is a diagram illustrating an embodiment of a collapsible aircraft. In the example shown at 1588, cart 1502 is moved away from aircraft 1500 to provide sufficient clearance for deployment of aircraft 1500.

FIGS. 15P and 15Q are diagrams illustrating embodiments of a collapsible aircraft. In the example shown at 1590 and at 1592, the proprotor blades are installed. In some embodiments, installing the proprotor blades is a process that does not require any additional tools. For example, a human operator may install the proprotor blades by hand. In some embodiments, the proprotor blades are installed according to the installation process illustrated at FIG. 13B. For example, proprotor blade 1516a and/or proprotor blade 1516b is/are moved in an installation direction towards proprotor hub comprised in first nacelle 1510a of aircraft 1500. Proprotor blade 1516a and/or proprotor blade 1516b is/are pushed towards the proprotor hub until the notches on the internal circumferences of the cavity defined by proprotor blade 1516a and/or proprotor blade 1516b have been pushed past a set of gaps in ridges on the external circumference of the proprotor hub. After proprotor blade 1516a and/or proprotor blade 1516b has/have been sufficiently pushed in the installation direction, proprotor blade 1516a and/or proprotor blade 1516b is/are rotated such as in a clockwise direction. Proprotor blade 1516a and/or proprotor blade 1516b is/are twisted sufficiently for the notches on the internal circumferences of the cavity defined by proprotor blade 1516a and/or proprotor blade 1516b to become misaligned with the set of gaps in ridges on the external circumference of proprotor hub. The human operator can then release proprotor blade 1516a and/or proprotor blade 1516b and a biasing force by a biasing member of the proprotor hub pushes proprotor blade 1516a and/or proprotor blade 1516b in a direction opposite the installation direction.

FIG. 15R is a diagram illustrating an embodiment of a collapsible aircraft. In the example shown at 1594, aircraft 1500 is deployed. In some embodiments, aircraft 1500 is controlled to perform a vertical take-off and to transition to horizontal flight in connection with performing one or more tasks or operations, such as a reconnaissance operation. In the case of an aircraft propelled using internal combustion engines, the fuel reservoirs in aircraft 1500 are filled with fuel, and aircraft 1500 is set ready for deployment.

Figure 16:
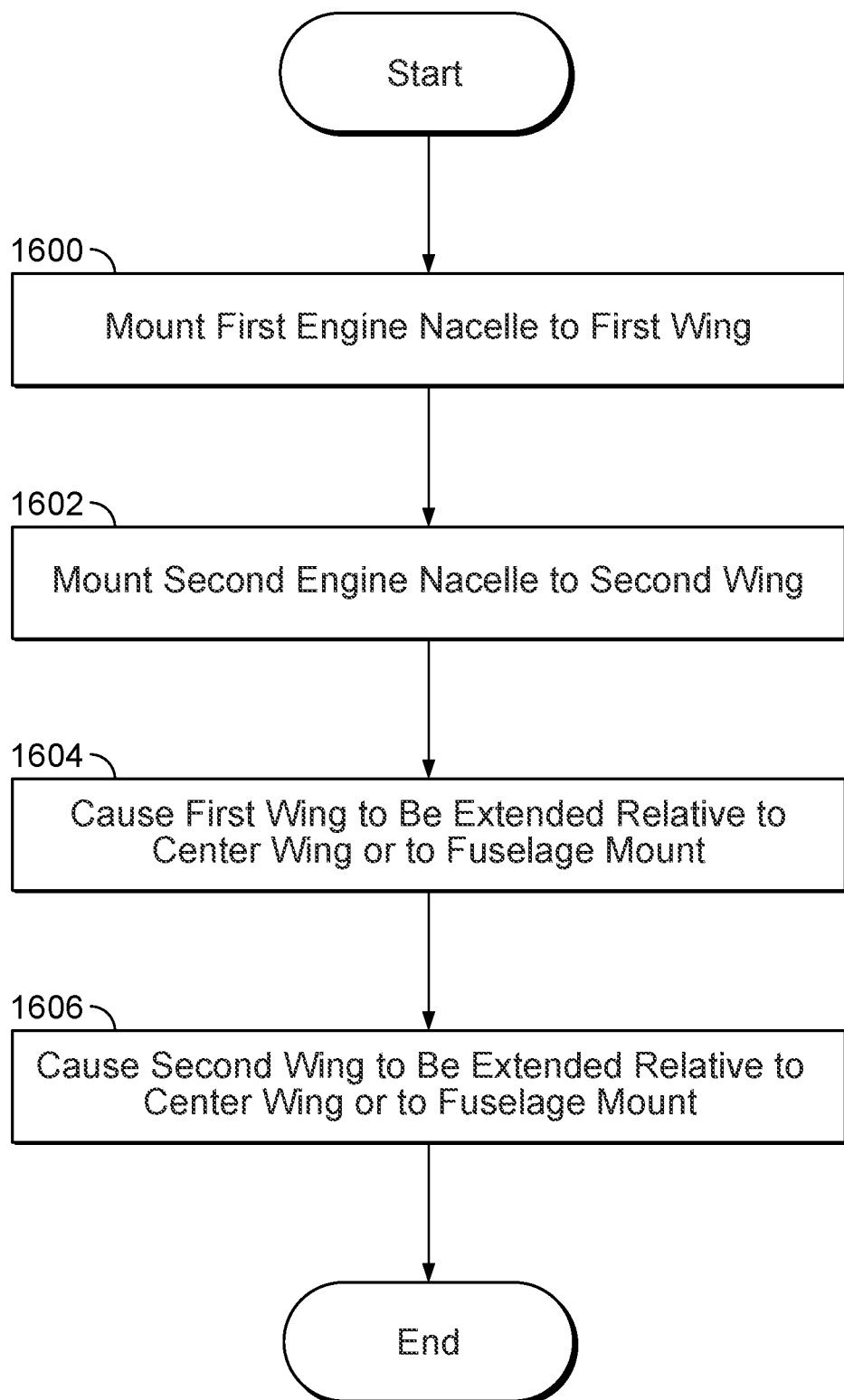
FIG. 16 is a flow diagram illustrating an embodiment of a process for assembling a collapsible aircraft.

FIG. 16 is a flow diagram illustrating an embodiment of a process for assembling a collapsible aircraft. In the example shown, in 1600 a first engine nacelle is mounted to a first wing. For example, a first nacelle comprising an engine is mounted to a first wing. In some embodiments, the first nacelle is mounted to a first wing using a blind mating joint that connects fuel and electrical control signals between the first nacelle and the first wing. In 1602, a second engine nacelle is mounted to a second wing. For example, a second nacelle comprising an engine is mounted to a second wing. In some embodiments, the second nacelle is mounted to a second wing using a blind mating joint that connects fuel and electrical control signals between the second nacelle and the second wing. In 1604, a first wing is caused to be extended relative to a center wing or to a fuselage mount. For example, the first wing is unfolded, rotated, or moved from a compact shape to an extended aircraft shape. In 1606, a second wing is caused to be extended relative to a center wing or to a fuselage mount. For example, the second wing is unfolded, rotated, or moved from a compact shape to an extended aircraft shape.

In some embodiments, causing the first wing to be extended relative to the center wing comprises rotating the first wing around an axis defined by a first hinge that mounts the first wing to the center wing or to the fuselage mount. In some embodiments, when the first wing is in an extended state relative the first wing is fixedly mounted to the center wing or to the fuselage mount. In some embodiments, fixedly mounting the first wing to the center wing or to the fuselage mount includes bolting the first wing to the center wing while the first wing is in an extended state. In some embodiments, assembling the aircraft further comprises moving a first nacelle support structure of a cart that carries the aircraft in a disassembled state, where the first nacelle support structure is moved from a disassembled position to a nacelle assembly position; the first engine nacelle is mounted to the first nacelle support structure; and the nacelle assembly position corresponds to a first engine nacelle orientation at which the first engine nacelle is mounted to the first wing. In some embodiments, assembling the aircraft further comprises aligning the first wing with the first engine nacelle in response to the first nacelle support structure being moved to the nacelle assembly position; and inserting a first nacelle support member of the first wing to a cavity defined by the first engine nacelle, wherein mounting the first engine nacelle to the first wing includes bolting the first nacelle support member to a first nacelle-wing mount on the first nacelle. In some embodiments, detaching the first engine nacelle from the first nacelle support structure of the cart to allow the first wing and first engine nacelle to be moved to an extended state in which the wing extends horizontally from the center wing or the fuselage mount. In some embodiments, aligning the first wing and the first engine nacelle comprises causing one or more wing support members to raise at least the first wing to a height at which the first nacelle support member is aligned with the cavity defined by the first engine nacelle. In some embodiments, assembling the aircraft further comprises causing a fuselage to be moved from a disassembled state to a fuselage assembly state; and mounting the fuselage to the center wing or to the fuselage mount when the fuselage is in the fuselage assembly state. In some embodiments, causing the fuselage to be moved from the disassembled state to the fuselage assembly state includes actuating a center support member of a cart that carries the aircraft in a disassembled state; the fuselage is mounted to the center support member; and actuating the center support member moves the fuselage relative to the center wing or the fuselage mount. In some embodiments, moving the fuselage from a disassembled state to a fuselage assembly state includes causing the fuselage to be rotated around an axis defined by a hinge that mounts the fuselage to the center wing or to the fuselage mount. In some embodiments, the fuselage is moved from the disassembled state to the fuselage assembly state before the first engine nacelle is mounted to the first wing and the second engine nacelle is mounted to the second wing. In some embodiments, assembling the aircraft further comprises causing a first landing module coupled to the first engine nacelle to be configured in an extended state when the first wing is extended relative to the center wing or to the fuselage mount; and causing a second landing module coupled to the second engine nacelle to be configured in an extended state when the second wing is extended relative to the center wing or to the fuselage mount. In some embodiments, assembling the aircraft further comprises causing the aircraft to be lowered to the ground such that the aircraft is supported by the first landing module and the second landing module. In some embodiments, causing the aircraft to be lowered includes actuating an actuating member on a cart that carries the aircraft in a disassembled state. In some embodiments, the aircraft is lowered to the ground after (i) the fuselage, the first wing, and the second wing are fixedly mounted to the center wing or to the fuselage mount, (ii) the first engine nacelle is mounted to the first wing, and (iii) the second engine nacelle is mounted to the second wing. In some embodiments, assembling the aircraft further comprises installing a set of proprotor blades to a first proprotor of the first engine nacelle and a second proprotor of the second engine nacelle. In some embodiments, installing a first proprotor blade to the first proprotor comprises (i) pushing the first proprotor blade towards a proprotor hub of the first proprotor until the proprotor hub is inserted into a cavity defined by the first proprotor blade, (ii) twisting the first proprotor blade relative to the first proprotor hub, and (iii) releasing the first proprotor blade. In some embodiments, the first proprotor hub comprises a biasing element that applies a biasing force on the first proprotor blade in a direction opposite an installation direction.

Figure 17:
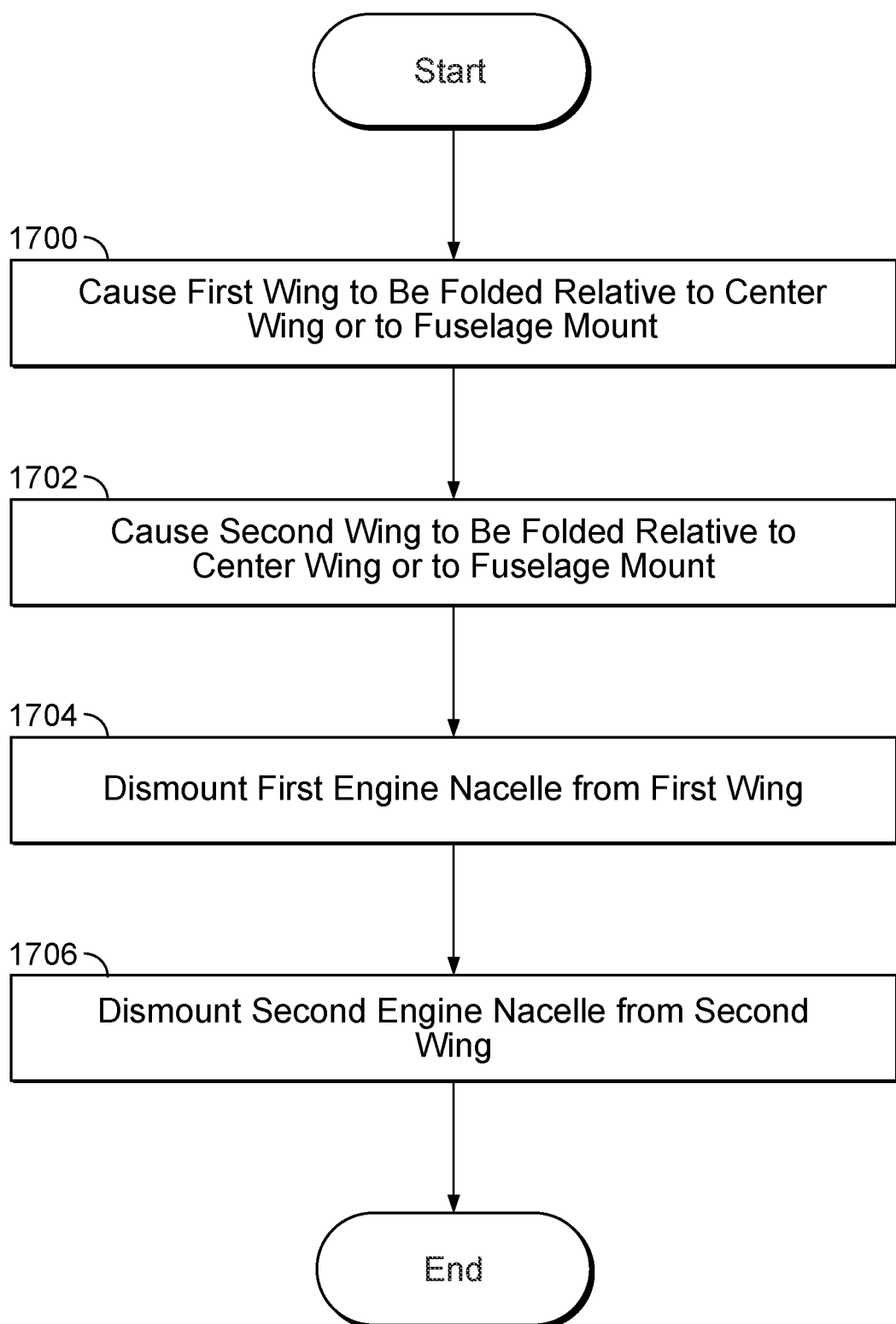
FIG. 17 is a flow diagram illustrating an embodiment of a process for disassembling an aircraft.

FIG. 17 is a flow diagram illustrating an embodiment of a process for disassembling an aircraft. In the example shown, in 1700 a first wing is caused to be folded relative to a fuselage mount or a center wing. In 1702, a second wing is caused to be folded relative to a fuselage mount or a center wing. In 1704, a first engine nacelle is dismounted from the first wing. In 1706, a second engine nacelle is dismounted from the first wing.

In some embodiments, causing the first wing to be folded relative to the fuselage mount or the center wing comprises rotating the first wing around an axis defined by a first hinge that mounts the first wing to the fuselage mount or the center wing. In some embodiments, causing the first wing to be folded relative to the fuselage mount or the center wing comprises undoing the fixed mounting. In some embodiments, undoing the fixed mounting includes unbolting the first wing from the center wing or the fuselage mount. In some embodiments, disassembling the aircraft further comprises securing the aircraft to a cart prior to causing the first wing to be folded. In some embodiments, securing the aircraft to the cart comprises raising the aircraft. In various embodiments, securing the aircraft to the cart comprises coupling the aircraft to a support member of the cart using one or more of the following: a clamp mechanism, a bolt, a pin, a hook, a tether, a strap, a rope, a cable, and/or any other appropriate coupling manner. In some embodiments, securing the aircraft to the cart comprises raising the aircraft once the aircraft is raised off the ground. In some embodiments, decoupling a winglet from a first engine nacelle and/or a second engine nacelle after raising the aircraft once the aircraft is raised off the ground. In some embodiments, dismounting the first engine nacelle from the first wing includes unbolting the first engine nacelle from the first wing. In some embodiments, dismounting the first engine nacelle from the first wing includes securing the first engine nacelle to a cart. In some embodiments, dismounting the first engine nacelle from the first wing includes moving the first nacelle support structure to a disassembled position from an assembled position. In some embodiments, moving to the disassembled position from the assembled position includes removing a first nacelle support member of the first wing from a cavity of the first engine nacelle. In some embodiments, removing a first nacelle support member of the first wing from a cavity of the first engine nacelle comprises unbolting the first nacelle support member of the first wing from the first engine nacelle. In some embodiments, disassembling the aircraft further comprises detaching proprotor blades from the first engine nacelle and/or the second engine nacelle. In some embodiments, disassembling the aircraft further comprises moving a fuselage from an assembled state to a disassembled state. In some embodiments, moving the fuselage from the assembled state to the disassembled state includes securing the fuselage to the cart. In some embodiments, moving the fuselage from the assembled state to the disassembled state includes uncoupling the fuselage from the fuselage mount or the center wing. In some embodiments, moving the fuselage from the assembled state to the disassembled state comprises pivoting the fuselage using a hinge.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
    a first wing and a second wing;
    a center wing disposed between the first wing and the second wing, wherein the first wing is coupled to the center wing by a second hinge, wherein the second wing is coupled to the center wing by a third hinge, and wherein the second hinge and the third hinge are disposed on a side of the center wing that corresponds to a bottom of the aircraft when in flight;
    a fuselage operatively connected to the center wing by a first hinge disposed on a side of the fuselage that corresponds to the bottom of the aircraft when in flight;
    a first engine operatively mounted to the first wing, wherein the first engine comprises a first proprotor, wherein one or more first proprotor blades of the first proprotor are detachably mounted to the first engine, and wherein the one or more first proprotor blades are attached to the first engine by a push and twist connection; and
    a second engine operatively mounted to the second wing, wherein:

the aircraft is configured to vertically take-off and land; and the first engine and the second engine are used for both (i) vertical take-off and landing, and (ii) horizontal flight.

2. The aircraft of claim 1, wherein an orientation of the first engine and the second engine relative to the fuselage is the same for both (i) vertical take-off and/or landing, and (ii) horizontal flight.

3. The aircraft of claim 1, wherein the first wing and the second wing are collapsible with respect to the of the center wing.

4. The aircraft of claim 1, wherein the first wing and the second wing are collapsible to form a U shape with the center wing when the aircraft is in a disassembled state.

5. The aircraft of claim 4, wherein the fuselage is rotated around an axis defined by the first hinge to position the fuselage in a space defined by the first wing and the second wing when the first wing is folded about the second hinge and the second wing is folded about the third hinge.

6. The aircraft of claim 1, wherein the first engine is comprised in a first engine nacelle that is detachably mounted to the first wing, and the second engine is comprised in a second engine nacelle that is detachably mounted to the second wing.

7. The aircraft of claim 6, wherein an interface between the first wing and the first engine nacelle comprises a blind mate connection that connects one or more of an electrical system and a fuel line.

8. The aircraft of claim 6, wherein:

the first wing comprises a first nacelle support member on an end that is distal to the fuselage; and the first engine nacelle is detachably mounted to the first wing by inserting the first nacelle support member into a cavity defined by the first engine nacelle and mounting the first nacelle support member to the first engine nacelle.

9. The aircraft of claim 6, further comprising:

a first landing module mounted to a first rear end of the first engine nacelle; and a second landing module mounted to a second rear end of the second engine nacelle.

10. The aircraft of claim 9, wherein the first landing module comprises one or more first landing support members that are mounted to the first rear end of the first engine nacelle by one or more hinges.

11. The aircraft of claim 1, further comprising:

a control computer that controls flight of the aircraft;

the control computer is configured to:

control the aircraft to vertically take-off;

control the aircraft to transition from vertical take-off mode to horizontal flight mode; and control the aircraft for horizontal flight.

12. The aircraft of claim 11, wherein controlling the aircraft to transition from vertical take-off mode to horizontal flight mode includes executing a predefined process for controlling the first engine and second engine in connection with changing an orientation of the aircraft from a first orientation in which the fuselage is directed vertically to a second orientation in which the fuselage is directed horizontally.

13. The aircraft of claim 1, wherein the aircraft is disassembled to fit in an aircraft cargo envelope.

14. The aircraft of claim 13, wherein the aircraft cargo envelope measures 68 inches by 108 inches by 66 inches.

* * * * *

UNITED STATES PATENT AND TRADEMARK OFFICE
CERTIFICATE OF CORRECTION

PATENT NO. : 12,296,968 B2
APPLICATION NO. : 18/301422
DATED : May 13, 2025
INVENTOR(S) : Sean Keith-Stewart et al.

Page 1 of 1

It is certified that error appears in the above-identified patent and that said Letters Patent is hereby corrected as shown below:

In the Claims

In Column 33, Claim 3, Line 11, delete "respect to the of the center" and insert --respect to the center--.

Signed and Sealed this
Fifth Day of August, 2025

Coke Morgan Stewart
*Acting Director of the United States Patent and Trademark Office*